US006755657B1

(12) United States Patent
Wasowicz

(10) Patent No.: US 6,755,657 B1
(45) Date of Patent: Jun. 29, 2004

(54) READING AND SPELLING SKILL DIAGNOSIS AND TRAINING SYSTEM AND METHOD

(75) Inventor: Janet M. Wasowicz, Evanston, IL (US)

(73) Assignee: Cognitive Concepts, Inc., Evanston, IL (US)

( * ) Notice: Subject to any disclaimer, the term of this patent is extended or adjusted under 35 U.S.C. 154(b) by 0 days.

(21) Appl. No.: 09/710,611

(22) Filed: Nov. 8, 2000

Related U.S. Application Data
(60) Provisional application No. 60/164,659, filed on Nov. 9, 1999.

(51) Int. Cl.[7] .............................. G09B 1/00; G09B 19/00
(52) U.S. Cl. .................... 434/167; 434/169; 434/307 R; 434/350
(58) Field of Search ................................. 434/350, 323, 434/322, 307 R, 169, 167; 704/270

(56) References Cited

U.S. PATENT DOCUMENTS

| | | |
|---|---|---|
| 2,514,289 A | 7/1950 | Nye et al. |
| 3,799,146 A | 3/1974 | John et al. |
| 4,166,452 A | 9/1979 | Generales, Jr. |
| 4,285,517 A | 8/1981 | Morrison |
| 4,363,482 A | 12/1982 | Goldfarb |
| 4,457,719 A | 7/1984 | Dittakavi et al. |
| 4,770,416 A | 9/1988 | Shimuzu et al. |
| 4,884,972 A | 12/1989 | Gasper |
| 5,149,084 A | 9/1992 | Dalebout et al. |
| 5,302,132 A | 4/1994 | Corder |
| 5,421,731 A | 6/1995 | Walker |
| 5,456,607 A | 10/1995 | Antoniak |
| 5,513,126 A | 4/1996 | Harkins et al. |
| 5,579,469 A | 11/1996 | Pike |
| 5,596,698 A * | 1/1997 | Morgan ...................... 434/156 |
| 5,649,826 A | 7/1997 | West et al. |
| 5,692,906 A | 12/1997 | Corder |

(List continued on next page.)

FOREIGN PATENT DOCUMENTS

WO   PCT US03/03146      7/2003

OTHER PUBLICATIONS

Assessment and Instruction in Phonological Awareness, Florida Dept. of Education (1999).

Auditory Processing Enhancement Programs, vol. 2: Auditory Discrimination/Phonological Awareness, Academic Communication Associates (1997).

(List continued on next page.)

*Primary Examiner*—S. Thomas Hughes
*Assistant Examiner*—John Sotomayor
(74) *Attorney, Agent, or Firm*—Gray Cary Ware & Freidenrich LLP

(57) ABSTRACT

A reading and spelling skill diagnosis and training system and method are provided wherein a user's auditory processing, phonological awareness and processing, morphological awareness, visual orthographic memory, reading and spelling skills are trained in order to improve the user's reading and spelling skills. The system may include one or more modules that each test and train a different set of skills. Each module may include one or more different tasks (implemented as interactive graphical games) that train a particular skill or set of skills of the user.

40 Claims, 66 Drawing Sheets

U.S. PATENT DOCUMENTS

| | | | |
|---|---|---|---|
| 5,694,546 | A | 12/1997 | Reisman |
| 5,727,950 | A | 3/1998 | Cook et al. |
| 5,743,743 | A | 4/1998 | Ho et al. |
| 5,743,746 | A | 4/1998 | Ho et al. |
| 5,751,953 | A | 5/1998 | Shiels et al. |
| 5,762,503 | A | 6/1998 | Ho et al. |
| 5,823,781 | A | 10/1998 | Hitchcock et al. |
| 5,836,771 | A | 11/1998 | Ho et al. |
| 5,863,208 | A | 1/1999 | Ho et al. |
| 5,884,302 | A | 3/1999 | Ho |
| 5,920,838 | A | 7/1999 | Mostow et al. |
| 5,927,988 | A | 7/1999 | Jenkins et al. |
| 5,934,909 | A | 8/1999 | Ho et al. |
| 5,934,910 | A | 8/1999 | Ho et al. |
| 5,944,530 | A | 8/1999 | Ho et al. |
| 5,957,699 | A | 9/1999 | Peterson et al. |
| 5,967,793 | A | 10/1999 | Ho et al. |
| 6,009,397 | A | 12/1999 | Siegel |
| 6,017,219 | A | 1/2000 | Adams, Jr. et al. |
| 6,077,085 | A * | 6/2000 | Parry et al. ............ 434/322 |
| 6,118,973 | A | 9/2000 | Ho et al. |
| 6,134,529 | A * | 10/2000 | Rothenberg ............ 345/764 |
| 6,146,147 | A | 11/2000 | Wasowicz |
| 6,186,794 | B1 | 2/2001 | Brown et al. |
| 6,190,173 | B1 * | 2/2001 | Jenkins et al. ............ 434/167 |
| 6,227,863 | B1 | 5/2001 | Spector |
| 6,299,452 | B1 | 10/2001 | Wasowicz et al. |
| 6,305,942 | B1 | 10/2001 | Block et al. |
| 6,328,569 | B1 * | 12/2001 | Jenkins et al. ............ 434/167 |
| 6,331,115 | B1 | 12/2001 | Jenkins et al. |
| 6,334,779 | B1 | 1/2002 | Siefert |
| 6,336,089 | B1 | 1/2002 | Everding |
| 6,336,813 | B1 | 1/2002 | Siefert |
| 6,435,877 | B2 | 8/2002 | Wasowicz |
| 6,511,324 | B1 | 1/2003 | Wasowicz |
| 2002/0098463 | A1 | 7/2002 | Fiedorowicz et al. |
| 2002/0160347 | A1 | 10/2002 | Wallace et al. |

OTHER PUBLICATIONS

*Central Test Battery*, Precision Acoustics (1998).

Perceive & Respond vol. 1: Environmental Sounds—Second Edition, Academic Communication Associates (1997).

Perceive & Respond vol. 2: Listening for Auditory Differences—Second Edition, Academic Communication Associates (1997).

Perceive & Respond vol. 3: Auditory Sequential Memory—Second Edition Academic Communication Associates (1997).

*Ensure Success for Your Beginning Readers*; STAR Early Literacy; Renaissance Learning (2002).

*Assess Reading Growth in 10 Minutes or Less*; STAR Early Literacy, Renaissance Learning (2002).

*Phonics–Based Reading Software–Educational Software for Teachers and Parents*; Lexia Learning Systems, Inc. (2000).

*Waterford Early Reading Program*(WERP); Waterford Institute; Electronic Education, a division of Pearson Education (2000).

*Breakthrough To Literacy—The New Three R's: Research, Reading, and Results*; Wright Group McGraw–Hill (2000).

* cited by examiner

READING AND SPELLING SKILL DIAGNOSIS AND TRAINING SYSTEM AND METHOD

RELATED APPLICATION

This application claims priority under 35 USC § 120 from U.S. Provisional Patent Application No. 60/164,659 filed on Nov. 9, 1999, entitled "Reading And Spelling Skill Diagnosis And Training System And Method" which is incorporated herein by reference.

APPENDICES

Two appendices are attached that contain 1) a description of each training module (and each game within each training module) in the training tool in accordance with the invention (Appendix A); and 2) a level listing from each game with each training module. These two appendices are attached to the application and are incorporated herein by reference.

BACKGROUND OF THE INVENTION

This invention relates generally to a system and method for assessing and training a user to improve the user's reading and spelling skills and in particular to a system and method for training a user's phonological awareness and processing, auditory processing, morphological awareness, print awareness, visual orthographic memory (VOM), phonics, decoding and spelling skills in order to improve the user's reading and spelling skills.

Skilled reading involves a complex system of skills and processes and is dependent upon an amalgam of word appearances, meanings and pronunciations. The knowledge and activities required to become a skilled reader can be developed systematically and have been studied heavily by researchers. Recently, particular attention has been focused on the importance of children's ability to learn the alphabetic principle (recognizing that sounds in spoken words can be represented by a letter or letter). Leading researchers have shown that coupling phonological awareness training with letter-sound correspondence training increases children's ability to develop sophisticated decoding and spelling skills—particularly for those children who have difficulty learning developmental literacy skills.

Beginning readers need to develop a strong foundation of phonological awareness, letter knowledge and vocabulary. Word recognition and spelling are facilitated by a network of connections that link the phonological, orthographic, morphological and semantic characteristics of words (Ehri, 1992). Phonological connections are defined by children's ability to notice, think about or manipulate the sounds in language (Torgesen, 1997) and are essential to establishing complete representations of words in memory. Orthographic connections are defined by children's awareness of functional letter units symbolizing phonemes (including their shapes, names and sounds) as well as letter sequences that distinguish various word spellings from one another (Perfetti, 1992). Orthographic and phonological connections work together to benefit decoding, spelling and automatic word recognition when children first begin to read. As children progress through school and encounter longer, more complex words, they will need additional knowledge about syllable patterns and meaning-based spelling patterns (Henderson, 1991). The relative lack of phonetic substance of grammatical morphemes such as "ed", "ing" "s" and "es" makes them less prominent than content words, therefore, they are acquired later and are more problematic for some children (McGregor, 1997). Here, semantic and morphological connections become more important as children's awareness of spelling patterns involves how spellings relate to meaningful units. This knowledge is essential for children to move beyond using only letter-sound correspondences to process printed language and into making meaningful connections to read and spell irregular and/or more complex words.

Beginning readers need to develop an understanding of the alphabetic principle. Instruction that addresses the needs of beginning readers must systematically bridge spoken language with conventions of printed language. Different types of connections between letters and sounds dominate children's decoding and spelling at different points in development (Ehri, 1998; Treiman, 1992). Initially, Children also rely heavily on letter names which mark their attempts at representing pronunciations of words with printed letters that they know (Moats, 1995; Templeton & Bear, 1992). As children learn letter sounds, they begin to develop more robust knowledge of the alphabetic system and start to link the most salient letters in print to sounds in pronunciations. Because initial and final letters are the most salient to children, they are typically the first connections to be recognized and represented in spellings (Ehri, 1998). When children establish sufficient connections between letters and sounds, they begin to develop accumulations of words in memory and recognize recurring spelling patterns. Once this awareness is developed, children can discover that consolidating individual letter-sound correspondences into multi-letter chunks can facilitate automatic recognition and can be used to decode unknown words with the same spelling pattern (Gaskins, 1998). However, because spelling and decoding require explicit recall and recognition of orthographic sequences, particularly for words that have unique or irregular spelling patterns, children must further develop their knowledge of the internal characteristics of words, such as individual letter-sound correspondences, particularly for the medial vowel (Moats, 1995). Instruction that reinforces patterns as well as alphabetic connections linking all of the spellings in printed words to pronunciations in spoken words will help children develop mature representations of thousands of words in memory that can be used to automatically and accurately access words or parts of words for decoding and spelling.

Beginning readers need to develop word reading automatically. One way to read words is to decode individual letter-sound correspondences. Most readers use this skill to read words they do not know. However, attacking letter-sound correspondences, although essential for learning to read and for reading unfamiliar words, is often slow and sometimes not useful when encountering words with irregular and variable spelling-pronunciation relationships (e.g., read/read) (Ehri, 1992). Most experienced readers have learned to process chunks of letters in recurring spelling patterns to decode words. They also have stored words from previous experiences reading words that cannot be decoded by attacking letter-sound correspondences. Research shows that first-grade children need a minimum of four experiences with words to read them automatically (Reitsma, 1983); thus, learning to establish sight word reading skills takes time and repeated exposures to print. Research also shows that being able to read words quickly and accurately facilitates reading fluency and increases the probability that children are understanding what they are reading (Perfetti, 1992). Many students with reading problems have poor automatic word recognition skills that affect their ability to comprehend what they read (Stanovich, 1986). Instruction that is focused on children's ability to decode unfamiliar words and is designed to develop more advanced, automatic word recognition skills will help children establish basic skills that must be in place to develop automatic word recognition and ultimately better reading fluency. By increasing automatic word recognition, children will have more cognitive resources to use for understanding text and drawing information and inferences from what is read (Adams, 1990; Stanovich, 1986).

Beginning readers need to be taught to recognize patterns in how words are spelled and pronounced. Early phonological knowledge is often characterized by awareness of gross phonological units such as whole words or syllables. At the very earliest stages of literacy acquisition, young children demonstrate the ability to recognize and categorize words that rhyme (Goswami & Bryant, 1990), but continue to struggle with awareness of phonemes until they are taught to read or receive explicit phonemic awareness instruction. As reading and spelling skills become more refined, however, children develop a more detailed understanding of the underlying sound structure of spoken words and become aware of individual phonemes in speech as well as how they relate to printed words. Many researchers argue the rhyme awareness serves as the precursor to phoneme awareness. Rhyming skills are thought to play an important role in helping children transition to awareness of correspondences between letters and phonemes in words (Goswami, 1993; Treiman, 1993). This developmental progression suggests that when children begin to read and spell, they analyze words using larger phonological units and eventually become more aware of the constituent features in words that share rhyming spelling patterns. Rhyming words provide children with cues that help them make predictions about pronunciations of words that share common spelling patterns (Goswami, 1991). These hypotheses are based on findings that show that children can read and spell words that rhyme and share spelling patterns more easily than words that share medial vowels or final consonants (Bruck & Treiman, 1992; Goswami & Mead, 1992). Using spelling and pronunciation patterns to teach children about the relationship between print and speech establishes a bridge between gross phonological skills and more discreet awareness of connections between individual phonemes and letters that make up regular words in English.

Similarly, morphological awareness (i.e., the conscious awareness of and ability to manipulate compound words, root words and their inflected and derived forms) facilitates a child's ability to read and spell words. For words that do not have a one-to-one mapping between sound (phoneme or morpheme) and spelling, visual orthographic memory (VOM) skills are critical. VOM skills are dependent on the ability to store mental images of printed letters and sequences of letters including syllables and words in memory.

Thus, it is desirable to provide a phonological reading and spelling system and method that trains a user's phonological awareness and phonics skills and bridges the user's auditory processing, phonological awareness and morphological awareness skills to the user's print awareness, phonics, decoding and spelling skills and it is to this end that the present invention is directed.

SUMMARY OF THE INVENTION

The system and method in accordance with the invention uses the language-to-literacy model of learning to read to design educationally sound products for beginning readers of all skill levels. The skills represented in each step of the model are foundational to the next, while at the same time reciprocal and overlapping. The system in accordance with the invention, referred to as "Letter Connections" herein, is designed to help children who have established the sound foundations of auditory processing, oral language and phonological awareness that they will need to make connections between spoken and printed language. Letter Connections focuses on target skills in the next two steps in the model—phonics and decoding/spelling. Phonics instruction helps children develop the skills they need to make linkages between discrete phonemes and individual letters. Learning sound-symbol correspondences through phonics instruction will help children establish the representations of words in memory they will need to fluently and accurately spell and decode words (Uhry & Sheperd, 1997). Teachers should initiate instruction in phonological awareness before beginning instruction in sound-symbol correspondences; however, once children have established the rudimentary phonological skills that they will need to analyze spoken words, concurrent instruction in sound-symbol correspondence will accelerate the development of more advanced phonological skills (Grossen, 1997).

Letter Connections was designed to develop and systematically bridge phonological and visual orthographic memory skills with phonics, reading and spelling instruction. The program offers a variety of engaging activities that incorporate cutting-edge research methods and clinically-proven training techniques to children who are beginning to make the leap into early decoding and spelling. The instructional approach used in Letter Connections emphasizes the importance of teaching word spellings, meanings and pronunciations together. This approach was designed to develop children's awareness of how printed letters represent spoken words and sounds. Skill training in sound-symbol correspondence, phonics, reading fluency, sight word recognition, morphological awareness and print awareness provide children with exposure to the knowledge and activities they will need to successfully decode words.

Letter Connections games provide extensive systematic instruction designed to help children map printed letters to sounds in spoken language and develop key skills they will need to acquire basic reading and spelling skills. The extensive decoding and spelling activities incorporate skill training in letter-sound identification, fluency and vocabulary development using an adaptive training format. Letter Connections carefully controls important learning variables such as time between stimuli presentations, response time, varying spelling pattern difficulty (e.g., CVC, CCVC, CVCC) as well as the availability of visual cues. Letter Connections also incorporates brief tutorials designed to reinforce meaning and help children learn new vocabulary. These skills are taught in tandem to help children move from understanding in spoken language to understanding how the sound structure in spoken language applies to print.

Letter Connections develops children's knowledge of sound-symbol correspondences by leading children through a series of tasks designed to develop awareness of letter-sound correspondences in different contexts such as asking students to decode, blend and identify onsets and rime units, individual letters and eventually whole words. By presenting children with different linguistic units, Letter Connections helps children analyze and synthesize important components of words while building upon what they know about spoken language and what they are learning about print. The systematic progression through which children are taken when playing Letter Connections games is based upon years of developmental spelling research. Letter Connections provides practice that takes children from segmenting sentences into words to blending individual letters and sounds to make a whole word. Letter Connections gradually fades auditory support and visual cues to develop children's ability to match spoken sounds and words to printed letters, words and sentences. In addition, Letter Connections provides opportunities for children to exercise these skills by using nonwords. Nonwords challenge children's decoding and spelling skill by encouraging them to transfer what they know about familiar words to read and spell unfamiliar letter strings.

Letter Connections carefully teaches children to develop automatic letter and word recognition skills. Letter Connections systematically decreases the amount of response time available to students, gradually encouraging children to recognize and identify words more quickly and accurately. Letter Connections also fades visual cues and auditory feedback to help children develop automatic word recognition and use visual orthographic images. All games require children to apply letter-sound correspondences and pattern recognition skills in the context of words, providing multiple exposures to a variety of common spelling patterns, decodable real words and non-decodable sight words.

Letter Connections uses regular, frequently occurring English spelling patterns to teach children to recognize common rime units among words. The games do not stop at the onset-rime level They progressively present information designed to develop children's awareness of the internal characteristics of common spelling patterns, thereby bridging the gap between whole word recognition and decoding with individual letter-sound correspondences. Letter Connections incorporates sorting tasks that encourage development of children's knowledge of regularity in larger linguistic units (rimes), but gradually increase difficulty by focusing children on medial vowels or final consonants with visual cues and more complex sorting requirements This training takes children beyond the regularity of regular rime units and encourages them to examine the constituent linguistic units that differentiate one rime pattern from the next. Letter Connections reduces reaction time and gradually fades visual cues to increase word reading fluency and use of visual orthographic images.

The phonological reading and spelling system and method in accordance with the invention may train and diagnose problems with a user's auditory processing, phonological awareness and processing skills that are important to the development of reading and spelling skills of the user. In addition, the system in accordance with the invention also introduces morphological awareness and visual orthographic memory training and diagnosis. In more detail, the training provided by the system bridges a user's auditory processing skills, phonological awareness skills, morphological awareness skills and visual orthographic memory skills with print awareness and phonics, decoding and spelling instruction. Thus, as suggested by various research studies, the training provided by the system begins with phonological awareness skills and then transitions automatically to the concurrent teaching and training of phonological awareness skills with sound-symbol correspondences (phonics). The training provided by the system in accordance with the invention also permits a user, such as a child, to apply his/her morphological awareness and knowledge of phonics to decoding printed words. The training provided by the system in accordance with the invention also provides spelling instruction to the user which has a positive effect on the user's phonological awareness and decoding skills.

The training provided by the system in accordance with the invention may be from one or more different modules which train one or more particular sets of phonological awareness and processing, auditory processing, morphological awareness and visual orthographic memory (VOM) skills of the user. Each module may include one or more tasks wherein each task may train a particular skill or set of skills of the user. In a preferred embodiment, the system may include four different modules including a sentence/syllable/sound segmentation and discrimination module (called "Rock On" in the preferred embodiment), a segmentation/blending and decoding/spelling module (called "Slurp & Burp in the preferred embodiment), a sound/symbol module (called "Letter Express" in the preferred embodiment) and a sound and word recognition module (called "Juggling Letters" in the preferred embodiment). Each task within a module may be a game with an interactive graphical user interface that requires user input. Each game may also include a scoring mechanism to track the user's progress. The system may store the scores for each user so that the scores for a particular user may be analyzed later. In addition to training the user's skills, the system may be used to diagnose defects in one or more skill areas of the user, making performance comparisons within and across tasks to help determine areas of strength, weakness and variables that influence both.

Thus, in accordance with the invention, a device and method for training one or more reading and spelling skills of a user including phonological and morphological skills is provided. The device has a graphical display that displays images to a user and a user input device that permits the user to interact with the computer. The device may further include a game that presents stimuli to the user so that the user can respond to the stimuli and improve the reading and spelling skills of the user wherein the game further comprises a phonological skills training portion for training the phonological skills of the user and a sound/symbol correspondence training portion for training the sound/symbol correspondence skills of the user wherein the game trains the phonological skills of the user and then transitions to training the sound/symbol correspondence skills once the phonological skills are mastered (Holy! That sentence is tinged with Faulknerism).

In accordance with another aspect of the invention, a method and computer-implemented system for training a user's spelling and reading skills is provided. The system visually presents a target word to the user for a predetermined time and then visually presents a series of words to the user after the target word is removed. The system then prompts the user to identify the word in the series of words whose letters are in reverse order to the target word.

In accordance with yet another aspect of the invention, a method and computer-implemented system for training a user's spelling and reading skills is provided. The system visually presents one or more words to the user and visually presents one or more categories into which the word is sorted by the user. The system then prompts the user to sort the one or more words into the one or more categories to improve the user's skills at recognizing patterns in words.

DETAILED DESCRIPTION OF A PREFERRED EMBODIMENT

The invention is particularly applicable to a computer-based training system for training a child's auditory processing, phonological awareness and processing, morphological awareness, visual orthographic memory (VOM), reading and spelling skills and it is in this,context that the invention will be described. It will be appreciated, however, that the system and method in accordance with the invention has greater utility since 1) it may be used to test and teach a variety of other individuals, such as illiterate and cognitively-impaired people, individuals whose native language is not English who are learning to read, and adolescents and adults who read poorly and wish to improve their literary skills; and 2) the system may be implemented on other computer networks, such as the Web, the Internet, a local area network or the like.

Figure 1:
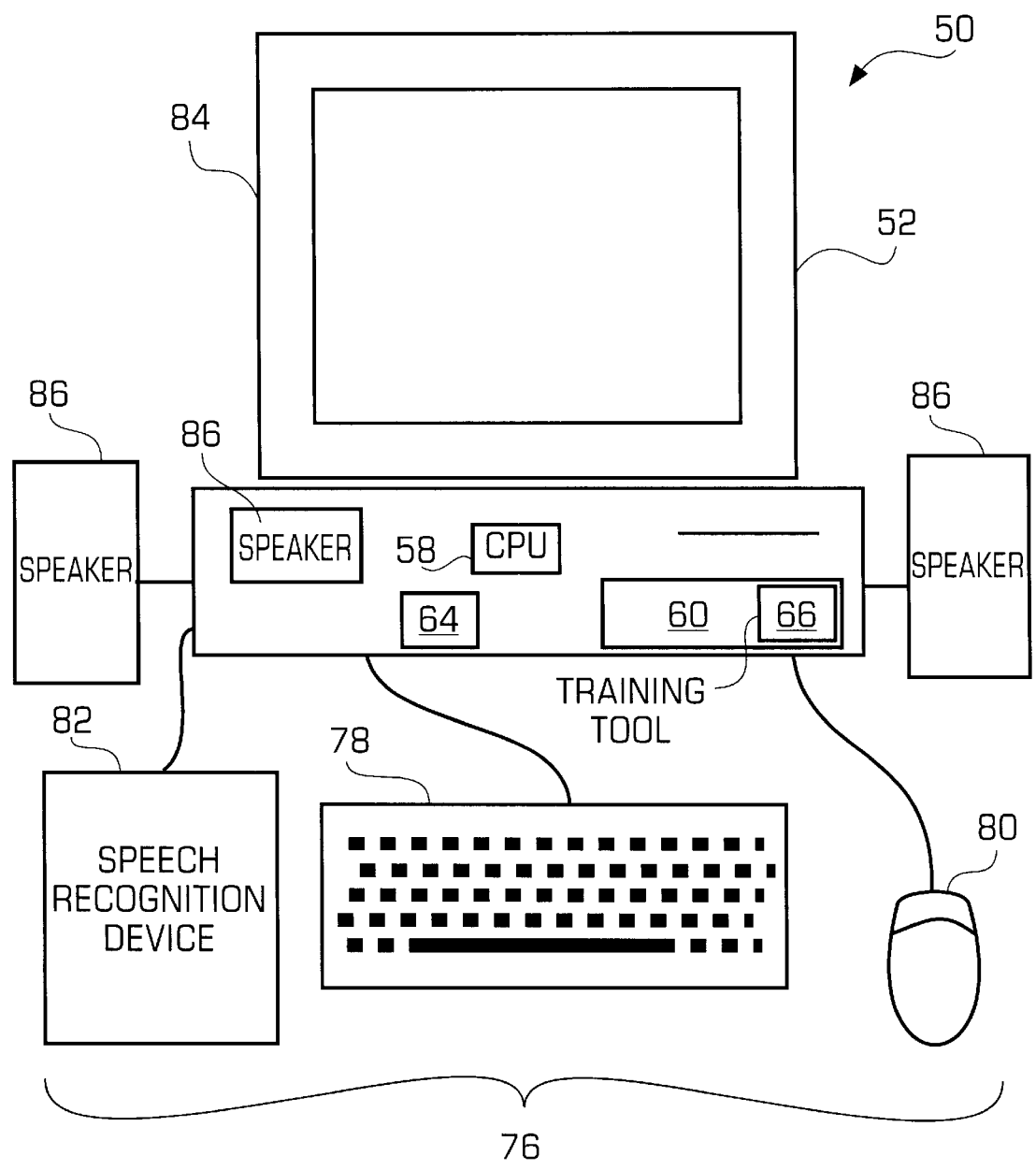
FIG. 1 is a block diagram illustrating a computer-based reading and spelling skills training system in accordance with the invention.

FIG. 1 is a block diagram illustrating an embodiment of a computer-based auditory processing, phonological awareness and processing, morphological awareness, VOM, reading and spelling skills training system 50 in accordance with the invention. In this embodiment, the training system 50 may be executed by a computer 52. The computer 52 may be a stand-alone personal computer or a computer connected to a network or a client computer connected to a server.

In general, training in accordance with the invention may be computer-based that provides opportunities for a variety of different individuals to access and participate in the training with alternative media that can be provided in a variety of locations and environments using, for example, stand-alone computers, networked computers or client/server web-based systems. In accordance with the invention, the invention may be implemented over a computer network, including the web, the Internet, a LAN, a WAN or the like wherein the user interacts with a server computer using a browser application and may download one or more updates/changes to the games over the computer network. For purposes of illustration, an embodiment using a stand-alone computer 52 will be described.

A computer 52 may include a central processing unit (CPU) 58, a memory 60, a persistent storage device 64, such as a hard disk drive, a tape drive an optical drive or the like and a training tool 66. In a preferred embodiment, the training tool may be one or more software applications (training different auditory processing, phonological awareness and processing, morphological awareness, VOM, spelling skills or reading skills) stored in the persistent storage of the computer that may be loaded into the memory 60 (as shown in FIG. 1) so that the training tool may be executed by the CPU 58. The computer 52 may be connected to a remote server or other computer network that permits the computer 52 to receive updates to the training tool over the computer network. The training tool may also be used in conjunction with the diagnostic system as described in U.S. patent application Ser. No. 09/350,791, filed Jul. 9, 1999 that is owned by the same assignee as the present application and is incorporated herein by reference.

The computer 52 may further include one or more input devices 76 such as a keyboard 78, a mouse 80, a joystick, a speech recognition system 82 or the like, a display 84 such as a typical cathode ray tube, a flat panel display or the like and one or more output devices 86 such as a speaker for producing sounds or a printer for producing printed output. The input and output devices permit a user of the computer to interact with the training tool so that the user's skills at various auditory processing, phonological awareness and processing, morphological awareness, VOM and other reading and spelling skills are improved. For example, the speech recognition system permits the user to speak into the speech recognition system 82 in response to a stimulus from the training tool as described below. The computer 52 may also execute a browser software application in order to interact with the diagnostic system as described above and download one or more updates to the training tool.

As described below in more detail, the training tool may include one or more different modules that train various auditory processing, phonological awareness and processing, morphological awareness, VOM and reading and spelling skills so that a child's proficiency at these skills may be increased. The training tool 66 may keep track of a user's scores in each skill area and adaptively change the difficulty of each game in each task in the training tool based on the user's current skills. For example, the training tool may either increase or decrease the difficulty of the training. As described below, the training tool may alter one or more difficulty variable of a current training (e.g., the similarly of two different words or sounds, the position of a sound in a word, the availability of visual cues and the like) to change the difficulty of the training. Now, more details of the training tool will be described.

Figure 2:
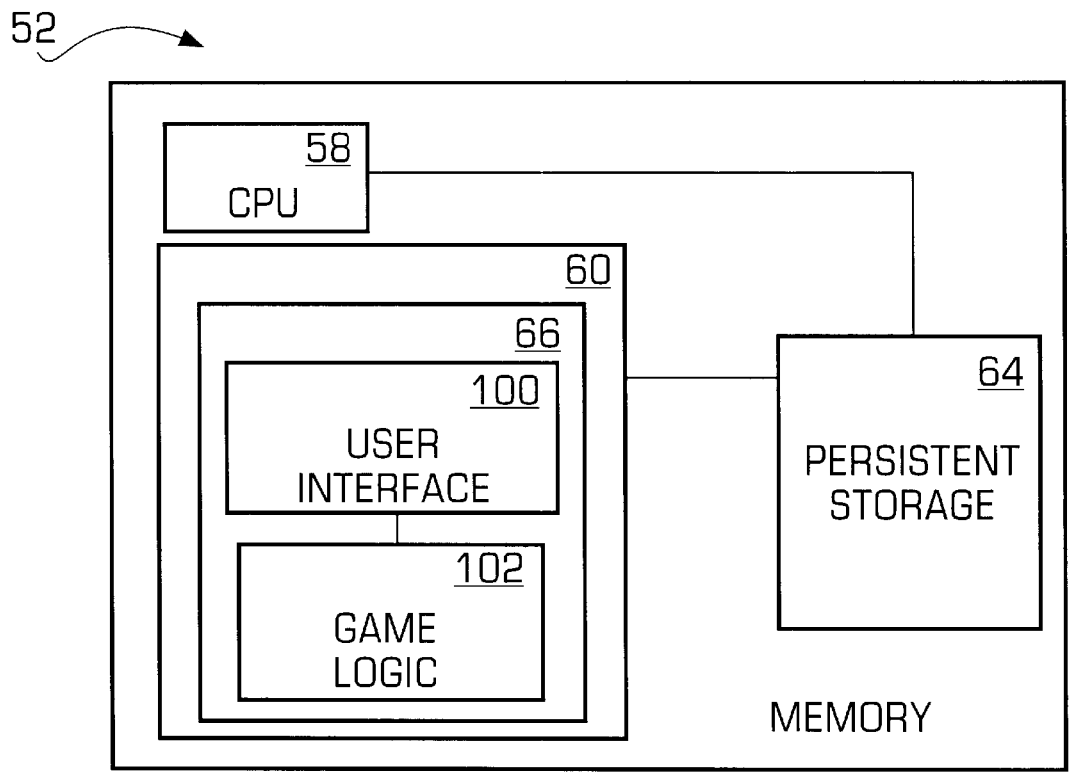
FIG. 2 is a diagram illustrating a preferred embodiment of the training tool of FIG. 1 in accordance with the invention including one or more modules that are used to train and assess one or more skills.

FIG. 2 is a diagram illustrating more details of the computer 52 that may be a part of the training system of FIG. 1. The computer 52 may include the CPU 58, the memory 60, the persistent storage device 64 and the training tool 66. The training tool 66 may further comprise one or more software applications including a user interface (UI) 100 and game logic 102. The user interface may generate multiple images and audible sounds that are viewed and heard and responded to by the user using the input devices in order to train the user in various auditory processing, phonological awareness and processing, morphological awareness, VOM and spelling and reading skill areas (the "skills"). The game logic 102 may store the one or more modules (each module including one or more tasks/games) that make up the training tool wherein each module may train the user in a different set of skills. As each task is being executed by the CPU 58 of the computer system, it may be loaded from the persistent storage device 64 into the memory 60 so that it may be executed by the CPU. As shown in FIG. 2, the user interface 100 and the game logic 102 are shown loaded into the memory 60 since the training tool is being executed by the CPU.

The training tool in accordance with the invention may use games to train the user since the user may be a child that is more likely to be willing to learn when given a game to play. In other words, the child may be playing the game and, without realizing it, may also be training and improving a particular skill. The training tool may also obviously be implemented using similar games with different user interfaces for adult users. Now, more details of the training tool in accordance with the invention will be described.

Figure 3:
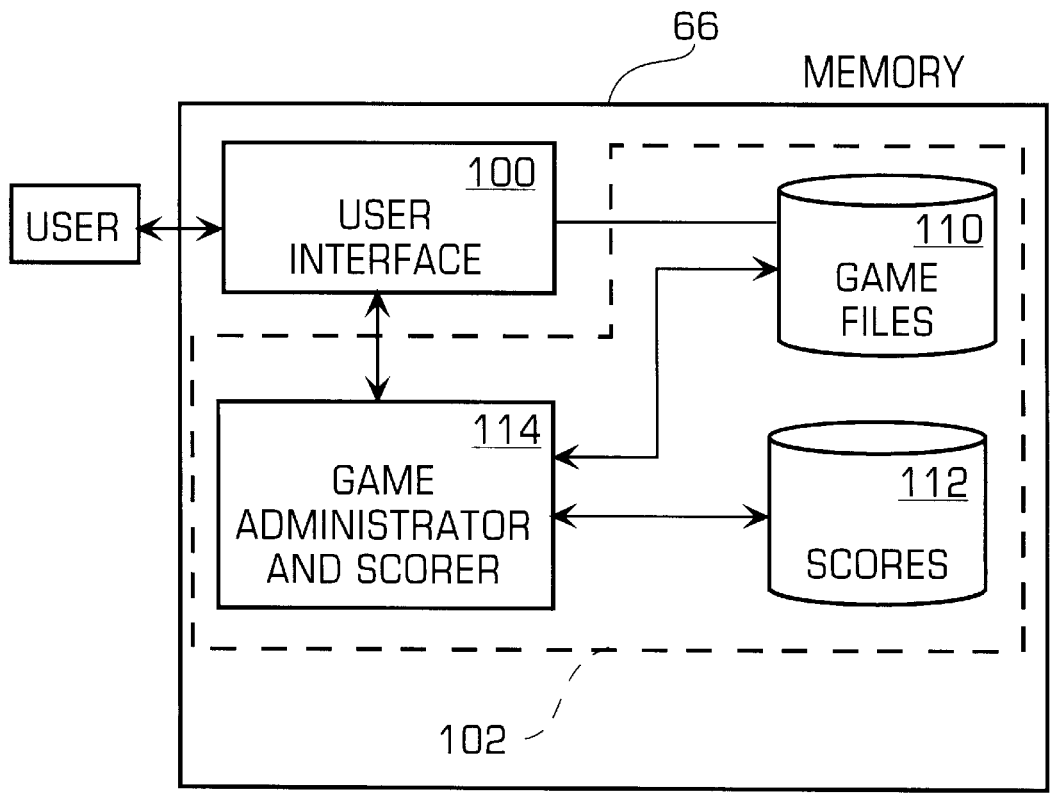
FIG. 3 is a diagram illustrating more details of the training tool of FIG. 2 in accordance with the invention.

FIG. 3 illustrates more details of the training tool 66 that includes the user interface 100 and the game logic 102. In more detail, the game logic 102 may include a game file database a score database 112 and a game administrator and scorer module 114. The game file database may store one or more modules (and one or more games/tasks for each module) of the training tool wherein each module trains a different set of skills. Each module in the preferred embodiment will be described below with reference to FIGS. 4–8. As described above, the actual games contained in the training tool may be updated or changed. The score database 112 may store the scores for one or more users for the one or more games contained in the training tool. The score database 112 permits the user's progress at each skill to be monitored and analyzed. The game administrator and scorer module 114 controls which game is being played, the user interface for the particular game, the score of the particular game and the level of difficulty of each game. In this manner, the user of the training tool can track his/her score or progress but is preventing from changing parameters of the games that may be very important developmental stepping stones in literacy instruction. The system may automatically track and report the scores and progress of the each user that uses the system. The administrator also permits one or more different users to use the training tool on the same computer and keep track of each user separately. The administrator 114 may also permit the person monitoring the use of the system, such as a teacher, to control the games. For example, the teacher may control the amount of time permitted for each response or the teacher may set which games a particular user may have access to in order to prevent a child from playing the games that she/he is best at and the harder games. The teacher may also alter the mode of play between the continuous playing of a predetermined number of rounds of games before a break or playing the games one at a time. The teacher may also control the availability of audio replay so that a user may be permitted to re-listen to a stimulus repeatedly (easier) or may only be permitted to listen to a stimulus once.

The administrator 114 may also include statistical software applications (not shown) that permit the administrator 114 to generate statistics about the one or more users using the training tool. In the networked embodiments not shown here, the elements shown in FIG. 3 may be located on a server computer and the user may interact with the server computer using a browser application to play the games of the training tool and to receive updates/changes to the games from the server computer. Now, an example of the games included in the preferred embodiment of the training tool will be described.

Figure 4:
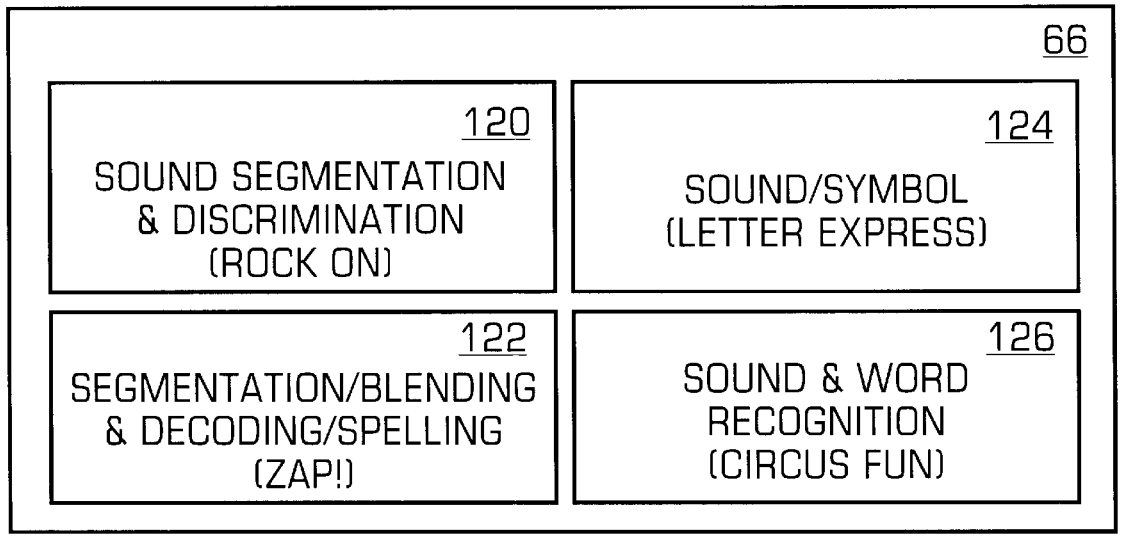
FIG. 4 is a diagram illustrating an example of the modules including in the training system in accordance with the invention.

FIG. 4 is a diagram illustrating an example of the tasks included in a preferred embodiment of the training tool 66 in accordance with the invention. The training tool 66 may include a sound segmentation and discrimination module 120 (called "Rock On" in this example), a segmentation/blending and decoding/spelling module 122 (called "Slurp & Burp" in this example), a sound/symbol module 124 (called "Letter Express" in this example) and a sound and word recognition module 126 (called "Juggling Letters" in this example). Each of these modules may train a set of one or more of the skills described above. Each module may include one or more tasks wherein each task may be an interactive game that trains a particular set of skills of the user. Each of the tasks embodied in each module will now be described in more detail. Further details of each module and each task/game is provided in the attached Appendix which is incorporated herein by reference. Now, the tasks/games in the sound segmentation and discrimination training module 120 will be described.

Figure 5:
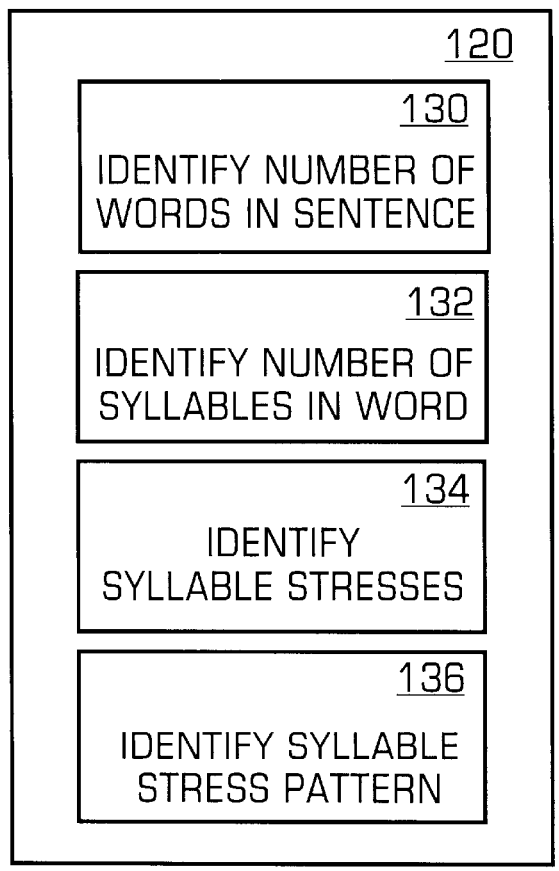
FIG. 5 is a diagram illustrating an example of the tasks in the sound segmentation and discrimination training module in accordance with the invention.

FIG. 5 is a diagram illustrating an example of the tasks and games in the sound segmentation and discrimination training module 120 in accordance with the invention. The sound segmentation and discrimination training module 120 may include a task 130 of identifying the number of words in a sentence, a task 132 of identifying the number of syllables in a word, a task 134 of discriminating syllable stresses in a word and a task 136 of identifying syllable stress patterns in a word. These tasks, together, train a user's skill at auditory attention, discrimination, short term memory, sequential memory, temporal ordering and temporal integration, pattern recognition, phonological sequencing, phonological segmentation and sight word recognition. For each module, the tasks may train a primary skill or a secondary skill. If the module or task manipulates learning variables to challenge and exercise a particular skill, then that skill is a primary skill being trained. If the task actively engages and requires a user a use a particular skill during the task, then the skill is a secondary skill. Thus, for this module, the primary skills being trained are segmenting sentences into words, discriminating syllable stresses, identifying syllable stresses, auditory short term memory, print awareness and auditory attention. The secondary skills being trained are left to right progression, discrimination of syllables and words, auditory pattern recognition and following oral directions.

For each task, the training method may generally include presenting a stimulus to the user, gathering a response from the user to the stimulus, analyzing the response for correctness and performance, providing feedback to the user and changing the difficulty of the task (by changing one or more difficulty variables) based on the user's performance.

In more detail, in the first task 130, the user is asked to detect and identify the number of words in a sentence at different difficulty levels by varying the difficulty variables in accordance with the invention. In this task, the user may advance to a harder difficulty level or fall back to an easier difficulty level based on the user's performance during the task. In this task, the difficulty variables may include changing the number of syllables in words (a word with more syllables is harder to identify), changing the phonological similarity of the words presented to the user (e.g., rhyming vs. non-rhyming), changing the availability of auditory feedback during user response and changing the availability of a printed display of the word. In the second task 132, the user is asked to identify the number of syllables in a word and the difficulty variables may include changing the availability of auditory feedback during user response and changing the availability of a printed display of the syllables. In the third task 134, the user is presented with two words and asked to identify whether the two presented words have the same syllable stresses. The difficulty variables in this task may include changing the number of syllables in a word and changing the availability of a visual cue to facilitate performance. In the fourth task 136, the user is presented with a word and asked to identify the syllable stress pattern in the word. The difficulty variables in this task may include changing the number of syllables in a word, changing the availability of auditory feedback to the user and changing the availability of visual cues to facilitate performance of the user. Each of these tasks is described in more detail in the attached Appendix. Now, the tasks associated with the blending/segmentation and decoding/spelling training module will be described.

Figure 6:
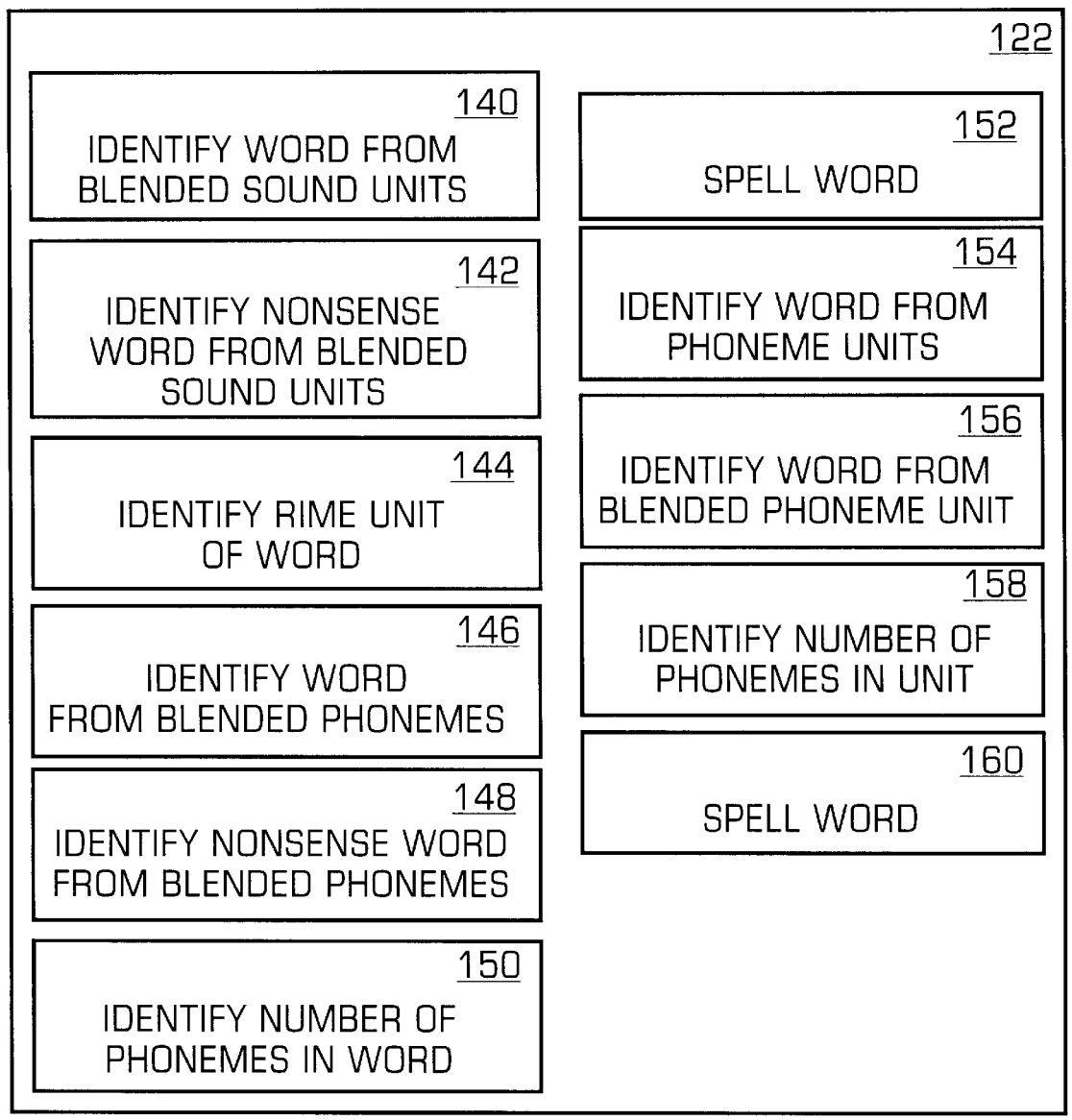
FIG. 6 is a diagram illustrating an example of the tasks in the segmentation/blending and decoding/spelling training module in accordance with the invention.

FIG. 6 is a diagram illustrating an example of the tasks and games in the blending/segmentation and decoding/spelling training module 122 in accordance with the invention. The blending/segmentation and decoding/spelling training module 122 may include a task 140 of identifying a word from blending sound units, a task 142 of identifying a nonsense word from blending sound units, a task 144 of identifying rime units of a word, a task 146 of identifying a word from blending phonemes, a task 148 of identifying a nonsense word from blending phonemes, a task 150 of identifying the number of phonemes in a word, a task 152 of spelling a word, a task 154 of identifying a word from blending phoneme units, a second task 156 of identifying a word from blending phoneme units, a task 158 of identifying the number of phonemes in a sound unit and a task 160 of spelling a word. These tasks, together, train a user's skill at blending onset-rime, recognizing word endings, segmenting phonemes, deleting phonemes, word identification, decoding and spelling. Thus, for this module, the primary skills being trained are auditory attention, discrimination, short term memory, phonological blending, phonological segmentation, phonological identification, phonological sequencing, phonological working memory, sequential verbal memory, phonetic decoding, visual orthographic memory and phonetic spelling. The secondary skills being trained are letter recognition, oral directions, left-to-right progression, sight recognition, vocabulary and keyboard entry.

For each task, the training method may generally include presenting a stimulus to the user, gathering a response from the user to the stimulus, analyzing the response for correctness and performance, providing feedback to the user and changing the difficulty of the task (by changing one or more difficulty variables) based on the user's performance.

In more detail, in the first task 140, the user is presented with an onset and a rime separated by a period of time and asked to detect and identify the word created by blending the onset and rime sound units together at different difficulty levels by varying one or more difficulty variables in accordance with the invention. In the tasks described herein, the user may advance to a harder difficulty level or fall back to an easier difficulty level based on the user's performance during the task. In the task 140, the difficulty variables may include changing the time between the onset and the rime, changing the perceptual similarity of the response choices and changing the presentation of the word to the user (e.g., auditory alone, auditory and visual or visual alone). In task 142, the user is presented with an onset and a rime sound unit and asked to identify a nonsense word when the onset and rime unit are blending together. The difficulty variables in this task are the same as for task 140. In the task 144, the user is presented with a word and asked to identify the rime unit in the word. The difficulty variables for this task may include changing the perceptual similarity of the response choices and changing the presentation of the word to the user (e.g., auditory alone, auditory and visual or visual alone). In task 146, the user is presented with individual phonemes separated by a predetermined time and asked to identify the word generated by blending the presented phonemes together. The difficulty variables in this task may include changing the time period between the phonemes, changing the perceptual similarity of the response choices and changing the presentation of the word to the user (e.g., auditory alone, auditory and visual or visual alone).

In task 148, the user is presented with individual phonemes separated by a predetermined time and asked to identify the nonsense word generated by blending the presented phonemes together. The difficulty variables for this task may include changing the time period between the phonemes, changing the perceptual similarity of the response choices and changing the presentation of the word to the user (e.g., auditory alone, auditory and visual or visual alone). In task 150, the user is presented with a word and asked to identify the number of phonemes in the word. The difficulty variables for this task may include changing the type of the word (e.g., from a real word or a nonsense word), changing the availability of auditory feedback and changing the visual display of the graphemes. In task 152, the user is presented with a word and asked to spell the word. The difficulty variables for this task may include changing the availability of auditory feedback and changing the availability of auditory cues. In task 154, the user is presented with a series of phonemes, such as CVCC (consonant, vowel, consonant and consonant) separated by a predetermined time and is asked to identify the word created by blending the phonemes together. The difficulty variables for this task may include changing the predetermined time between the phonemes, changing the perceptual saliency of the phonemes and changing the presentation format of the phonemes to the user (e.g., auditory alone, auditory and visual or visual alone). In task 156, the user is presented with a series of phonemes, such as CCVC (consonant, consonant, vowel and consonant) separated by a predetermined time and is asked to identify the word created by blending the phonemes together. The difficulty variables for this task may include changing the predetermined time between the phonemes, changing the perceptual saliency of the phonemes and changing the presentation format of the phonemes to the user (e.g., auditory alone, auditory and visual or visual alone).

In task 158, the user is presented with a sound unit and is asked to identify the number of phonemes in the sound unit. The difficulty variables for this task may include changing the phonetic saliency of the phonemes, changing the availability of auditory feedback and changing the availability of visual display of the graphemes. In task 160, the user is presented with a word and is asked to spell the word. The difficulty variables for this task may include changing the phonetic saliency of the word, changing the availability of auditory feedback and changing the availability of auditory cues. Each of these tasks is described in more detail in the attached Appendix. Now, the tasks associated with the sound/symbol training module will be described.

Figure 7:
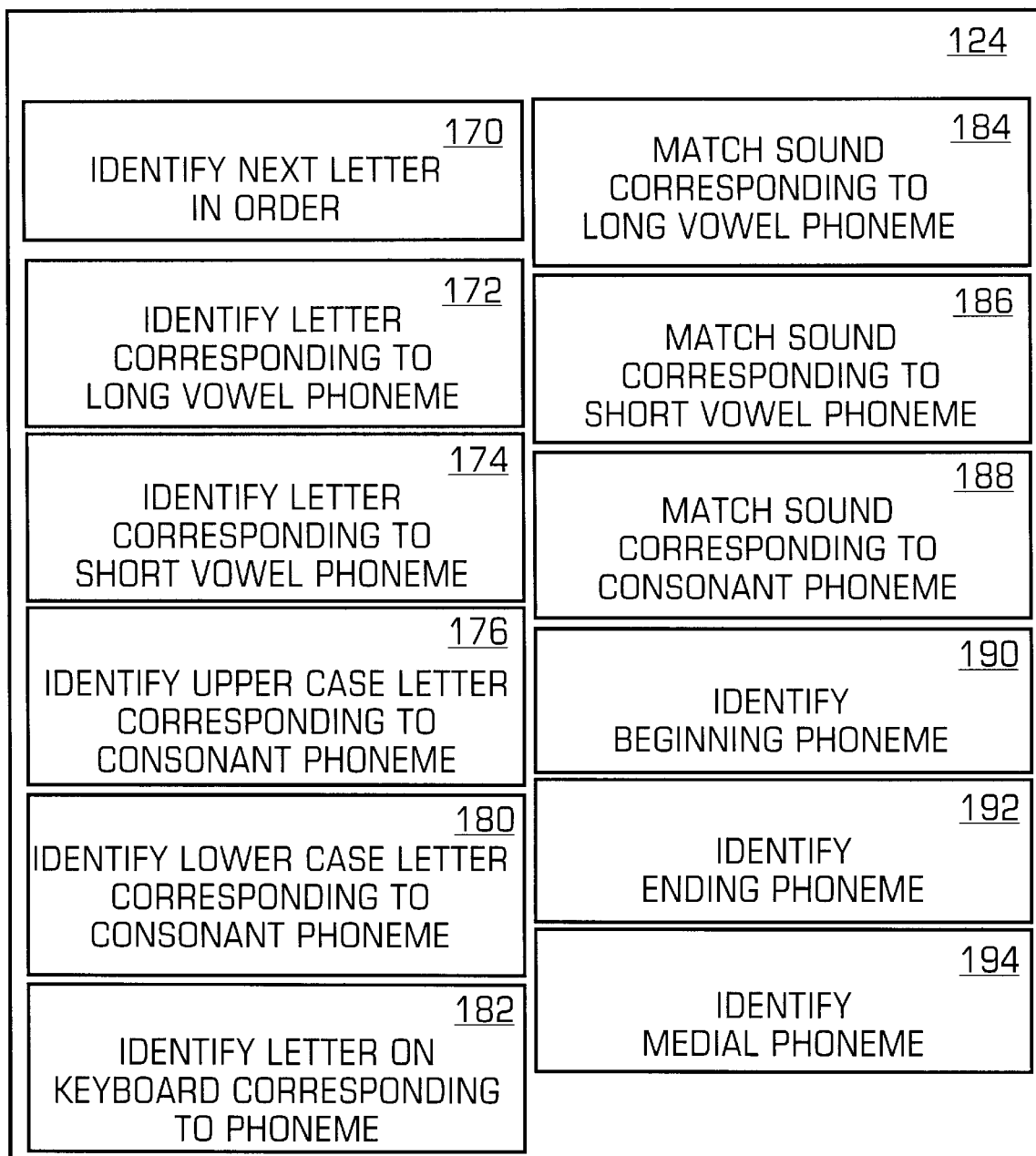
FIG. 7 is a diagram illustrating an example of the tasks in the sound/symbol training module in accordance with the invention.

FIG. 7 is a diagram illustrating an example of the tasks and games in the sound/symbol training module 124 in accordance with the invention. The sound/symbol module 124 may include a task 170 of identifying the next letter in an order, a task 172 of identifying letters corresponding to a long vowel phoneme, a task 174 of identifying letters corresponding to a short vowel phoneme, a task 176 of identifying an upper case letter corresponding to a consonant phoneme, a task 180 of identifying the lower case letter corresponding to a consonant phoneme, a task 182 of typing the letter on the keyboard corresponding to a phoneme, a task 184 of matching long vowel phonemes, a task 186 of matching short vowel phonemes, a task 188 of matching consonant phonemes, a task 190 of identifying a beginning phoneme, a task 192 of identifying a ending phoneme and a task 192 of identifying a medial phoneme. These tasks, together, train a user's skill at auditory attention, discrimination, short term memory, phonological segmentation, identification, sequencing, manipulation, closure, working memory, letter recognition, letter naming, alphabetic order, sound/symbol correspondence, spoken language processing, left-to-right progression, visual memory for orthographic images and spelling. The primary skills being trained are short term memory, discrimination, phonological segmentation, phonological identification, phonological manipulation, phonological working memory, letter recognition, alphabetic order, sound/symbol correspondence, visual orthographic memory and phonetic spelling. The secondary skills being trained are left-to-right progression, keyboard entry, oral directions and attention.

For each task, the training method may generally include presenting a stimulus to the user, gathering a response from the user to the stimulus, analyzing the response for correctness and performance, providing feedback to the user and changing the difficulty of the task (by changing one or more difficulty variables) based on the user's performance.

In more detail, in task 170, the user is presented with a letter of the alphabet and is asked to identify the next letter in the alphabet at different difficulty levels by varying one or more difficulty variables in accordance with the invention. In this task, the user may advance to a harder difficulty level or fall back to an easier difficulty level based on the user's performance during the task. In this task, the difficulty variables may include changing the position in the alphabet of the letter presented to the user, changing from the upper or lower case display of the letter and changing the visual cueing of the user. In the task 172, the user is presented with a long vowel phoneme and is asked to identify the visual representation (letter) of the long vowel phoneme. The difficulty variables for this task may include changing the availability of auditory cues, changing the availability of associated keywords, changing from the upper or lower case display of the letter and changing the visual cueing of the user. In task 174, the user is presented with a short vowel phoneme and is asked to identify the visual representation of the short vowel phoneme. The difficulty variables for this task may include changing the availability of auditory cues, changing the availability of associated keywords, changing from the upper or lower case display of the letter and changing the visual cueing of the user. In step 176, the user is presented with a consonant phoneme and is asked to identify the visual representation (an upper case letter) corresponding to the consonant phoneme. The difficulty variables for this task may include changing the availability of auditory cues, changing the availability of associated keywords and changing the phonetic similarity of the responses. In step 180, the user is presented with a consonant phoneme and is asked to identify the visual representation (a lower case letter) corresponding to the consonant phoneme. The difficulty variables for this task may include changing the availability of auditory cues, changing the availability of associated keywords and changing the phonetic similarity of the responses.

In task 182, the user is presented with a phoneme and is asked to select the corresponding letter on the keyboard. The difficulty variables for this task may include changing the perceptual saliency of the phoneme, changing the availability of the display of the printed letter and changing whether the letter is displayed as upper or lower case. In task 184, the user is presented with a long vowel phoneme and is asked to identify the matching sound. The difficulty variables for this task may include changing the number of response choices presented to the user, changing the availability of the display of the printed letter and changing whether the letter is displayed as upper or lower case. In task 186, the user is presented with a short vowel phoneme and is asked to identify the matching sound. The difficulty variables for this task may include changing the number of response choices presented to the user, changing the availability of the display of the printed letter and changing whether the letter is displayed as upper or lower case. In task 188, the user is presented with a consonant phoneme and is asked to identify the matching sound. The difficulty variables for this task may include changing the number of response choices presented to the user, changing the availability of the display of the printed letter and changing whether the letter is displayed as upper or lower case.

In task 190, the user is presented with a word and asked to identify the beginning phoneme of the word. The difficulty variables for this task may include changing the type of word (real vs. nonsense), changing the format of the response choices (e.g., auditory only, auditory and visual or visual only) and changing the phonetic similarity of the response choices. In task 192, the user is presented with a word and asked to identify the ending phoneme of the word. The difficulty variables for this task may include changing the type of word (real vs. nonsense), changing the format of the response choices (e.g., auditory only, auditory and visual or visual only) and changing the phonetic similarity of the response choices. In task 194, the user is presented with a word and asked to identify the medial phoneme of the word. The difficulty variables for this task may include changing the type of word (real vs. nonsense), changing the format of the response choices (e.g., auditory only, auditory and visual or visual only) and changing the phonetic similarity of the response choices. Each of these tasks is described in more detail in the attached Appendix. Now, the tasks associated with the sound and word recognition training module will be described.

Figure 8:
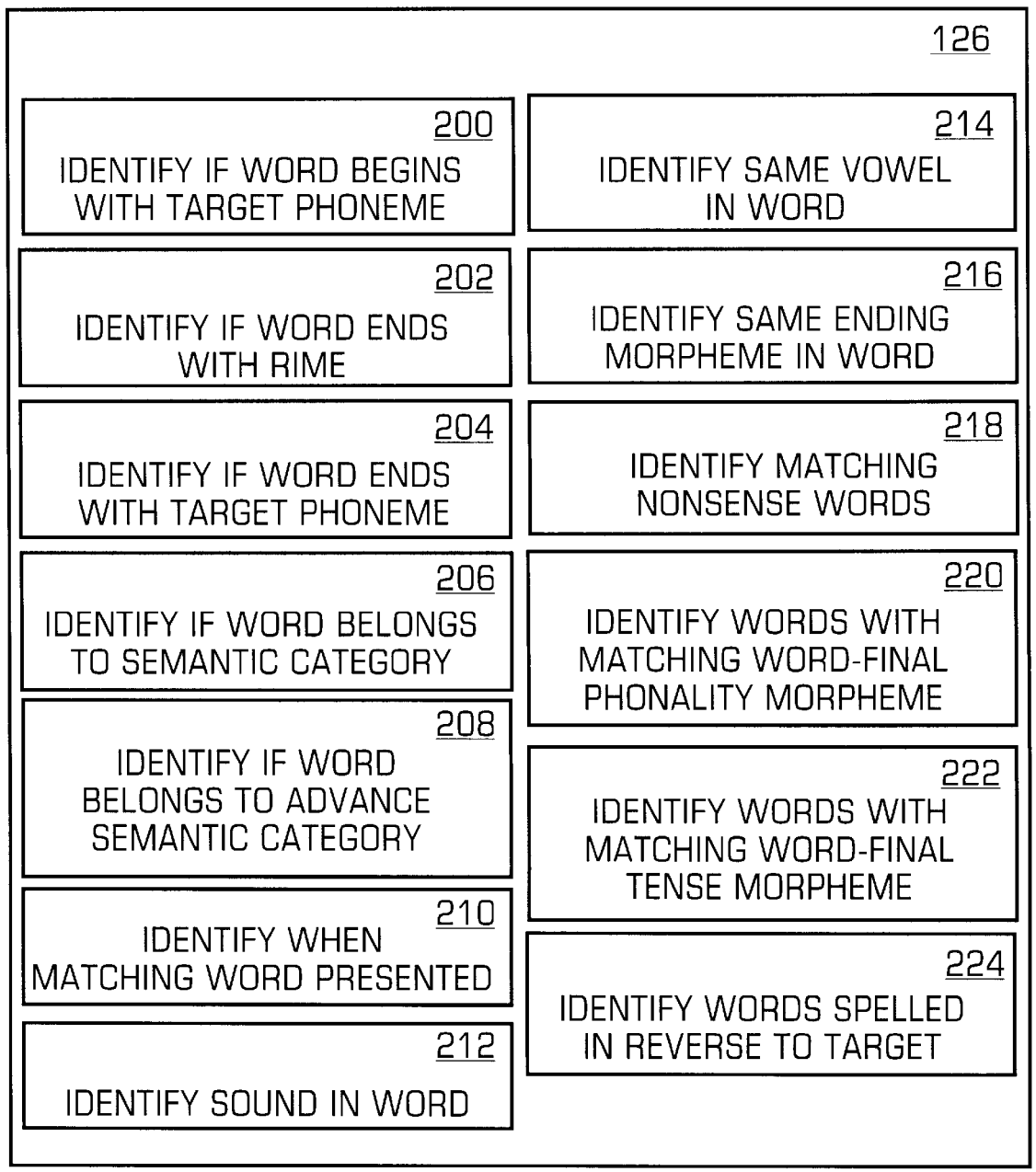
FIG. 8 is a diagram illustrating an example of the tasks in the sound and word recognition training module in accordance with the invention.

FIG. 8 is a diagram illustrating an example of the tasks and games in the sound and word recognition training module 126 in accordance with the invention. The letter training module 122 may include a task 200 of sorting words based on a beginning target phoneme, a task 202 of sorting words based on an ending rime, a task 204 of sorting words based on an ending target phoneme, tasks 206, 208 of sorting words into one or more semantic categories, a task 210 of recognizing words, a task 212 of identifying a sound in a word, a task 214 of identifying a vowel in a word, a task 216 of identifying the same ending morpheme in a word, a task 218 of identifying matching nonsense words, a task 220 of identifying words with matching word-final plurality morphemes, a task 222 of identifying words with matching word-final tense morphemes, and a task 224 of identifying words spelled in reverse to the target word. These tasks, together, train a user's skill at auditory attention, vigilance, discrimination, short term memory, phonological identification and sequencing, rhyming, morphological segmentation and identification, letter recognition, sound/symbol correspondence, decoding, sight recognition, visual orthographic memory, reading fluency, and semantic word classification. In particular, the primary skills being trained are auditory attention, auditory short term memory, auditory & phoneme discrimination (syllable sound patterns, vowels, consonants, syllables, words), phoneme identification (recognizing a sound in a word), morpheme identification (recognizing inflectional morphemes, morphological identification (Inflected Morphemes: plurals & verb markers), comprehension of linguistic concepts, letter recognition, sound-symbol correspondence (short vowels, consonants, consonant digraphs, consonant blends, rimes), orthographic knowledge, visual orthographic memory, sight word recognition (printed syllables and words), reading fluency (words in isolation), reading comprehension (vocabulary), decoding with use of morphological knowledge and semantic classification. The secondary skills being trained are rhyme (identify rhyming word), following oral directions and morphophonemic spelling.

For each task, the training method may generally include presenting a stimulus to the user, gathering a response from the user to the stimulus, analyzing the response for correctness and performance, providing feedback to the user and changing the difficulty of the task (by changing one or more difficulty variables) based on the user's performance. For each of the tasks in this module, a difficulty variable may include adaptively changing the time permitted for a response.

In more detail, in the task 200, the user is presented with a target phoneme, such as a consonant, and a word and is asked to sort the word based on the target phoneme at different difficulty levels by varying the difficulty variables in accordance with the invention. In this task, the user may advance to a harder difficulty level or fall back to an easier difficulty level based on the user's performance during the task. In this task, the difficulty variables may include changing the presentation format (e.g., auditory only, visual and auditory or visual only), changing the availability of auditory cues and changing the time permitted for a response. In the task 202, the user is presented with a target phoneme, such as a rime containing a short vowel, and a word and is asked to sort the word based on the target rime at different difficulty levels by varying the difficulty variables in accordance with the invention. In this task, the difficulty variables may include changing the presentation format (e.g., auditory only, visual and auditory or visual only), changing the availability of auditory cues and changing the time permitted for a response. In the task 204, the user is presented with a target phoneme and a word and is asked to sort the word based on the target phoneme at the end of the word at different difficulty levels by varying the difficulty variables in accordance with the invention. In this task the difficulty variables may include changing the presentation format (e.g., auditory only, visual and auditory or visual only), changing the availability of auditory cues and changing the time permitted for a response.

In tasks 206 and 208, the user is presented with a semantic category and a word and is asked to sort the word as it belongs into one or more semantic categories. The difficulty variables for this task may include changing the presentation format (e.g., auditory only, visual and auditory or visual only), changing the availability of auditory cues and changing the time permitted for a response. In task 210, the user is presented with a target word, such as a high frequency sight word, and a series of words and is asked to identify a word in the series that matches the target word. The difficulty variables for this task may include changing the presentation format of the target word (e.g., auditory only, visual and auditory or visual only), changing the availability of auditory cues, changing the time permitted for a response and changing the presentation format of the series of word (e.g., auditory or visual).

In task 212, the user is presented with a word and asked to identify a word that begins with the same sound heard at the end of the first presented word. The difficulty variables for this task may include changing the availability of auditory cues, changing the availability of a visual display, and changing the time permitted for a response. In task 214, the user is presented with a word and asked to identify a word that contains the same medial vowel as the first presented word. The difficulty variables for this task may include changing the availability of auditory cues, changing the availability of a visual display, and changing the time permitted for a response. In task 216, the user is presented with a word and asked to identify a word that ends with the same ending morpheme as first presented word. The difficulty variables for this task may include changing the availability of auditory cues, changing the availability of a visual display, and changing the time permitted for a response.

In task 218, the user is presented with a nonsense target word and a series of words and is asked to identify the word in the series that matches the target word. The difficulty variables for this task may include changing the presentation format of the target word (e.g., auditory only, visual and auditory or visual only), changing the availability of visual cues, changing the time permitted for a response and changing the presentation format of the series of word (e.g., auditory or visual). In task 220, the user is presented with a target word, such as a real word containing target plurality morpheme, and a series of words and is asked to identify a Word in the series that matches the target word. The difficulty variables for this task may include changing the presentation format of the target word (e.g., auditory only, visual and auditory or visual only), changing the availability of visual cues, changing the time permitted for a response and changing the presentation format of the series of word (e.g., auditory or visual).

In task 222, the user is presented with a target word, such as a real word containing a target verb tense morpheme, and a series of words and is asked to identify a word in the series that matches the target word. The difficulty variables for this task may include changing the presentation format of the target word (e.g., auditory only, visual and auditory or visual only), changing the availability of visual cues, changing the time permitted for a response and changing the presentation format of the series of word (e.g., auditory or visual). In task 224, the user is presented with a printed word (real or nonsense) and a series of other words (real or nonsense) and is asked to identify when a word spelled in reverse to the target word in the series is presented to the user. The difficulty variables for this task may include changing the number of letters in the words, changing the availability of visual cues and changing the time permitted for a response. Each of these tasks is described in more detail in the attached Appendix.

In summary, the training system may include one or more tasks wherein each task may further include one or more games/sub-tasks. The combination of the various tasks and games described above permits a user's phonological awareness and processing, auditory processing, morphological awareness, VOM, reading and spelling skills to be trained and improved to improve the user's reading and spelling ability.

FIGS. 9A–12 are diagrams illustrating more details of each task in the sound segmentation and discrimination training module ("Rock On") in accordance with the invention. In a preferred embodiment of this module implemented in a product. Generally, the user may click on a button to catch the "Rap-A-Taps" rhythm by counting the number of words in sentences or identifying syllable stress patterns in words.

In an implementation of the preferred embodiment, there may be a first activity of segmenting words into syllables with eight different levels and a second activity of discriminating and identifying syllable stresses with twelve different levels. In the first activity, the Rap-A-Taps lead drummer (as described below) will present a 4–6 word sentence. The user may then wait for the speaker to appear on the screen to click the number of words heard in the sentence. During the activity, the user will first hear words and see musical notes that represent words in a sentence. The user then will har and see each word as the he/she clicks the mouse. After four consecutive responses, Rock On will automatically increase the level of difficulty by taking away the narration. As you jam with the band and masterfully complete each item, you will have to rely more upon your reading skills and print awareness. The band will continue to increase the difficulty by presenting sentences with non-rhyming words, then sentences with two syllable words. After two consecutive incorrect responses, the level of play will be decreased automatically.

In the second activity, students will first determine whether auditorily presented single-syllable words have the same or different stress. The user may click on the studio lights with the same color if the words have the same stress or click on the studio lights with different colors if the words have different stresses. After four consecutive correct responses, Rock On increases the difficulty by taking away visual cues displayed during the first level of play. When the student becomes proficient at discriminating stress in single syllable words, the student will have to identify two and three syllable words as having same or different syllable stress patterns. Printed syllables will be provided to help students develop mapping of spoken to printed syllables; however, after three consecutive correct responses, visual cues will be taken away and students will have to discriminate stress patterns based on what they hear.

At the highest levels, the user will be asked to identify syllable stress patterns by clicking on small or large color coded musical notes, representing low and high stress patterns. Students initially will be given visual and auditory cues to help them keep track of the syllable patterns in multi-syllable words. Students first will have to identify syllable stress patterns in 2-syllable words; however, the complexity of the game increases as children are asked to identify syllable stress in three syllable words and without visual cues or narration provided during response time. Rock On automatically decreases the level of play if children miss more than two consecutive items. In a preferred embodiment, for all of the tasks in the modules, the level of difficulty of the task is increased after four correct answers and it is decreased after two incorrect answers. In accordance with the invention, the number of correct answers that cause an increase in the difficulty level and the number of incorrect answers that cause a decrease in the difficulty level may be changed. Now, more details of each task of the sound segmentation and discrimination module will be described.

Figure 9A:
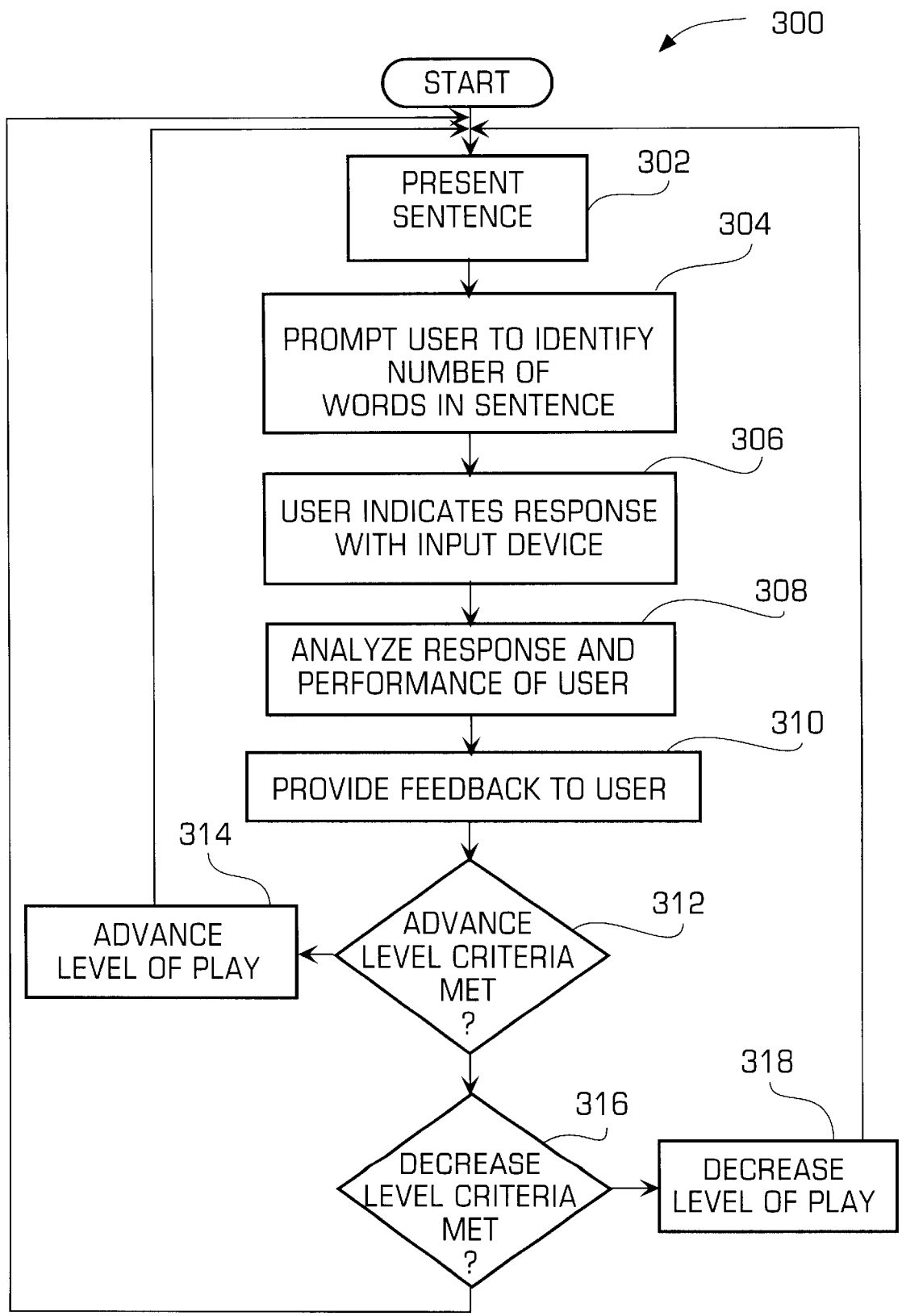
FIGS. 9A–12 are diagrams illustrating more details of each task in the sound segmentation and discrimination training module ("Rock On") in accordance with the invention.
Figure 9B:
Figure 9C:

FIG. 9A is a flowchart illustrating a first task 300 of the sound segmentation and discrimination module wherein the user is asked to identify the number of words in a sentence. An example of the user interface of the task is shown in FIGS. 9B and 9C and described in more detail below. The learning objective of this task is now described. The student will segment 4–6 word sentences into words. The sentences will consist of one syllable rhyming words, one syllable non-rhyming words, one & two syllable rhyming words or one & two syllable non-rhyming words. Auditory feedback will or will not be provided during response depending on the difficulty of the level and printed words will or will not be displayed during response based on the difficulty level.

In step 302, the system may visually or auditorily present a sentence to the user. The system may then prompt the user (either visually or with auditory instructions) to respond to the above stimuli in step 304 to identify the number of words in the sentence and the user may input a response in step 306 using an input device of the computer, such as the keyboard, the mouse, the speech recognition tool or the like. Once the computer system receives the response from the user, the system may analyze the user's response (e.g., correct or incorrect) in step 308 and the user's performance of the task (e.g., did the user respond within the allotted time?). In step 310, the system may provide feedback to the user about the user's performance in the task wherein the feedback may be visual or auditory. In step 312, the system determines if the criteria has been met to increase the level of difficulty of the task. The level of difficulty may be increased by changing one or more difficulty variables. In this task, the difficulty variables may include the number of syllables in a word, the phonological similarity of words (rhyming vs. non-rhyming), availability of auditory feedback and printed display of the word. If the advancement criteria has been met, then the level of difficulty is increased in step 314 and the method returns to step 302 to present the next task to the user at the higher difficulty level. If the advancement criteria is not met, then the system determines if the decrease level criteria has been met in step 31 6. The level of difficulty may be decreased by changing one or more of the above difficulty variables. If the decrease criteria has been met, then the level of difficulty is decreased in step 318 and the method returns to step 302 to present the next task to the user at the lower level of difficulty. If the decrease level criteria has also not been met, then the task continues at the same level and loops back to step 302. In this manner, the above task may be used to train a user's skills.

FIGS. 9B and 9C illustrate examples of a user interface 320 of the first task wherein a rock band is shown. The user interface may also include a pause button 322 to permit the user to pause the training at any time, one or more areas 324 that change color as the user indicates the number of words in the spoken sentence so that the user has a visual clue. The user interface may also include a timer 326 which alerts the user to the amount of time that the user has remaining to answer the current task. The time that is takes the user to respond affects the performance rating of the user for the particular task.

Figure 10:
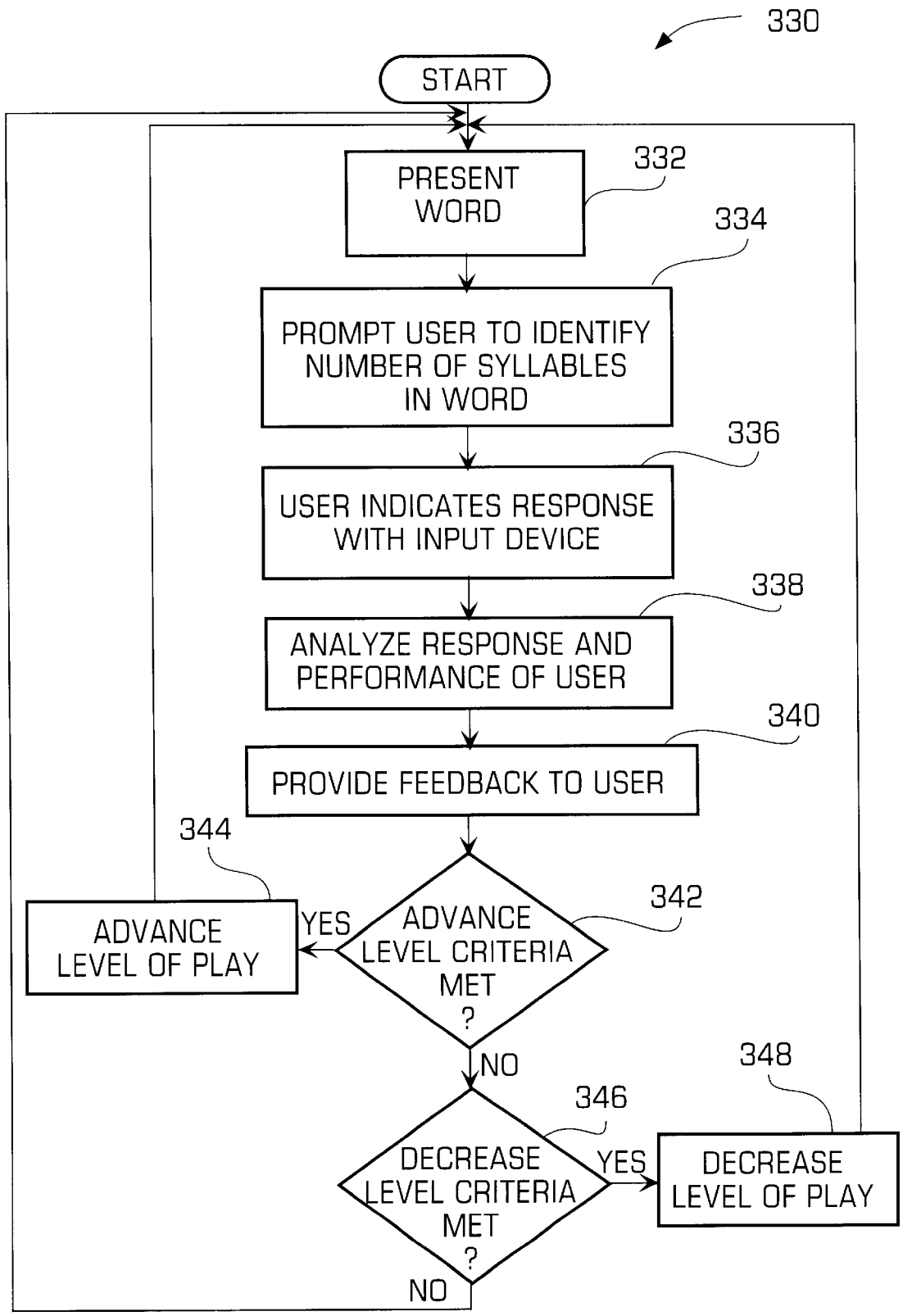

FIG. 10 is a flowchart illustrating a second task 330 of the first module wherein the user is asked to identify the number of syllables in a word. The student will segment 1–4 syllable words into syllables. To change the difficulty of the task, auditory feedback will or will not be provided during the response and printed syllables will or will not be displayed during the response.

In step 332, the system may present the user with a word. The system may then prompt the user to respond to the above stimuli in step 334 by identifying the number of syllables in the presented word and the user may input a response in step 336 using an input device of the computer, such as the keyboard, the mouse, the speech recognition tool or the like. Once the computer system receives the response from the user, the system may analyze the user's response (e.g., correct or incorrect) in step 338 and the user's performance of the task (e.g., did the user respond within the allotted time?). In step 340, the system may provide feedback to the user about the user's performance in the task wherein the feedback may be visual or auditory. In step 342, the system determines if the criteria has been met to increase the level of difficulty of the task. The level of difficulty may be increased by changing one or more difficulty variables. In this task, the difficulty variables may include the availability of auditory feedback or the printed display of the syllables of the word. If the advancement criteria has been met, then the level of difficulty is increased in step 344 and the method returns to step 332 to present the next task to the user at the higher difficulty level. If the advancement criteria is not met, then the system determines if the decrease level criteria has been met in step 346. The level of difficulty may be decreased by changing one or more of the above difficulty variables. If the decrease criteria has been met, then the level of difficulty is decreased in step 348 and the method returns to step 332 to present the next task to the user at the lower level of difficulty. If the decrease level criteria has also not been met, then the task continues at the same level and loops back to step 332. In this manner, the above task may be used to train a user's skills.

Figure 11:
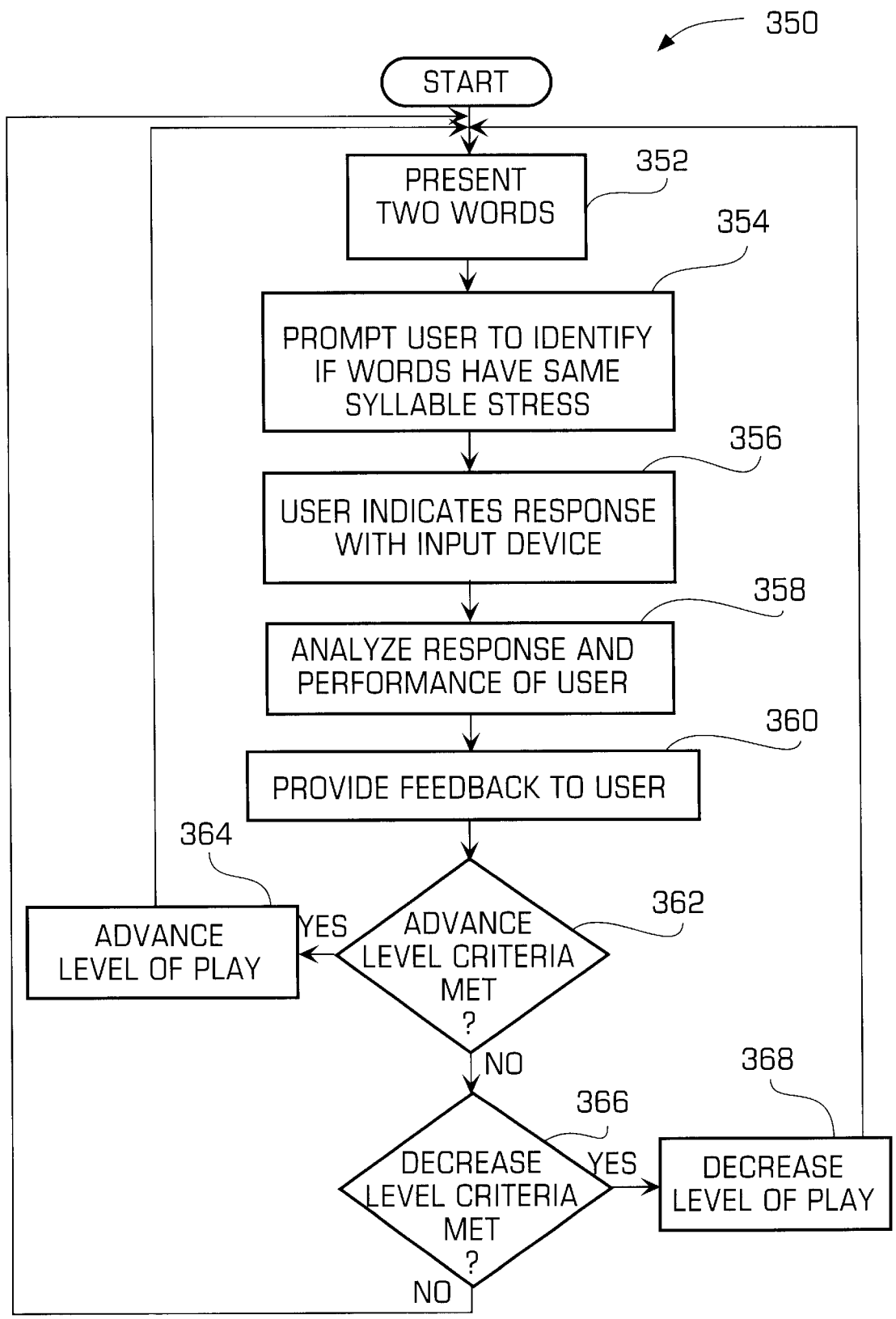

FIG. 11 is a flowchart illustrating a third task 350 of the first module wherein the user must identify the syllable stresses of a word. This task may actually be broken into two different sub-tasks wherein a first sub-task uses single syllables and a second sub-task uses multisyllabic words. In the first sub-task, the student will discriminate single syllable words as having same or different syllable stress when the words are auditorily presented with an inter-stimulus interval of 1.0 seconds. Visual cues will or will not be displayed to facilitate performance. In the second sub-task the student will identify multi-syllabic words as having same or different syllable stress patterns when the words are auditorily presented with an inter-stimulus interval of 1.0 seconds. Visual cues will or will not be displayed to facilitate performance.

In step 352, the system may present the user with two words either visually or orally. The system may then prompt the user to respond to the above stimuli by identifying if the two words have the same syllable stress in step 354 and the user may input a response in step 356 using an input device of the computer, such as the keyboard, the mouse, the speech recognition tool or the like. Once the computer system receives the response from the user, the system may analyze the user's response (e.g., correct or incorrect) in step 358 and the user's performance of the task (e.g., did the user respond within the allotted time?). In step 360, the system may provide feedback to the user about the user's performance in the task wherein the feedback may be visual or auditory. In step 362, the system determines if the criteria has been met to increase the level of difficulty of the task. The level of difficulty may be increased by changing one or more difficulty variables. In this task, the difficulty variables may include the number of syllables in the words or the availability of a visual cue to aid the user. If the advancement criteria has been met, then the level of difficulty is increased in step 364 and the method returns to step 352 to present the next task to the user at the higher difficulty level. If the advancement criteria is not met, then the system determines if the decrease level criteria has been met in step 366. The level of difficulty may be decreased by changing one or more difficulty variables as described above. If the decrease criteria has been met, then the level of difficulty is decreased in step 368 and the method returns to step 352 to present the next task to the user at the lower level of difficulty. If the decrease level criteria has also not been met, then the task continues at the same level and loops back to step 352. In this manner, the above task may be used to train a user's skills.

Figure 12:
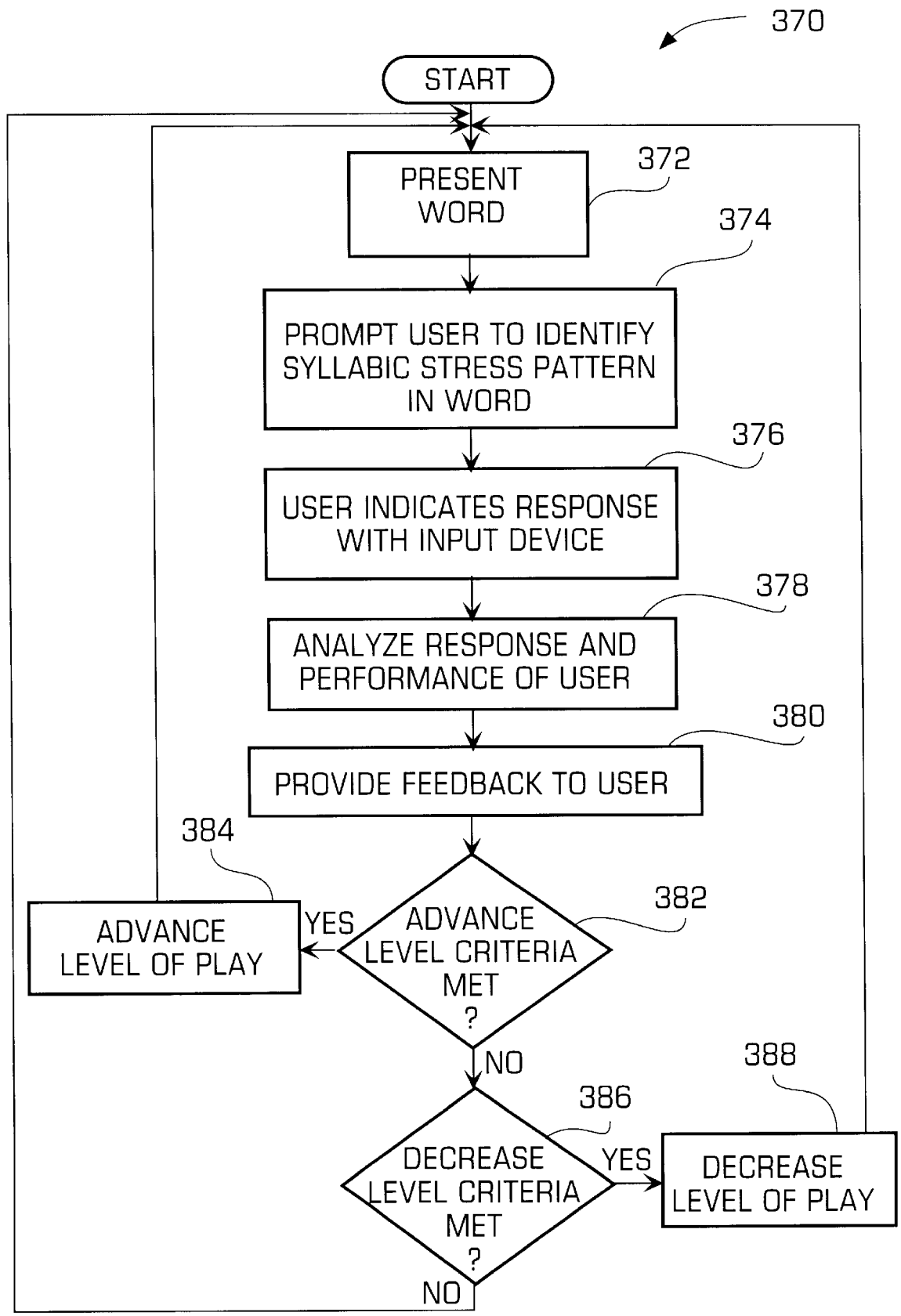

FIG. 12 illustrates a fourth task 370 of the first module wherein the user is presented with a word and prompted to identify the syllable stress patterns in the word. In this task, the student will replicate syllable stress patterns of multi-syllabic syllable words. Visual cues will or will not be displayed to facilitate performance.

In step 372, the system may present the user with a word. The system may then prompt the user to respond to the above stimuli by identifying the syllable stress patterns in the word in step 374 and the user may input a response in step 376 using an input device of the computer, such as the keyboard, the mouse, the speech recognition tool or the like. Once the computer system receives the response from the user, the system may analyze the user's response (e.g., correct or incorrect) in step 378 and the user's performance of the task (e.g., did the user respond within the allotted time?). In step 380, the system may provide feedback to the user about the user's performance in the task wherein the feedback may be visual or auditory. In step 382, the system determines if the criteria has been met to increase the level of difficulty of the task. The level of difficulty may be increased by changing one or more difficulty variables. In this task, the difficulty variables may include changing the number of syllables in the word, the availability of auditory feedback or the availability of visual cues. If the advancement criteria has been met, then the level of difficulty is increased in step 384 and the method returns to step 372 to present the next task to the user at the higher difficulty level. If the advancement criteria is not met, then the system determines if the decrease level criteria has been met in step 386. The level of difficulty may be decreased by changing one or more difficulty variables above. If the decrease criteria has been met, then the level of difficulty is decreased in step 388 and the method returns to step 372 to present the next task to the user at the lower level of difficulty. If the decrease level criteria has also not been met, then the task continues at the same level and loops back to step 372. In this manner, the above task may be used to train a user's skills. Using the above tasks, the sound segmentation and discrimination module may train the skills of the user as described above. Now, more details of the tasks of the segmentation/blending and decoding/spelling training module will be described.

FIGS. 13A–23 are diagrams illustrating more details of each task in the segmentation/blending and decoding/spelling training module ("ZAP!") in accordance with the invention. In a preferred implementation of this module, the user may click on a user interface element to "take a swim in the swamp" where students will learn to decode, spell and blend real and nonsense words. The user may watch baby frogs catch their lunch as students identify or spell onsets, rimes or whole words with short vowels, single consonants as well as initial and final consonant blends. The user may click on the Bog Frog to by-pass the demonstration items.

In the preferred implementation, the activities may include the following: which word is formed using these onsets and rimes? (16 levels), how do you spell CVC real and nonsense words? (6 levels), which word is formed using consonant and short vowel sounds? (12 levels), and how do you decode and spell CCVC, VCC and CVCC words? (18 levels). In more detail, he first activity involves the baby frogs presenting onsets and rimes that make a CVC word. Three pictures will appear on the side of the screen. Once the onset-rime segments have been presented, the speaker icon appears, and students can roll-over each of the pictures to have it pronounced for a clue. After three consecutive correct responses, Zap! automatically advances the game by increasing the amount of time between onset-rime segments or presenting answer choices that have the same rime, then onset as the target. Students initially are provided with auditory and visual cues, however, as they progress, they must rely on visual-only presentation to decode onset-rime targets. While the student becomes proficient in blending and decoding onset-rime segments for real words, Zap! continues to increase the difficulty by presenting nonsense words for blending and decoding tasks. At this level, children must roll-over the question marks on the screen for an auditory presentation of the answer choices. When children progress to the nonsense word level, they will gradually work their way through the progressive stages of difficulty they encountered during the real word task. After two consecutive incorrect responses, the game automatically adjusts by decreasing the level of difficulty for play. As in the previous levels, children gradually work their way through blending phonemes and letters to decoding phonemes and letters for real then nonsense words.

In the second activity, Bog Frog will present a CVC or VC word auditorily. Students will be asked to spell the word by typing letters on the keyboard. Initially, students will be provided with auditory and visual cues from printed letters that pop onto a swamp sign as they type. However, as students become more proficient with spelling, auditory feedback and visual cues are taken away. Students gradually progress to levels of play during which they are asked to spell nonsense words. As in previous levels, they are provided with visual cues and auditory feedback to help them check their spellings as they type; however, as they successfully complete items, auditory feedback, then visual cues are eliminated. At these levels students must rely on what they know about the spellings of English words to spell the nonsense words presented during the game. Zap! automatically decreases the level of play if students miss more than two consecutive items.

In the third activity, as in the onset-rime activity, students are asked to blend letters and decode real and nonsense words to identify a target; however, for this activity module, children must make their decisions by blending and decoding individual letters rather than onset-rime segments. Students first must associate sounds and letters to blend individual letters together and identify a target word. As students progress, the interval between letters increases and students must choose a response from a set of phonetically similar words. At the highest levels, students must decode CVC words from a visual-only presentation, selecting answer choices first from a set of phonetically-dissimilar words then from a set of phonetically similar words. Once a student has completed real word blending and decoding items, (s)he will move on to blending and decoding letter strings for nonsense words.

In the fourth activity, Bog Frog instructs students to blend and decode CCVC words once students have demonstrated proficiency with CVC words. Students begin by associating letters and sounds then blending them together to identify CCVC target words. Zap! automatically advances by increasing the amount of time between letters and by eliminating auditory presentation. Initially, the phonetic saliency of the CC (consonant cluster) blends will be high and more easily identified; however, as children progress, Zap! automatically advances by introducing CC blends with low saliency, which are more difficult to identify. Once the student becomes proficient at identifying CCVC words, Zap! automatically advances to words with VCC and CVCC patterns. The game continues to increase difficulty by varying the mode of response and having students spell CVCC, VCC and CVCC words by typing on the keyboard. Initially, students can roll-over a set of lily pads for auditory cues while they are spelling a word. In addition, narration is provided while they type. After three consecutive correct responses, Zap! automatically advances by eliminating auditory roll-over cues and narration. Once again, students are first asked to spell words with high saliency consonant clusters then words with low saliency consonant blends. If students miss two consecutive responses, the level of play is automatically decreased. Now, more details of the various tasks in the module will be described.

Figure 13A:
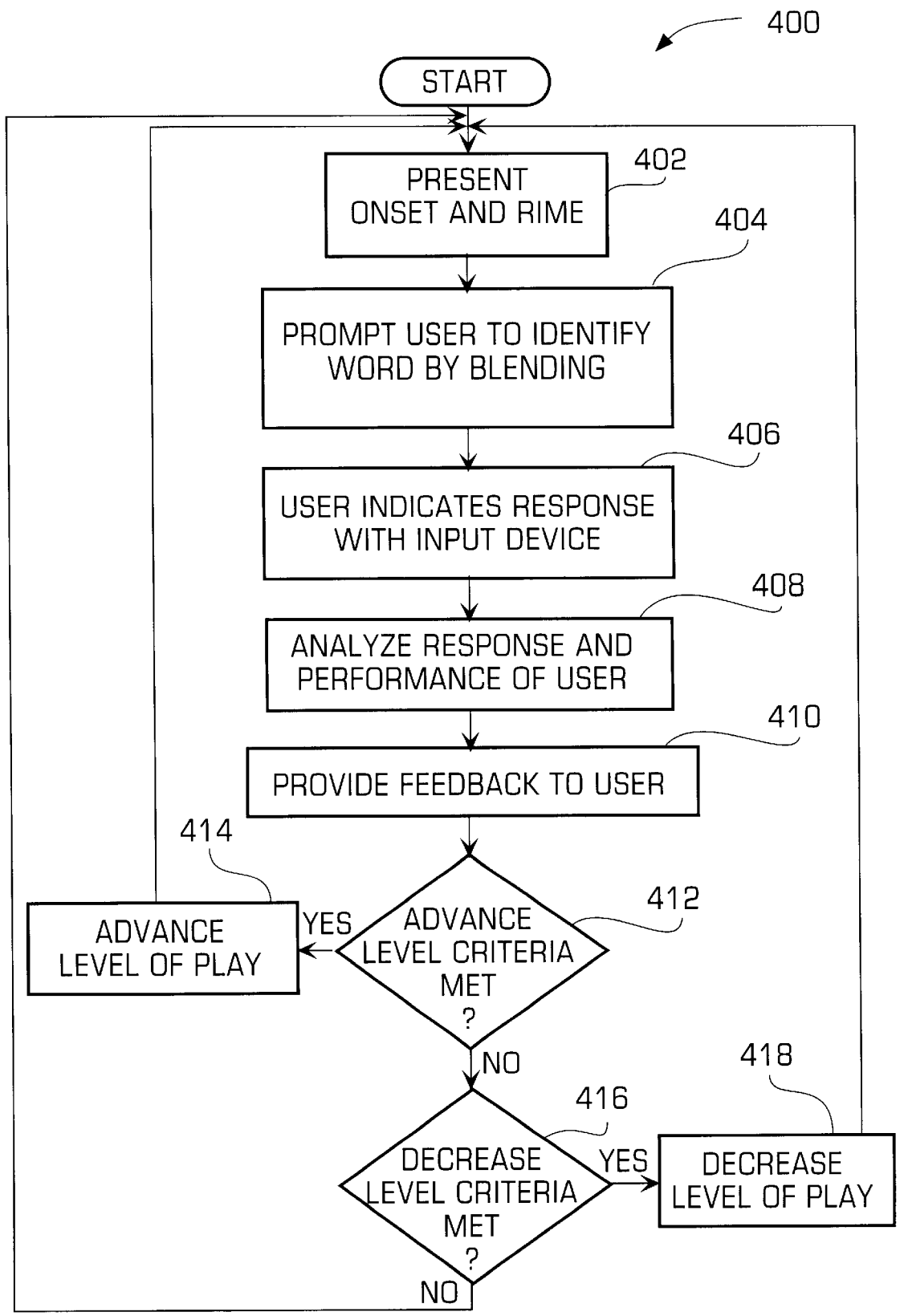
FIG. 13A–23 are diagrams illustrating more details of each task in the segmentation/blending and decoding/spelling training module ("ZAP!") in accordance with the invention.

FIG. 13A illustrates a first task 400 of the segmentation/blending and decoding/spelling training module wherein the user is presented with an onset and rime and prompted to identify the word generated by blending the onset and time. In this task, the student will blend onset-rime units presented at predetermined variable time intervals with or without corresponding graphemes into a word and will make a response by selecting from a set of three phonetically-dissimilar or phonetically-similar words. The student will identify CVC words presented with no auditory cues and will make a response by selecting from a set of three phonetically-dissimilar or phonetically-similar words wherein phonetically dissimilar words have different initial consonant and medial vowels and phonetically similar words have the same rime or onset.

In step 402, the system may present the user with an onset and a rime. The system may then prompt the user to respond to the above stimuli by identifying the word generated by blending the onset and the rime in step 404 and the user may input a response in step 406 using an input device of the computer, such as the keyboard, the mouse, the speech recognition tool or the like. Once the computer system receives the response from the user, the system may analyze the user's response (e.g., correct or incorrect) in step 408 and the user's performance of the task (e.g., did the user respond within the allotted time?). In step 410, the system may provide feedback to the user about the user's performance in the task wherein the feedback may be visual or auditory. In step 412, the system determines if the criteria has been met to increase the level of difficulty of the task. The level of difficulty may be increased by changing one or more difficulty variables. In this task, the difficulty variables may include changing the time interval between the onset and the rime, changing the perceptual similarity of the response choices and changing the presentation format (e.g., auditory alone, auditory and visual together or visual alone). If the advancement criteria has been met, then the level of difficulty is increased in step 414 and the method returns to step 402 to present the next task to the user at the higher difficulty level. If the advancement criteria is not met, then the system determines if the decrease level criteria has been met in step 416. The level of difficulty may be decreased by changing one or more of the above difficulty variables. If the decrease criteria has been met, then the level of difficulty is decreased in step 418 and the method returns to step 402 to present the next task to the user at the lower level of difficulty. If the decrease level criteria has also not been met, then the task continues at the same level and loops back to step 402. In this manner, the above task may be used to train a user's skills.

Figure 13B:
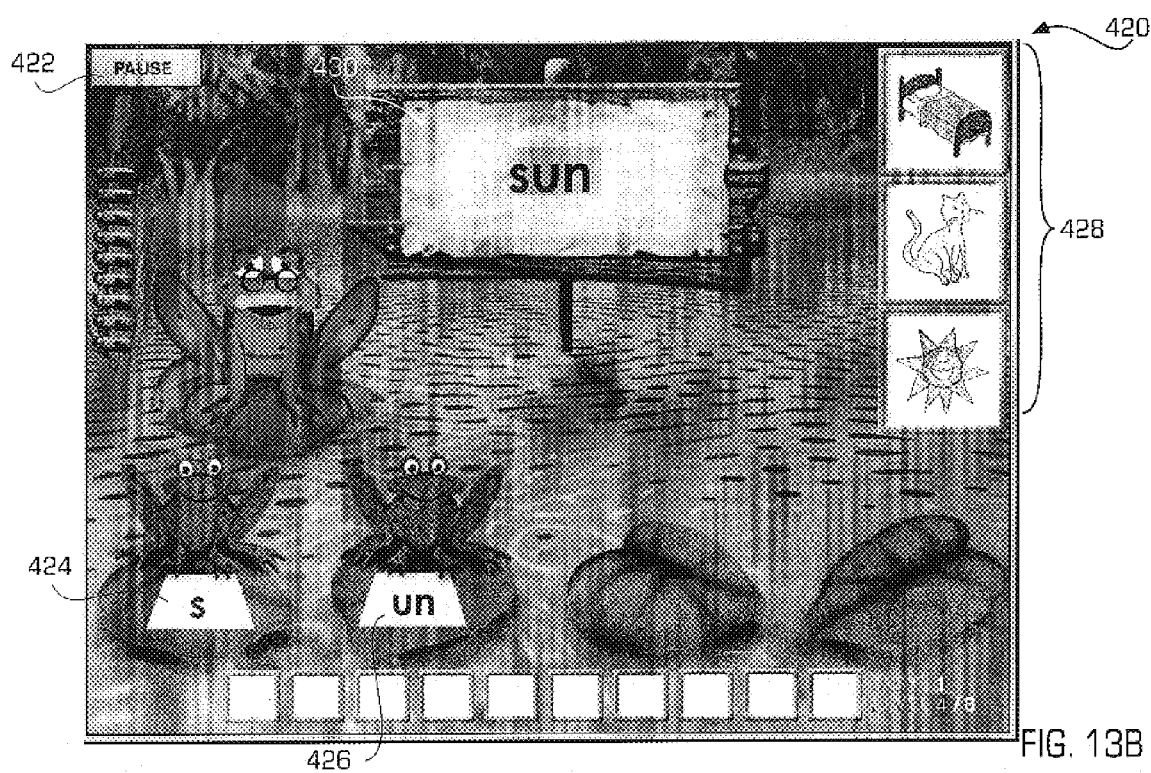

FIG. 13B illustrates an example of a user interface 420 for the first task. The user interface may include a pause button 422 to permit the user to pause the training. The user interface may also include a first area 424 that supports a frog in the preferred implementation and displays the onset (e.g., "s" in this example), and a second area 426 that supports a frog and displays the rime (e.g., "un" in this example). The user interface may also include a visual display area 428 (if activated) that may display pictures of the correct word as well as one or more incorrect words to provide the user with visual cues. The user interface may also include an area 430 for visually presenting the user selected word (e.g., "sun" in this example) to the user.

Figure 14:
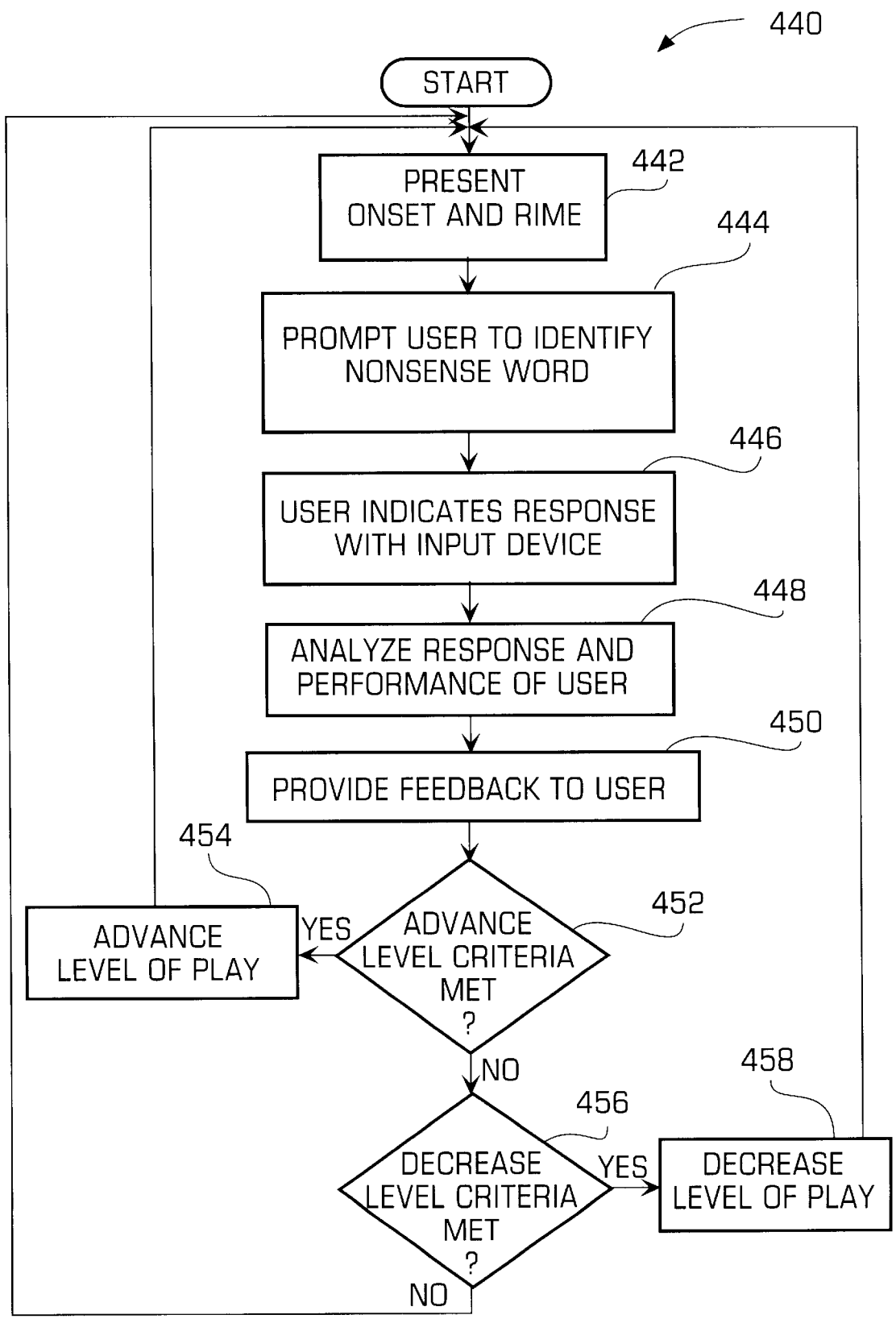

FIG. 14 illustrates a first task 440 of the segmentation/blending and decoding/spelling training module wherein the user is presented with an onset and rime and is expected to identify the nonsense word created by blending the onset and rime. In this task, the user will blend onset-rime units presented at x second intervals with or without corresponding graphemes into a word and will make a response by selecting from a set of three phonetically-dissimilar or phonetically-similar nonsense words. The user then will decode visually presented CVC nonsense words presented with no auditory cues and will make a response by selecting from a set of three phonetically-dissimilar or phonetically-similar nonsense words wherein phonetically dissimilar words have different initial consonant and medial vowel and phonetically similar words have same rime or onset.

In step 442, the system may present the user with a onset and a rime. The system may then prompt the user to respond to the above stimuli by identifying the nonsense word formed by blending the onset and the rime in step 444 and the user may input a response in step 446 using an input device of the computer, such as the keyboard, the mouse, the speech recognition tool or the like. Once the computer system receives the response from the user, the system may analyze the user's response (e.g., correct or incorrect) in step 448 and the user's performance Of the task (e.g., did the user respond within the allotted time?). In step 450, the system may provide feedback to the user about the user's performance in the task wherein the feedback may be visual or auditory. In step 452, the system determines if the criteria has been met to increase the level of difficulty of the task. The level of difficulty may be increased by changing one or more difficulty variables. In this task, the difficulty variables may include the same variables as described above with respect to FIG. 13A. If the advancement criteria has been met, then the level of difficulty is increased in step 454 and the method returns to step 442 to present the next task to the user at the higher difficulty level. If the advancement criteria is not met, then the system determines if the decrease level criteria has been met in step 456. The level of difficulty may be decreased by changing one or more difficulty variables described above. If the decrease criteria has been met, then the level of difficulty is decreased in step 458 and the method returns to step 442 to present the next task to the user at the lower level of difficulty. If the decrease level criteria has also not been met, then the task continues at the same level and loops back to step 442. In this manner, the above task may be used to train a user's skills.

Figure 15:
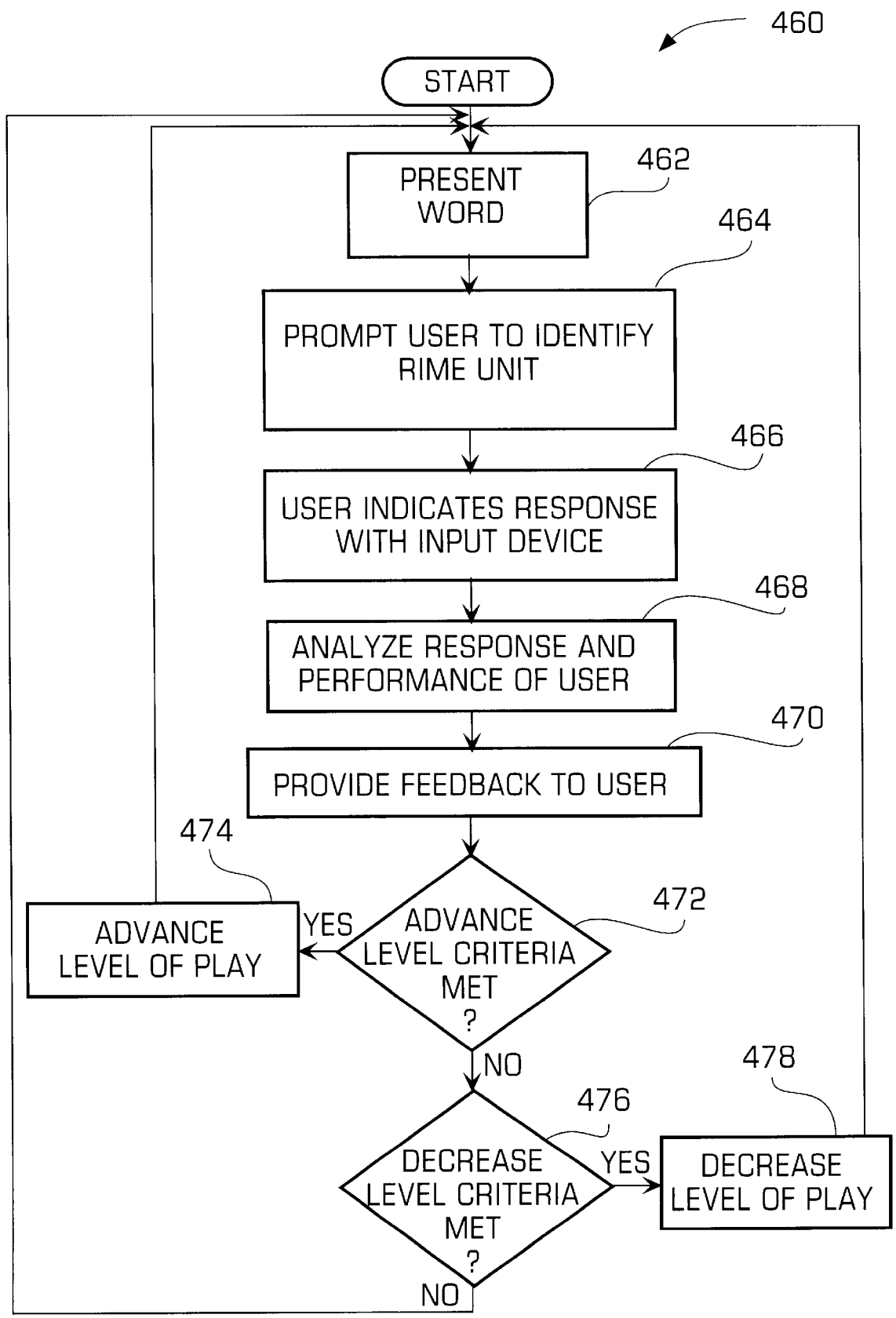

FIG. 15 illustrates a third task 460 of the segmentation/blending and decoding/spelling training module wherein the user is presented with a word and prompted to identify the rime unit in the word. When presented with a one-syllable CVC word or nonsense word, the student will identify the rime unit by selecting from one,of three phonetically-dissimilar or phonetically-similar rimes wherein phonetically dissimilar rimes have different vowels and phonetically similar rimes have the same vowels (the latter of which is more difficult).

In step 462, the system may present the user with a word. The system may then prompt the user to respond to the above stimuli by identifying the rime unit in the word in step 464 and the user may input a response in step 466 using an input device of the computer, such as the keyboard, the mouse, the speech recognition tool or the like. Once the computer system receives the response from the user, the system may analyze the user's response (e.g., correct or incorrect) in step 468 and the user's performance of the task (e.g., did the user respond within the allotted time?). In step 470, the system may provide feedback to the user about the user's performance in the task wherein the feedback may be visual or auditory. In step 472 the system determines if the criteria has been met to increase the level of difficulty of the task. The level of difficulty may be increased by changing one or more difficulty variables. In this task, the difficulty variables may include the perceptual similarity of the response choices or the presentation format (e.g., auditory alone, visual alone or visual with auditory). If the advancement criteria has been met, then the level of difficulty is increased in step 474 and the method returns to step 462 to present the next task to the user at the higher difficulty level. If the advancement criteria is not met, then the system determines if the decrease level criteria has been met in step 476. The level of difficulty may be decreased by changing one or more difficulty variables described above. If the decrease criteria has been met, then the level of difficulty is decreased in step 478 and the method returns to step 462 to present the next task to the user at the lower level of difficulty. If the decrease level criteria has also not been met, then the task continues at the same level and loops back to step 462. In this manner, the above task may be used to train a user's skills.

Figure 16:
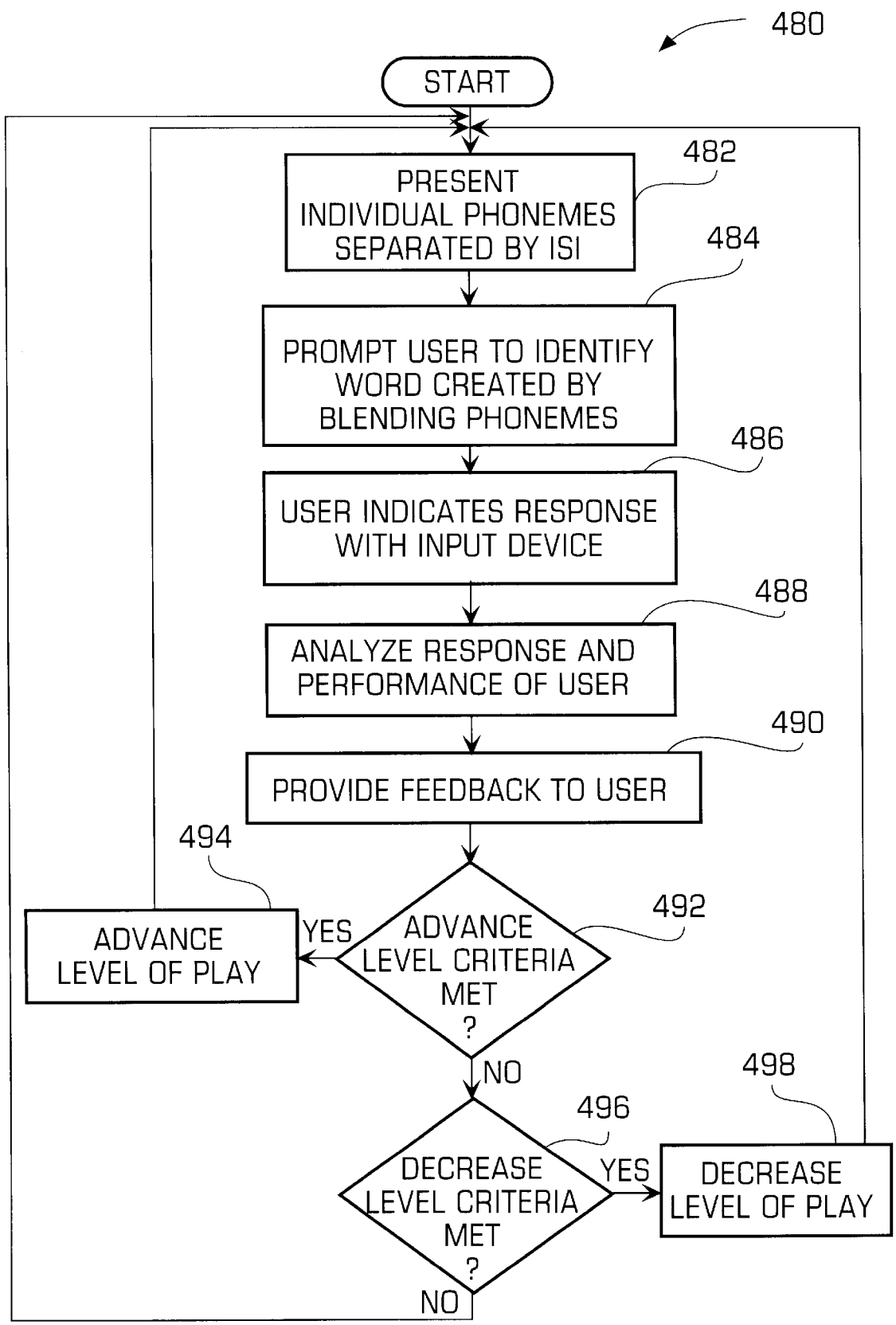

FIG. 16 illustrates a fourth task 480 of the segmentation/blending and decoding/spelling training module wherein the user learns to blend phonemes into words. In this task, the student will blend three phonemes presented at predetermined adjustable time intervals with or without corresponding graphemes into a word and will make a response by selecting from a set of three phonetically-dissimilar or phonetically-similar words. The student will identify CVC words presented with no auditory cues and will make a response by selecting from a set of three phonetically-dissimilar or phonetically-similar words wherein phonetically dissimilar words have different initial and final consonants and medial vowel and phonetically similar words have the same medial vowel and initial or final consonant.

In step 482, the system may present the user with a series of individual phonemes separated by some predetermined adjustable interval. The system may then prompt the user to respond to the above stimuli by identifying the word created by blending the presented phonemes in step 484 and the user may input a response in step 486 using an input device of the computer, such as the keyboard, the mouse, the speech recognition tool or the like. Once the computer system receives the response from the user, the system may analyze the user's response (e.g., correct or incorrect) in step 488 and the user's performance of the task (e.g., did the user respond within the allotted time?). In step 490, the system may provide feedback to the user about the user's performance in the task wherein the feedback may be visual or auditory. In step 492, the system determines if the criteria has been met to increase the level of difficulty of the task. The level of difficulty may be increased by changing one or more difficulty variables. In this task, the difficulty variables may include changing the time interval between the phonemes wherein a longer time makes the task harder, the perceptual similarity of the response choices or the presentation format as described above. If the advancement criteria has been met, then the level of difficulty is increased in step 494 and the method returns to step 482 to present the next task to the user at the higher difficulty level. If the advancement criteria is not met, then the system determines if the decrease level criteria has been met in step 496. The level of difficulty may be decreased by changing one or more difficulty variables. If the decrease criteria has been met, then the level of difficulty is decreased in step 498 and the method returns to step 482 to present the next task to the user at the lower level of difficulty. If the decrease level criteria has also not been met, then the task continues at the same level and loops back to step 482. In this manner, the above task may be used to train a user's skills.

Figure 17:
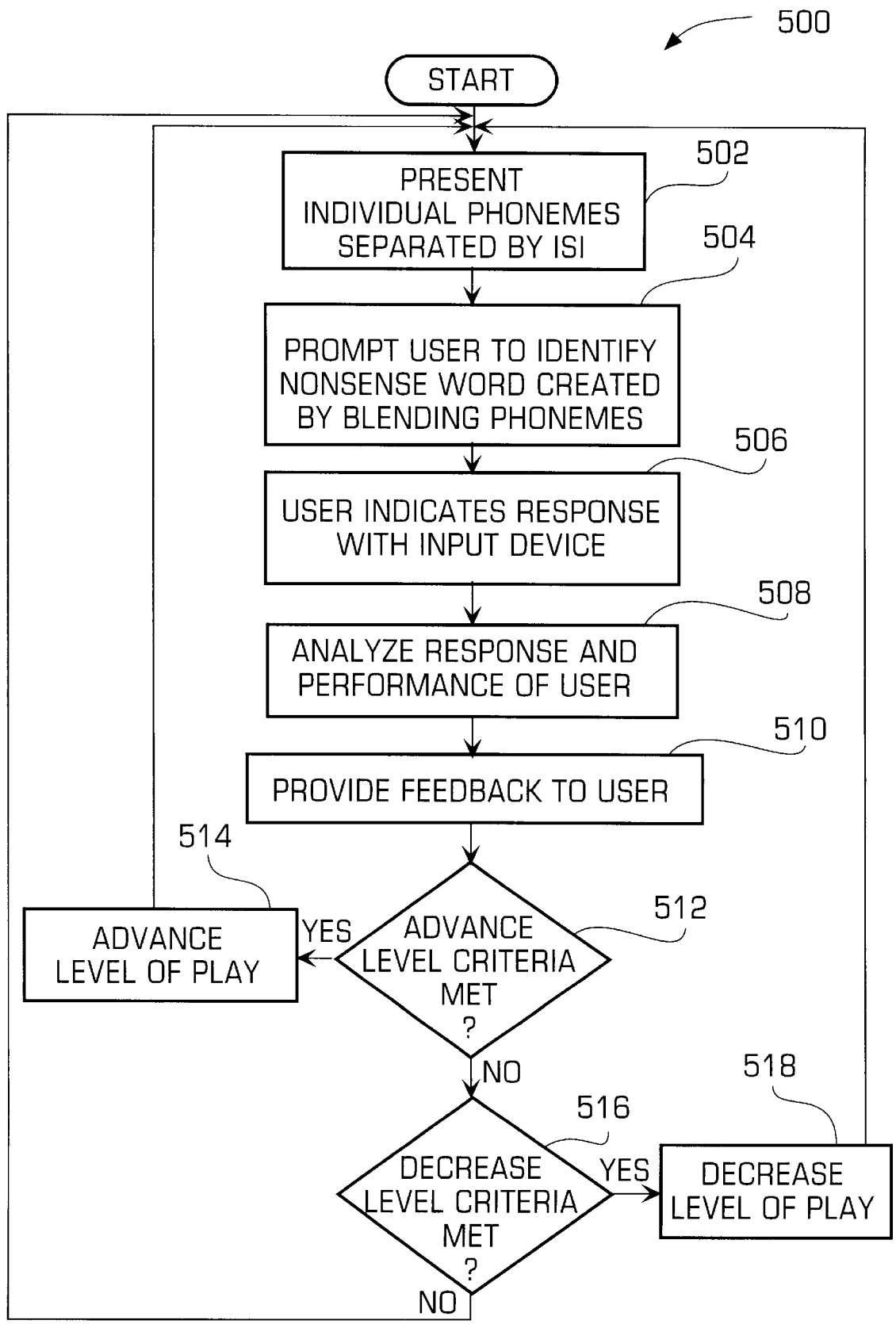

FIG. 17 illustrates a fifth task 500 of the segmentation/blending and decoding/spelling training module wherein the user blends phonemes together to form nonsense words. In this task, the student will blend three phonemes presented at predetermined variable time intervals with or without corresponding graphemes into a nonsense word and will make a response by selecting from a set of three phonetically-dissimilar or phonetically-similar nonsense words. The student will decode CVC words presented with no auditory cues and will make a response by selecting from a set of three phonetically-dissimilar or phonetically-similar nonsense words wherein phonetically dissimilar words have different initial and final consonants and medial vowel and phonetically similar words have same medial vowel and initial or final consonant.

In step 502, the system may present the user with a series of phonemes separated by a predetermined adjustable time interval. The system may then prompt the user to respond to the above stimuli by identifying the nonsense word formed by blending the phonemes in step 504 and the user may input a response in step 506 using an input device of the computer, such as the keyboard, the mouse, the speech recognition tool or the like. Once the computer system receives the response from the user, the system may analyze the user's response (e.g., correct or incorrect) in step 508 and the user's performance of the task (e.g., did the user respond within the allotted time?). In step 510, the system may provide feedback to the user about the user's performance in the task wherein the feedback may be visual or auditory. In step 512, the system determines if the criteria has been met to increase the level of difficulty of the task. The level of difficulty may be increased by changing one or more difficulty variables. In this task, the difficulty variables may include the same variables as for the fourth task. If the advancement criteria has been met, then the level of difficulty is increased in step 514 and the method returns to step 502 to present the next task to the user at the higher difficulty level. If the advancement criteria is not met, then the system determines if the decrease level criteria has been met in step 516. The level of difficulty may be decreased by changing one or more difficulty variables. If the decrease criteria has been met, then the level of difficulty is decreased in step 518 and the method returns to step 502 to present the next task to the user at the lower level of difficulty. If the decrease level criteria has also not been met, then the task continues at the same level and loops back to step 502. In this manner, the above task may be used to train a user's skills.

Figure 18A:
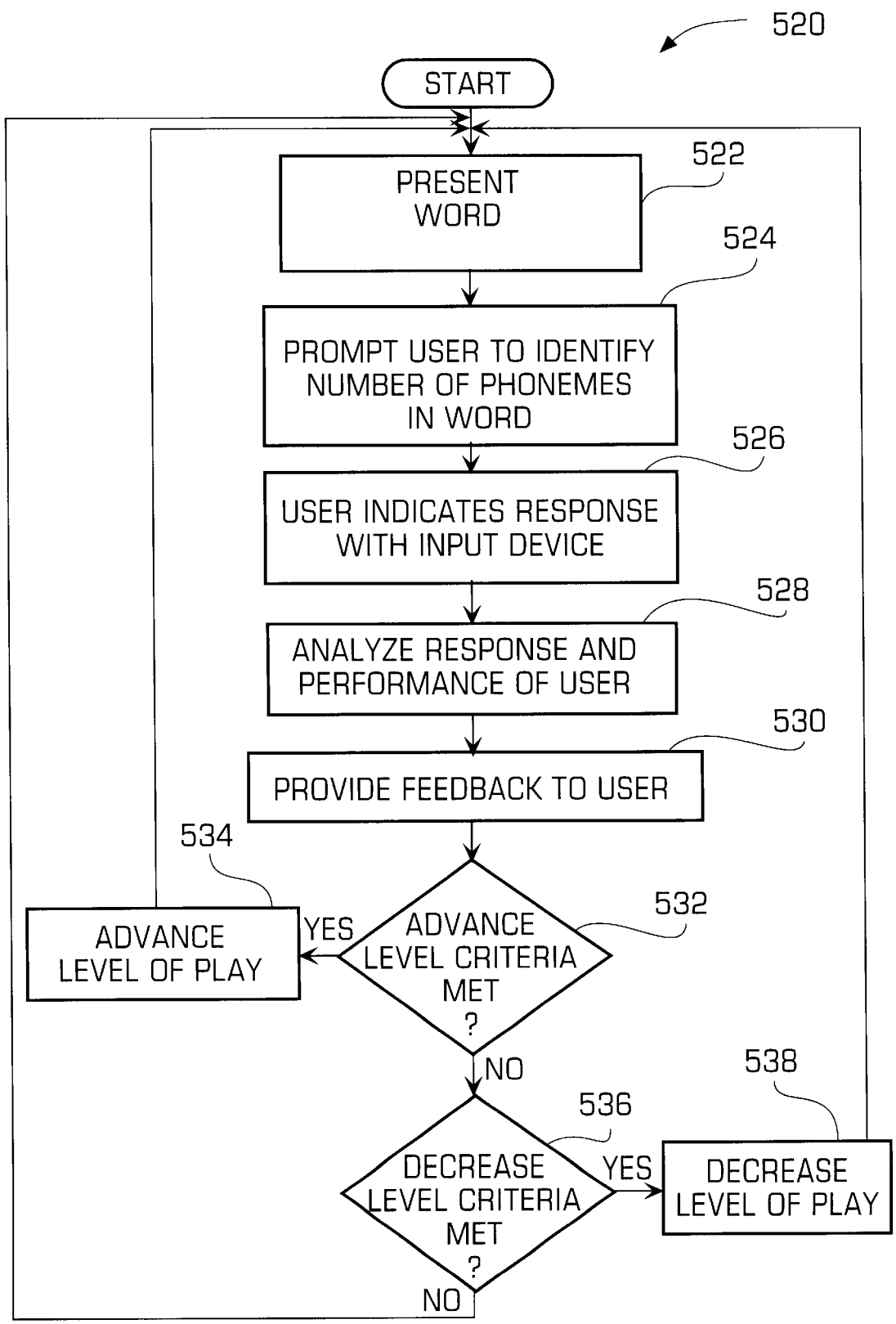

FIG. 18A illustrates a sixth task 520 of the segmentation/blending and decoding/spelling training module wherein the user identifies the number of phonemes in a word. In this task, the student will segment VC and CVC real words and nonsense words into phonemes. Auditory feedback will or will not be provided during response. Graphemes will or will not be displayed during response to change the difficulty wherein the increase criteria for this task may be 80% correct answers.

In step 522, the system may present the user with a word. The system may then prompt the user to respond to the above stimuli by identifying the number of phonemes in the word in step 524 and the user may input a response in step 526 using an input device of the computer, such as the keyboard, the mouse, the speech recognition tool or the like. Once the computer system receives the response from the user, the system may analyze the user's response (e.g., correct or incorrect) in step 528 and the user's performance of the task (e.g., did the user respond within the allotted time?). In step 530, the system may provide feedback to the user about the user's performance in the task wherein feedback may be visual or auditory. In step 532, the system determines if the criteria has been met to increase the level of difficulty of the task. The level of difficulty may be increased by changing one or more difficulty variables. In this task, the difficulty variables may include the type of the word (e.g., real vs. nonsense), the availability of auditory feedback or the visual display of the graphemes. If the advancement criteria has been met, then the level of difficulty is increased in step 534 and the method returns to step 522 to present the next task to the user at the higher difficulty level. If the advancement criteria is not met, then the system determines if the decrease level criteria has been met in step 536. The level of difficulty may be decreased by changing one or more difficulty variables. If the decrease criteria has been met, then the level of difficulty is decreased in step 538 and the method returns to step 522 to present the next task to the user at the lower level of difficulty. If the decrease level criteria has also not been met, then the task continues at the same level and loops back to step 522. In this manner, the above task may be used to train a user's skills.

Figure 18B:
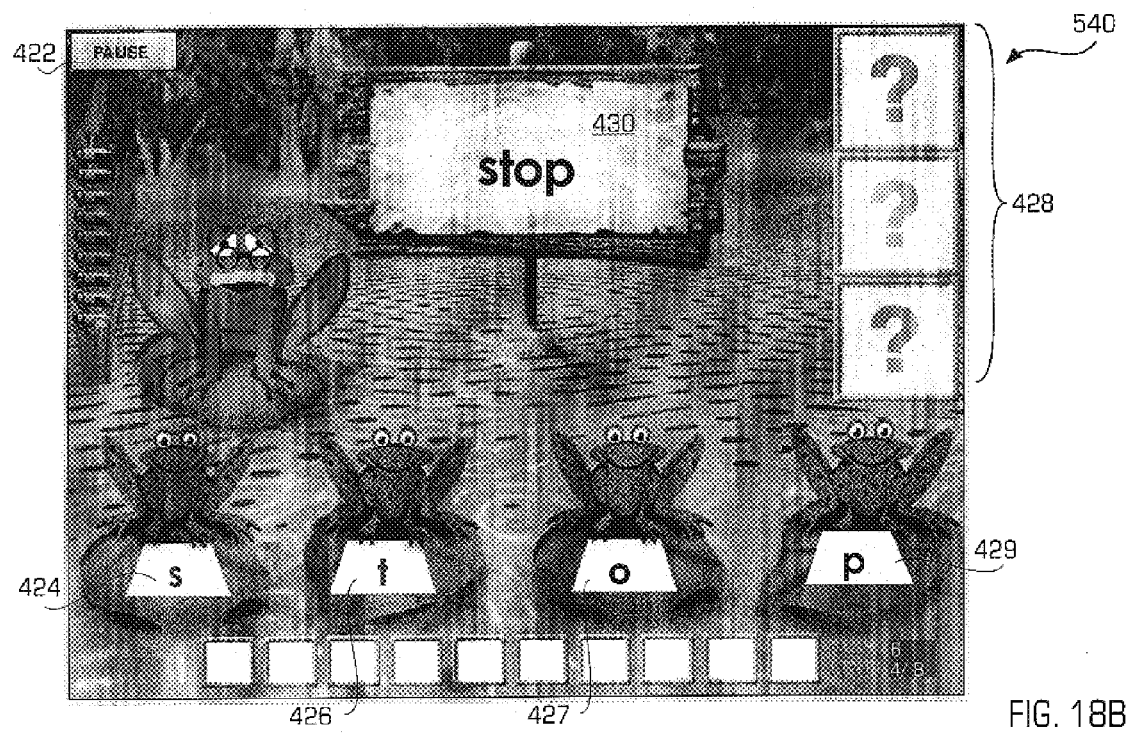

FIG. 18B illustrates an example of a user interface 540 of the sixth task. The user interface is similar to the user interface shown in FIG. 13B and like elements are designates with like reference numerals. For example, the user interface may include the pause button 422, the one or more stands 424, 426, 427 and 429 that support a frog in the example and each contain a phoneme (e.g., "s", "t", "o" and "p" in this example), a graphical display section 428 that is blank in this example, and the area 430 for displaying the user's selection (e.g., "stop" in this example which is correct).

Figure 19A:
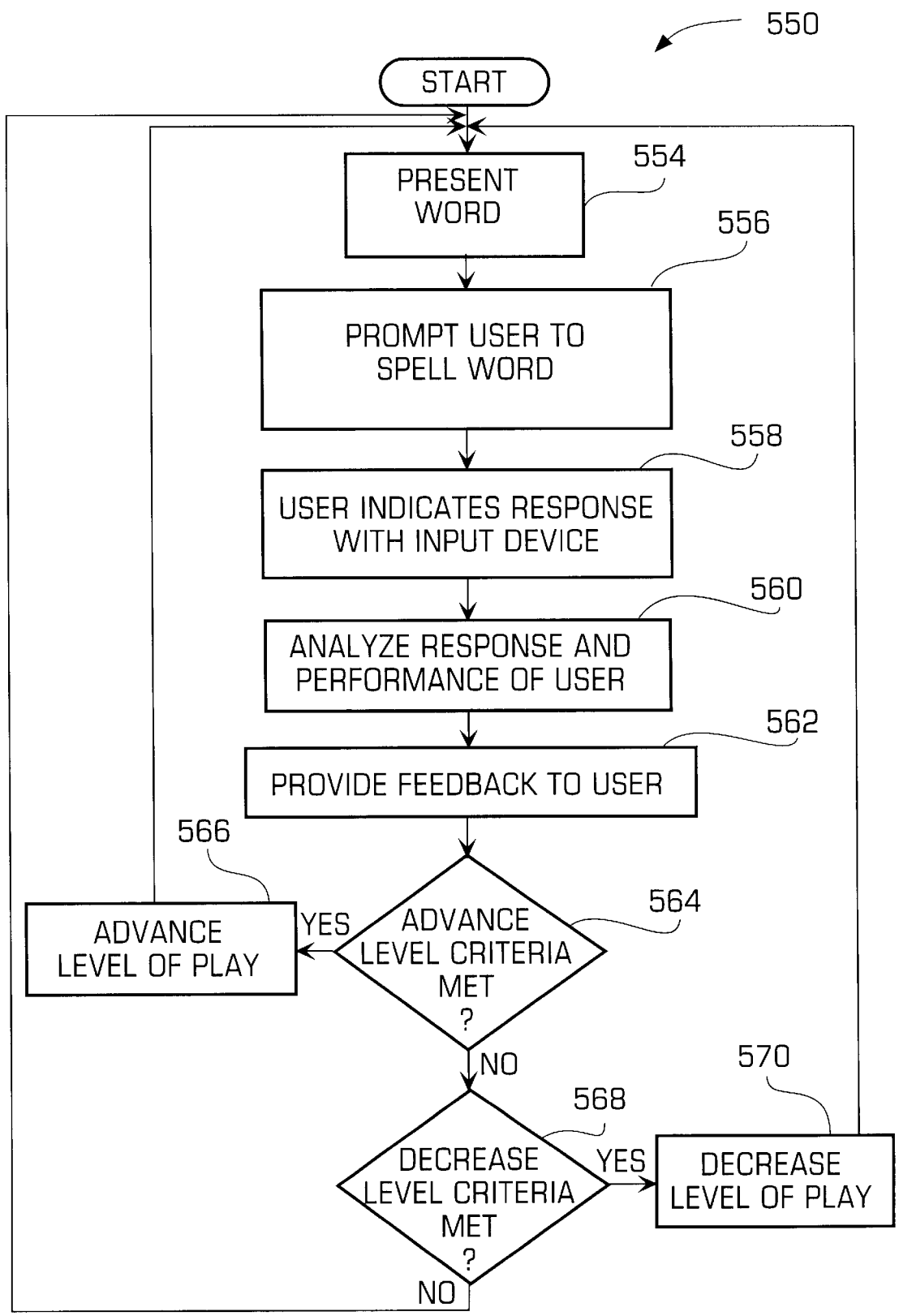
Figure 19B:
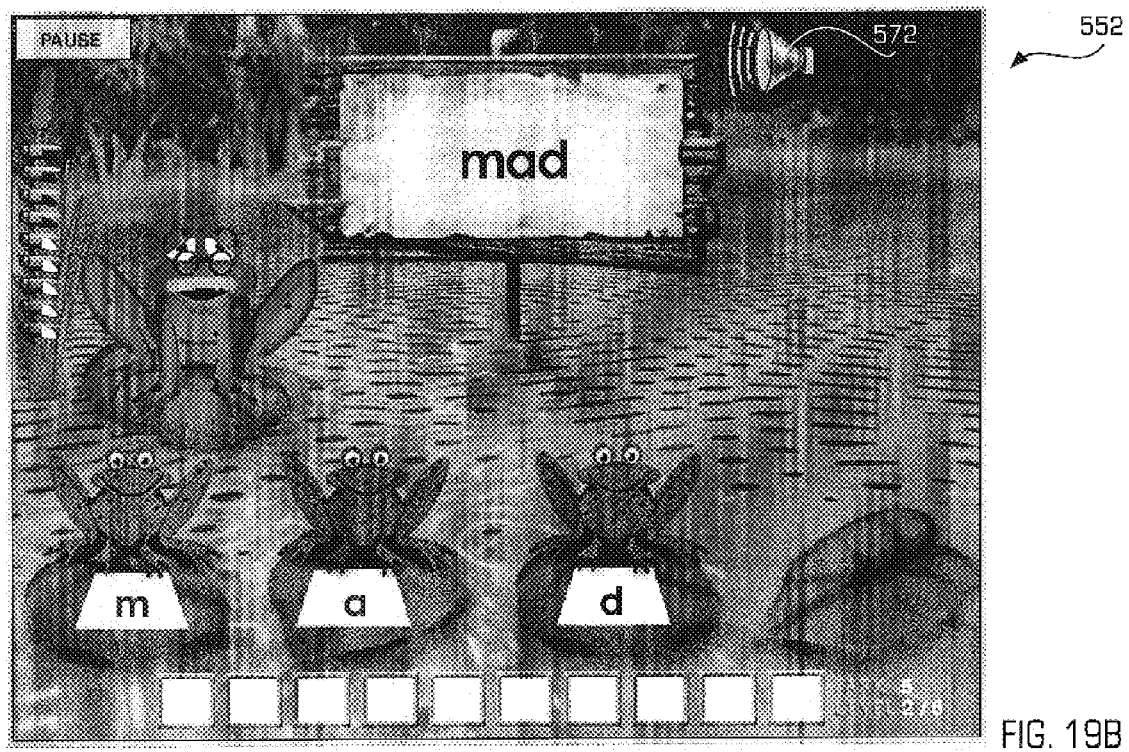
Figure 19C:
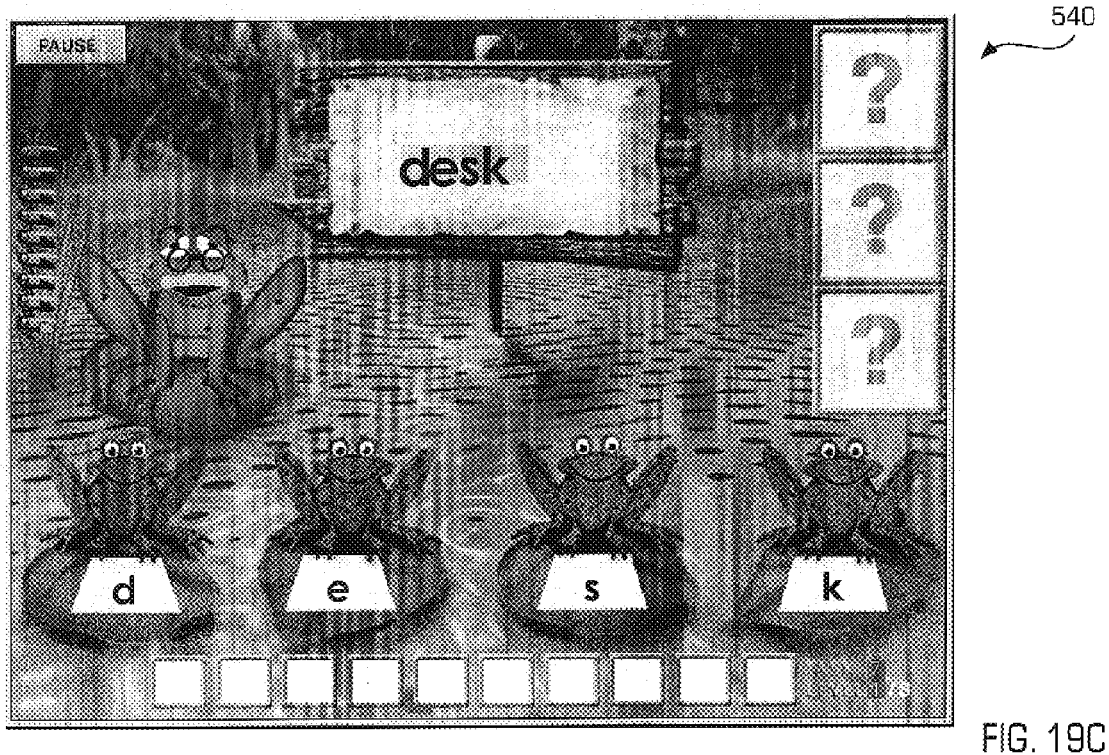

FIG. 19A illustrates a seventh task 550 of the segmentation/blending and decoding/spelling training module wherein the user spells a spoken word and FIGS. 19B and 19C illustrate examples of a user interface 552 for this task. In this task, the student will spell VC (e.g., "at") and CVC (e.g., "cat") real and nonsense words by typing letters on the keyboard. FIG. 19C illustrates an example of a user interface wherein a CVCC word ("desk") is used although the same type of user interface would be used for the CV and CVC words described. Auditory cues and feedback will or will not be available during the response.

In step 554, the system may present the user with a spoken word. The system may then prompt the user to respond to the above stimuli by spelling the word in step 556 and the user may input a response in step 558 using an input device of the computer, such as the keyboard, the mouse, the speech recognition tool or the like. Once the computer system receives the response from the user, the system may analyze the user's response (e.g., correct or incorrect) in step 560 and the user's performance of the task (e.g., did the user respond within the allotted time?). In step 562, the system may provide feedback to the user about the user's performance in the task wherein the feedback may be visual or auditory. In step 564, the system determines if the criteria has been met to increase the level of difficulty of the task. The level of difficulty may be increased by changing one or more difficulty variables. In this task, the difficulty variables may include the availability of auditory cues or the availability of auditory feedback. If the advancement criteria has been met, then the level of difficulty is increased in step 566 and the method returns to step 554 to present the next task to the user at the higher difficulty level. If the advancement criteria is not met, then the system determines if the decrease level criteria has been met in step 568. The level of difficulty may be decreased by changing one or more difficulty variables. If the decrease criteria has been met, then the level of difficulty is decreased in step 570 and the method returns to step 554 to present the next task to the user at the lower level of difficulty. If the decrease level criteria has also not been met, then the task continues at the same level and loops back to step 554. In this manner, the above task may be used to train a user's skills. FIG. 19B illustrates an example of the user interface for this task that, in addition to the elements shown in FIG. 19B, may include a speaker controller 572 for controlling the auditory cues and feedback provided to the user.

Figure 20A:
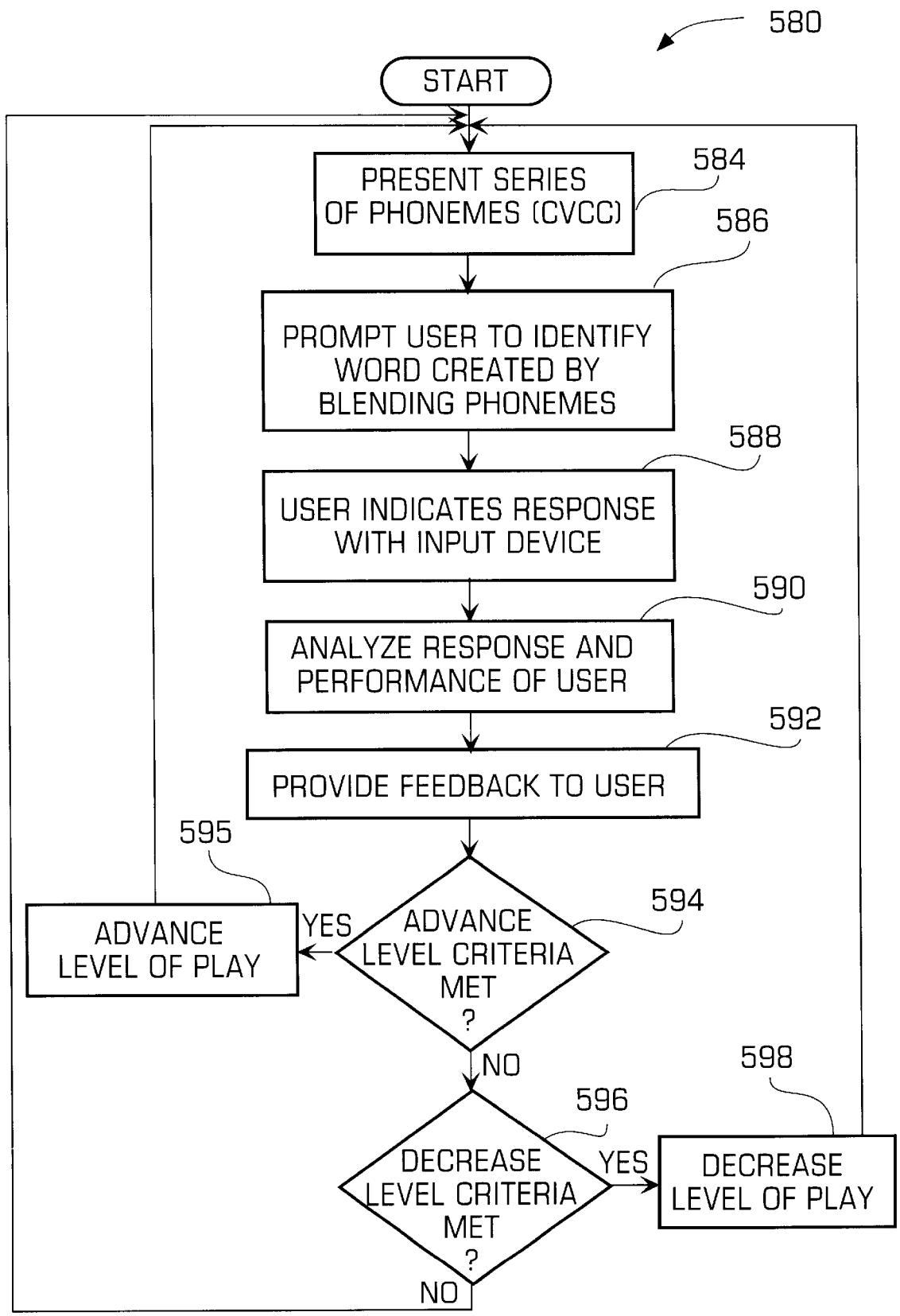
Figure 20B:
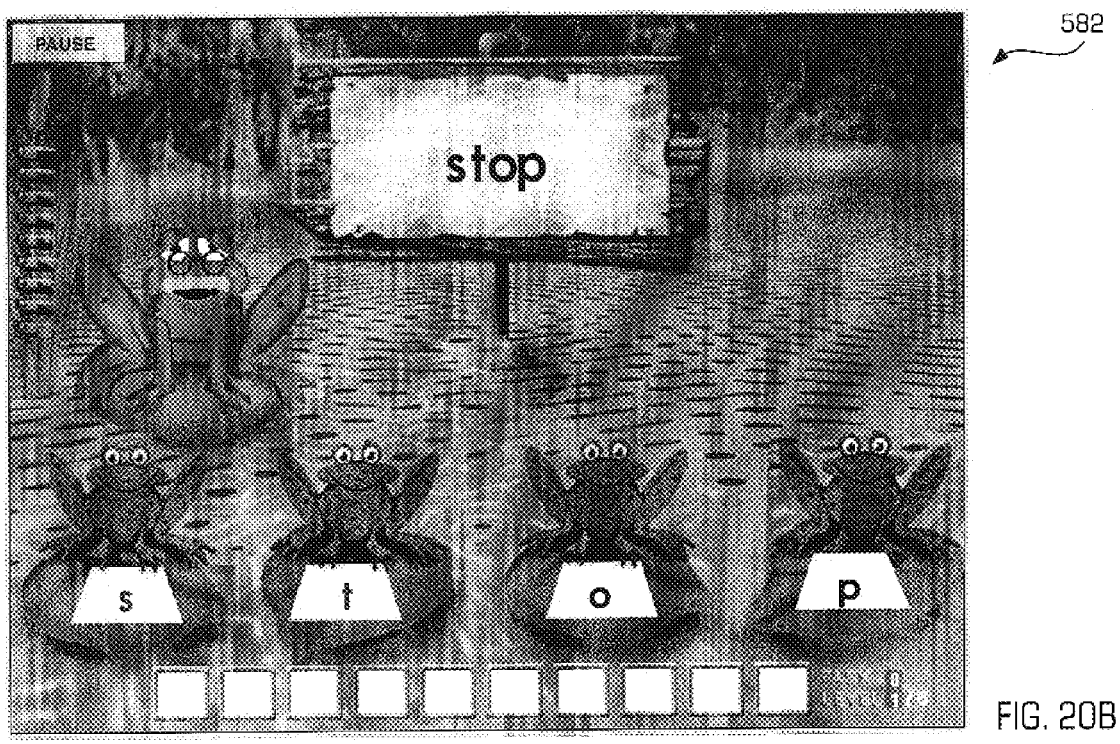

FIG. 20A illustrates an eighth task 580 of the segmentation/blending and decoding/spelling training module wherein the user blends CVCC phonemes to generate a word and FIG. 20B illustrates an example of a user interface 582 for this task. In this task, the student will blend four phonemes presented at predetermined variable time intervals with or without corresponding graphemes into a word and will make a response by selecting from a set of three response choices. The student will decode CVCC words presented with no auditory cues and will make a response by selecting from a set of three response choices. The phonetic saliency of the consonant cluster blends will be controlled to facilitate skill development wherein high saliency consonant clusters have fricative+stop while low saliency consonant clusters have nasal+stop.

In step 584, the system may present the user with a series of CVCC (consonant, vowel, consonant, consonant) phonemes separates by a predetermined adjustable time interval. The system may then prompt the user to respond to the above stimuli by blending the phonemes together to form a word in step 586 and the user may input a response in step 588 using an input device of the computer, such as the keyboard, the mouse, the speech recognition tool or the like. Once the computer system receives the response from the user, the system may analyze the user's response (e.g., correct or incorrect) in step 590 and the user's performance of the task (e.g., did the user respond within the allotted time?). In step 592, the system may provide feedback to the user about the user's performance in the task wherein the feedback may be visual or auditory. In step 594, the system determines if the criteria has been met to increase the level of difficulty Of the task. The level of difficulty may be increased by changing one or more difficulty variables. In this task, the difficulty variables may include changing the interval between the phonemes, the perceptual similarity of the response choices and changing the presentation format (e.g., auditory alone, visual alone or auditory and visual). If the advancement criteria has been met, then the level of difficulty is increased in step 595 and the method returns to step 584 to present the next task to the user at the higher difficulty level. If the advancement criteria is not met, then the system determines if the decrease level criteria has been met in step 596. The level of difficulty may be decreased by changing one or more difficulty variables. If the decrease criteria has been met, then the level of difficulty is decreased in step 598 and the method returns to step 584 to present the next task to the user at the lower level of difficulty. If the decrease level criteria has also not been met, then the task continues at the same level and loops back to step 584. In this manner, the above task may be used to train a user's skills.

Figure 21:
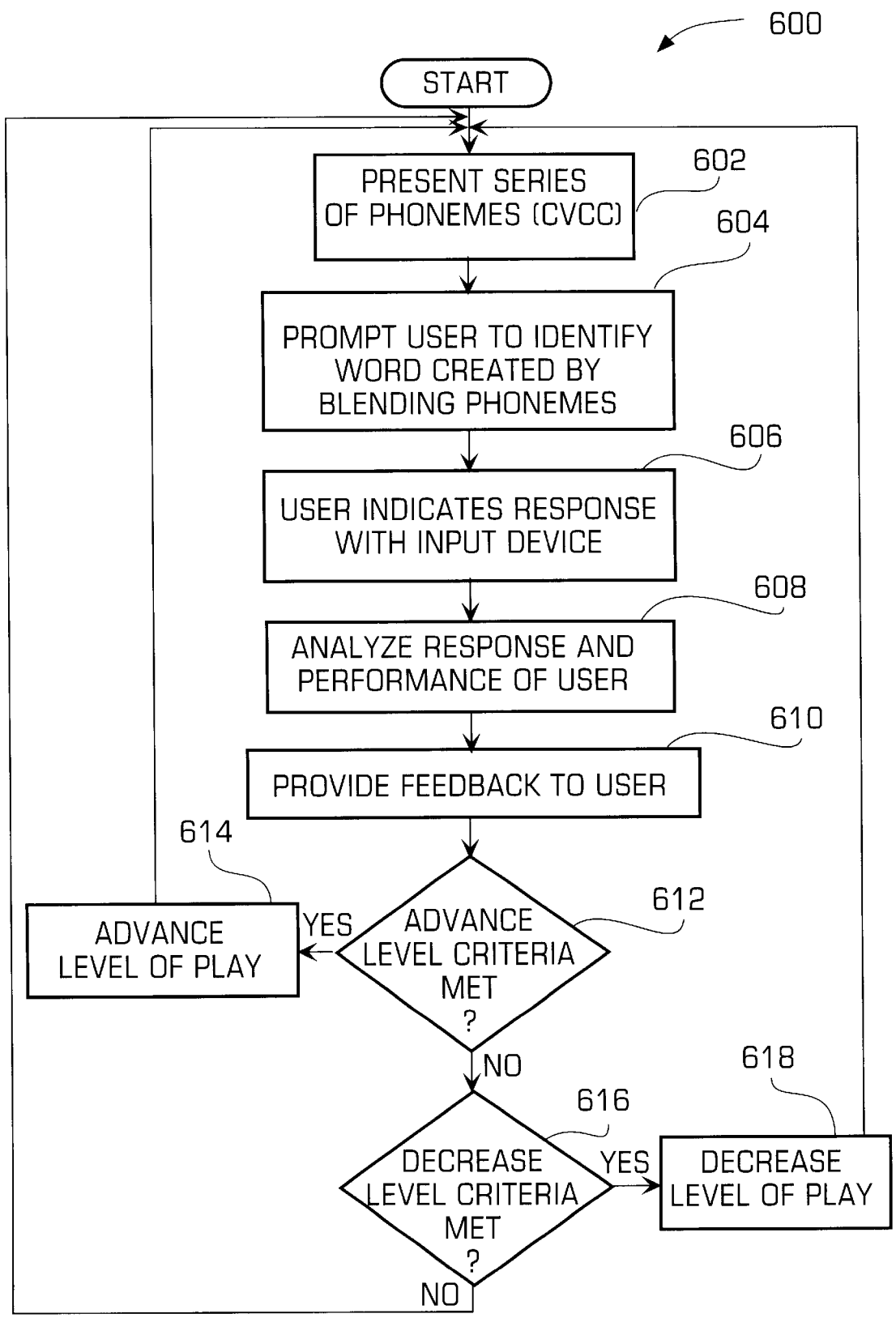

FIG. 21 illustrates a ninth task 600 of the segmentation/blending and decoding/spelling training module wherein the user blends phonemes to generate a word. In this task, the student will blend four phonemes presented at predetermined adjustable time intervals with or without corresponding graphemes into a word and will make a response by selecting from a set of three response choices. The student will decode CCVC words presented with no auditory cues and will make a response by selecting from a set of three response choices. The phonetic saliency of the consonant cluster blends will be controlled to facilitate skill development.

In step 602, the system may present the user with a series of consonant, consonant, vowel, consonant phonemes (CCVC phonemes in this task) separated by a predetermined adjustable time interval. The system may then prompt the user to respond to the above stimuli by identifying the word generated by blending the phonemes together in step 604 and the user may input a response in step 606 using an input device of the computer, such as the keyboard, the mouse, the speech recognition tool or the like. Once the computer system receives the response from the user, the system may analyze the user's response (e.g., correct or incorrect) in step 608 and the user's performance of the task (e.g., did the user respond within the allotted time?). In step 610, the system may provide feedback to the user about the user's performance in the task wherein the feedback may be visual or auditory. In step 612, the system determines if the criteria has been met to increase the level of difficulty of the task. The level of difficulty may be increased by changing one or more difficulty variables. In this task, the difficulty variables may be the same as set forth above for the eighth task. If the advancement criteria has been met, then the level of difficulty is increased in step 614 and the method returns to step 602 to present the next task to the user at the higher difficulty level. If the advancement criteria is not met, then the system determines if the decrease level criteria has been met in step 616. The level of difficulty may be decreased by changing one or more difficulty variables. If the decrease criteria has been met, then the level of difficulty is decreased in step 618 and the method returns to step 602 to present the next task to the user at the lower level of difficulty. If the decrease level criteria has also not been met, then the task continues at the same level and loops back to step 602. In this manner, the above task may be used to train a user's skills.

Figure 22:
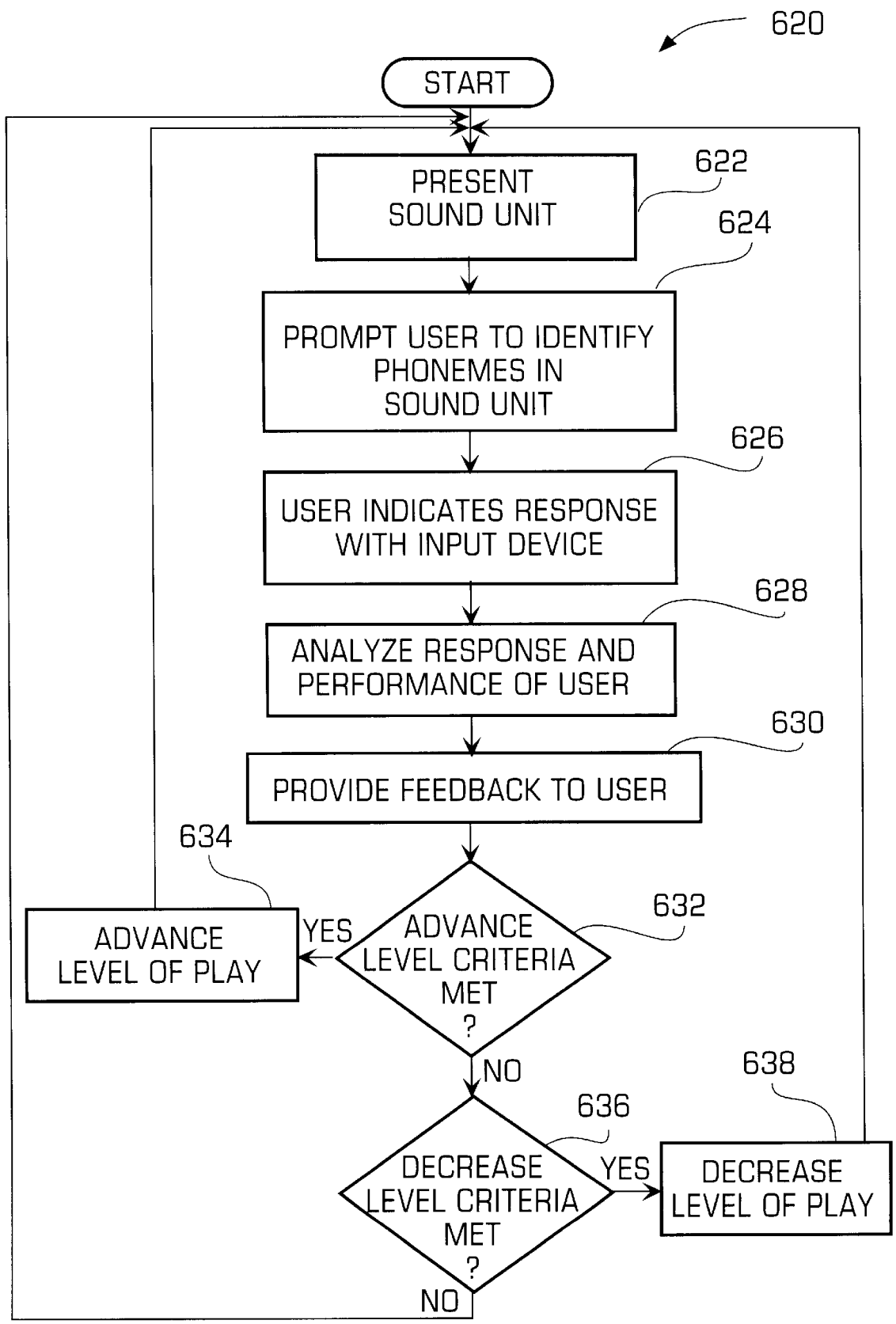

FIG. 22 illustrates a tenth task 620 of the segmentation/blending and decoding/spelling training module wherein the user identifies the phonemes in a spoken unit. In this task, the student will segment consonant cluster blends and VCC, CVCC and CCVC words into phonemes. Auditory feedback will or will not be provided during the response and graphemes will or will not be displayed during the response to change the difficulty. The phonetic saliency of the consonant cluster blends will be controlled to facilitate skill development. In step 622, the system may present the user with a sound unit. The system may then prompt the user to respond to the above stimuli by identifying the number of phonemes in the sound unit in step 624 and the user may input a response in step 626 using an input device of the computer, such as the keyboard, the mouse, the speech recognition tool or the like. Once the computer system receives the response from the user, the system may analyze the user's response (e.g., correct or incorrect) in step 628 and the user's performance of the task (e.g., did the user respond within the allotted time?). In step 630, the system may provide feedback to the user about the user's performance in the task wherein the feedback may be visual or auditory. In step 632, the system determines if the criteria has been met to increase the level of difficulty of the task. The level of difficulty maybe increased by changing one or more difficulty variables. In this task, the difficulty variables may include the phonetic saliency of the phonemes, the availability of auditory feedback or the visual display of graphemes. If the advancement criteria has been met, then the level of difficulty is increased in step 634 and the method returns to step 622 to present the next task to the user at the higher difficulty level. If the advancement criteria is not met, then the system determines if the decrease level criteria has been met in step 636. The level of difficulty may be decreased by changing one or more difficulty variables. If the decrease criteria has been met, then the level of difficulty is decreased in step 638 and the method returns to step 622 to present the next task to the user at the lower level of difficulty. If the decrease level criteria has also not been met, then the task continues at the same level and loops back to step 622. In this manner, the above task may be used to train a user's skills.

Figure 23:
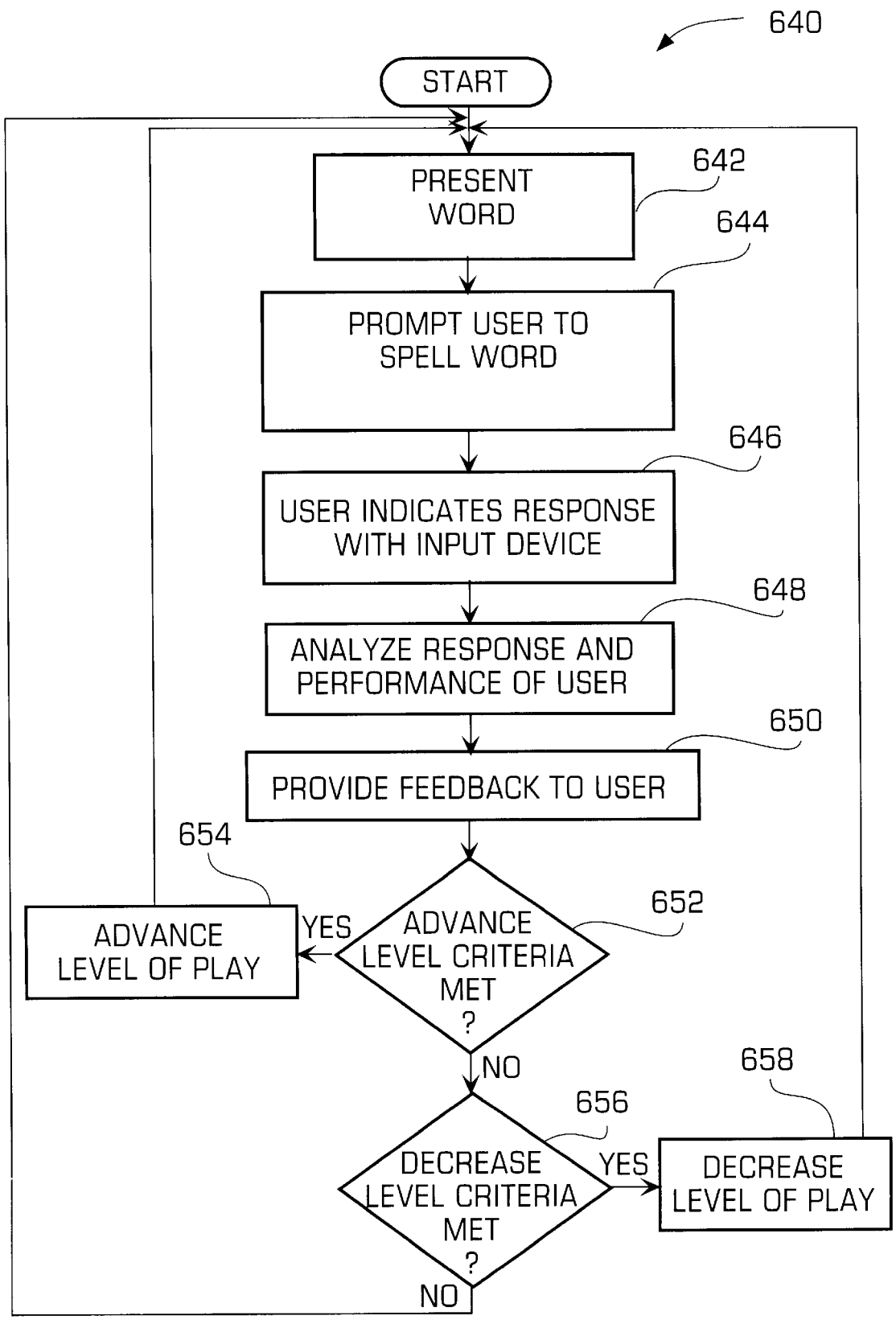

FIG. 23 illustrates an eleventh task 640 of the segmentation/blending and decoding/spelling training module wherein the user spells a word. In this task, the student will spell VCC, CVCC and CCVC words by typing letters on the keyboard. Auditory cues and feedback will or will not be available during the response.

In step 642, the system may present the user with a spoken word. The system may then prompt the user to respond to the above stimuli by spelling the word in step 644 and the user may input a response in step 646 using an input device of the computer, such as the keyboard, the mouse, the speech recognition tool or the like. Once the computer system receives the response from the user, the system may analyze the user's response (e.g., correct or incorrect) in step 648 and the user's performance of the task (e.g., did the user respond within the allotted time?). In step 650, the system may provide feedback to the user about the user's performance in the task wherein the feedback may be visual or auditory. In step 652, the system determines if the criteria has been met to increase the level of difficulty of the task. The level of difficulty may be increased by changing one or more difficulty variables. In this task, the difficulty variables may include the phonetic saliency of the phonemes, the availability of auditory cues and the availability of auditory feedback. If the advancement criteria has been met, then the level of difficulty is increased in step 654 and the method returns to step 642 to present the next task to the user at the higher difficulty level. If the advancement criteria is not met, then the system determines if the decrease level criteria has been met in step 656. The level of difficulty may be decreased by changing one or more difficulty variables. If the decrease criteria has been met, then the level of difficulty is decreased in step 658 and the method returns to step 642 to present the next task to the user at the lower level of difficulty. If the decrease level criteria has also not been met, then the task continues at the same level and loops back to step 642. In this manner, the above task may be used to train a user's skills. Using these eleven described tasks, the segmentation/blending and decoding/spelling training module trains the primary and secondary skills of the user as set forth above to improve the user's reading skills. Now, more details of the tasks in the sound/symbol training module will be described in more detail.

FIGS. 24A–35 are diagrams illustrating more details of each task in the sound/symbol training module ("Letter Express") in accordance with the invention. In a preferred implementation of the module, the user may click on a symbol and learn about letter names and sounds and how they all fit into short vowel CVC words. In particular, the user may watch a train, known as "CC", speed around the track, blowing puffs of smoke that look like animals, shapes and other fun objects as the student correctly identifies the correct sequence of alphabet letters, match letters and sounds and learn letter names. The student will also learn to identify letters in words as well as manipulate letters to create new real and nonsense words. The module may include the activity of identifying upper and lower case letter in order in the alphabet, matching letter and sounds, and identifying and manipulating sounds in the beginning, middle and ends of CVC words.

During the first activity, students will be presented with an uppercase letter from the beginning, middle or end of the alphabet and will be asked to identify the next letter of the alphabet by typing a response on the keyboard. The student will hear the letter as he/she types and must get 80% or more of his/her responses correct to advance. After the student becomes proficient at identifying uppercase letters and alphabetic order for the first letters in the beginning of the alphabet, (s)he will identify and type sequences of letters from the middle, and then the end of the alphabet. Letter Express continues to increase in difficulty by introducing lowercase letters and by varying the place in the alphabet the student must begin. After two consecutive incorrect responses, the level of play will automatically be decreased.

In the second activity, students will be asked to identify short vowel and consonant sounds by selecting the correct lowercase letter from a set of response choices displayed on the screen. Students will first hear a vowel phoneme and must identify which of three corresponding letters correctly matches it. Initially, students will be able to roll over picture cues providing auditory cues as well as an associated word; however, once achieving 80% correct or better, they will be asked to match without auditory cues or associated words. Once a student has mastered short vowel letter-sound matching, (s)he will be asked to match consonant phonemes and digraphs with lowercase consonant letters. As the student progresses, Letter Express will increase difficulty by varying the similarity of the response choices and eliminating auditory cues and associated words. If a student misses two consecutive items, the level of play will automatically decrease.

In the third activity a matrix of clouds will appear in the middle of the screen. Students will match phonemes with lowercase letters by clicking on their corresponding clouds before time runs out. CC will keep track of the number of letter-sound matches the student will make in one minute and will advance the game by increasing the number of clouds in the matrix from 8 to 12. As students make a match, the clouds will disappear, reducing the number of choices. If a student matches all of the letters and sounds in a matrix before time runs out, (s)he will be given another matrix to complete. Students will first have to match vowel letters and sounds; however, once they can match 10 or more vowel letters and sounds with 8 then 12 cloud matrices, the game will progress by presenting consonant phonemes that must be matched with lowercase letters.

In the fourth activity, after students have successfully matched letters and sounds, Letter Express automatically begins a new activity. For the first 22 levels of the game students will be asked to focus on letters and sounds in isolation. At the final 28 levels of the game, students will be asked to identify and manipulate sounds in the CVC real and nonsense words. As they progress, students will be asked to identify and manipulate sounds at the end, then in the middle of real and nonsense CVC words. Students first listen to CC say a real CVC word and identify the initial consonant from a set of three response choices. Initially, these response choices will consist of sounds and letters and students will be given roll-over letter and sound cues to help them identify the correct response. As students progress, these cues will be eliminated and students will be asked to identify the beginning letter in a visually presented word. Letter Express gradually increases difficulty by varying the similarity of foils and in the highest levels, having children respond using the keyboard rather than selecting from three response choices. After completing three consecutive responses for a number of different levels, students will be asked to type a new initial consonant letter on the keyboard to make a new word or nonsense word. When the student becomes proficient at identifying and manipulating initial consonant letters and sounds, Letter Express automatically advances the level by introducing final consonant sounds. Students playing at the 10 highest levels of the game will be asked to identify and manipulate short middle vowels in CVC real and nonsense words. For each task, Letter Express advances levels by challenging students to recognize then manipulate letters in real and nonsense words as well as respond to items by clicking on a correct item or typing responses. After two consecutive incorrect responses, the level of play will be decreased automatically. Now, the details of the various tasks associated with the above module will be described in more detail.

Figure 24A:
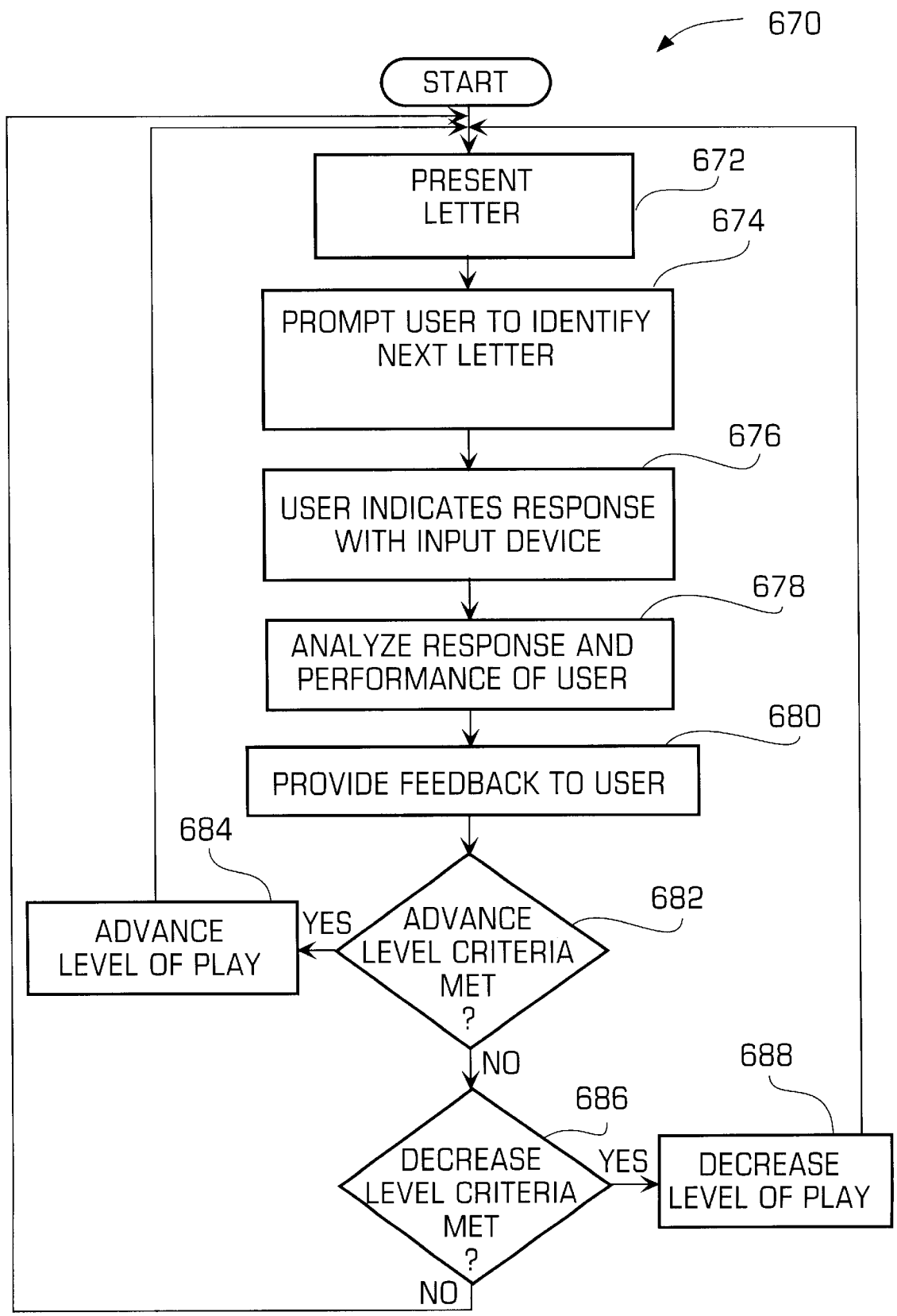
FIGS. 24A–35 are diagrams illustrating more details of each task in the sound/symbol training module ("Letter Express") in accordance with the invention.

FIG. 24A illustrates a first task 670 of the sound/symbol training module ("Letter Express") in accordance with the invention wherein the user identifies the next letter in the alphabet. When presented with a letter selected from the beginning, middle or end of the alphabet, the student will identify the next letter of the alphabet by typing a response on the keyboard. Upper case or lower case graphemes will be displayed.

In step 672, the system may present the user with a letter of the alphabet. The system may then prompt the user to respond to the above stimuli by identifying the next letter in the alphabet in step 674 and the user may input a response in step 676 using an input device of the computer, such as the keyboard, the mouse, the speech recognition tool or the like. Once the computer system receives the response from the user, the system may analyze the user's response (e.g., correct or incorrect) in step 678 and the user's performance of the task (e.g., did the user respond within the allotted time?). In step 680, the system may provide feedback to the user about the user's performance in the task wherein the feedback may be visual or auditory. In step 682, the system determines if the criteria has been met to increase the level of difficulty of the task. The level of difficulty may be increased by changing one or more difficulty variables. In this task, the difficulty variables may include the position in the alphabet (beginning, middle or end), upper vs. lower case display of the letters or visual cueing. If the advancement criteria has been met, then the level of difficulty is increased in step 684 and the method returns to step 672 to present the next task to the user at the higher difficulty level. If the advancement criteria is not met, then the system determines if the decrease level criteria has been met in step 686. The level of difficulty may be decreased by changing one or more difficulty variables. If the decrease criteria has been met, then the level of difficulty is decreased in step 688 and the method returns to step 672 to present the next task to the user at the lower level of difficulty. If the decrease level criteria has also not been met, then the task continues at the same level and loops back to step 672. In this manner, the above task may be used to train a user's skills.

Figure 24B:
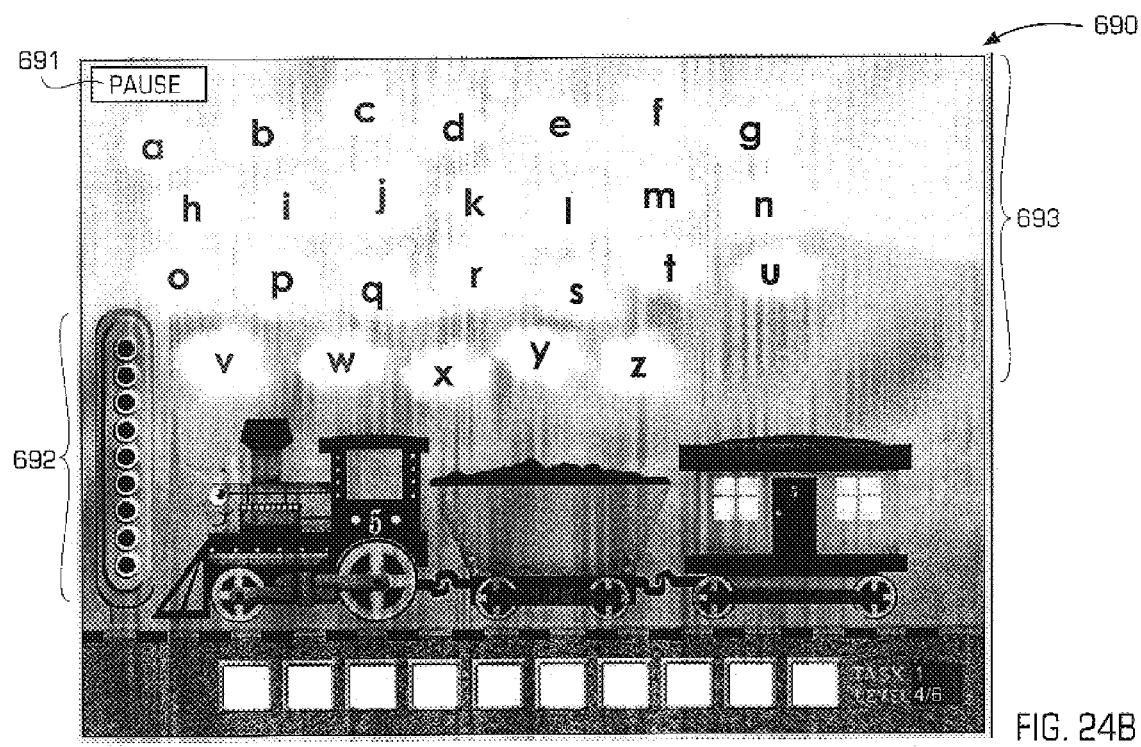
Figure 24C:
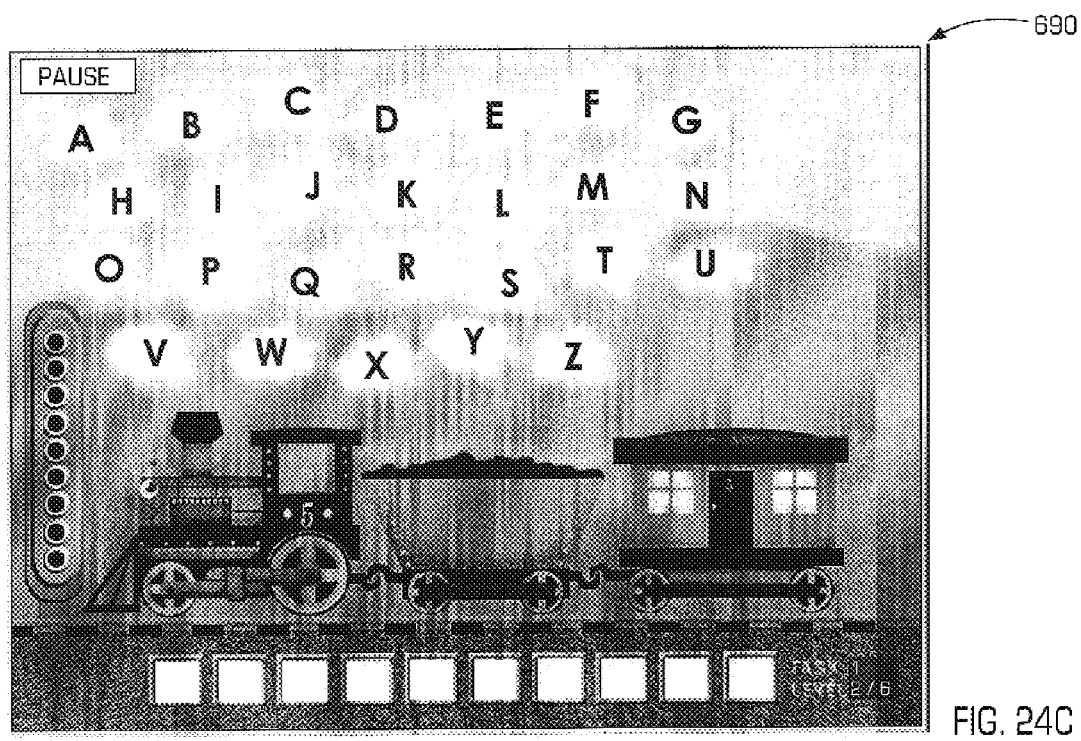

FIGS. 24B and 24C illustrate examples of a user interface 690 of the first task. In particular, the user interface may include a pause button 691 to pause the training at any time, an animated character 692, such as a steam engine in this example and one or more puffs of smoke 693 generated by the steam engine that each contain a letter of the alphabet. FIG. 24B illustrates lower case letters being displayed to the user while FIG. 24C illustrates upper case letters being displayed to the user.

Figure 25:
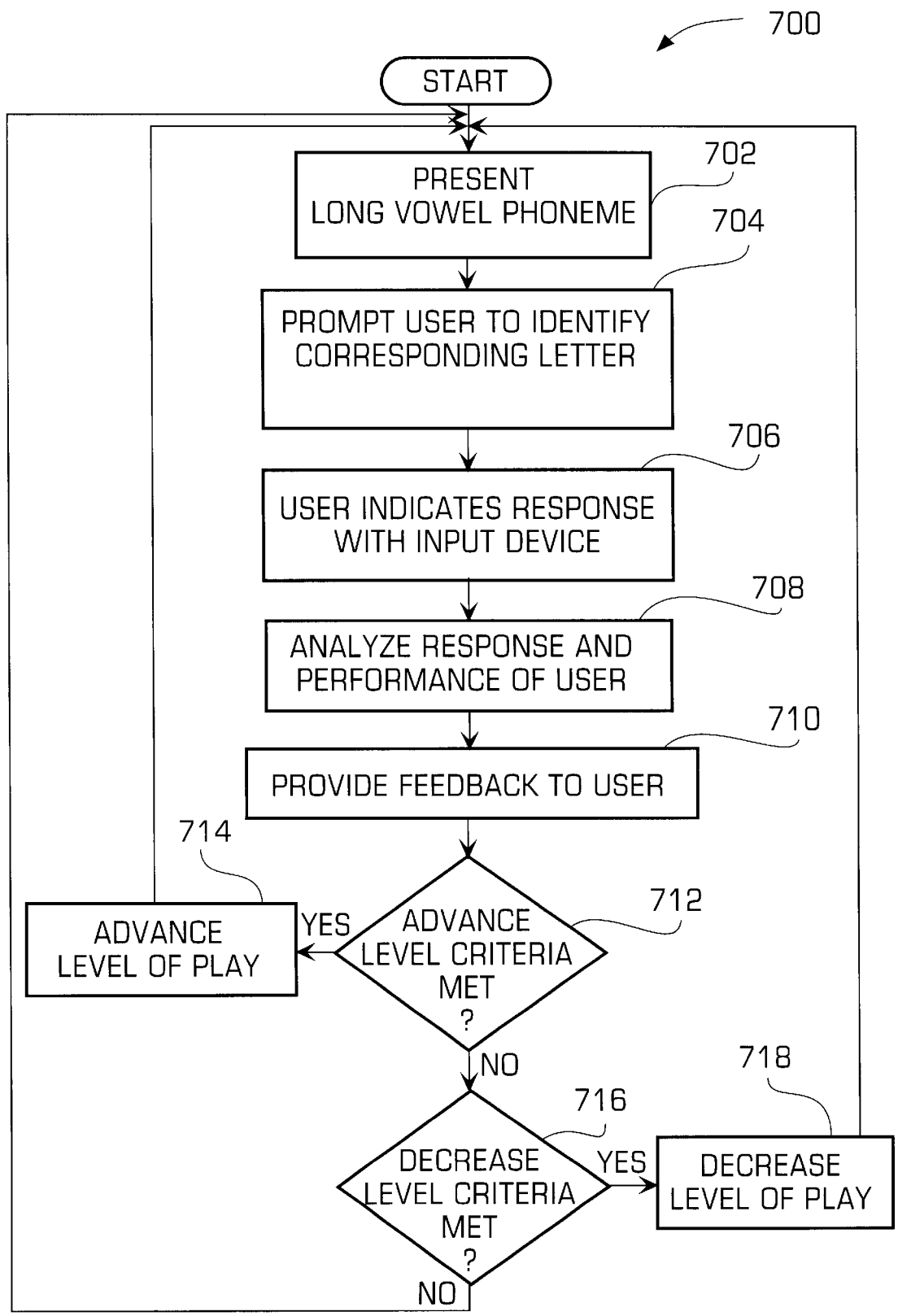

FIG. 25 illustrates a second task 700 of the sound/symbol training module ("Letter Express") in accordance with the invention wherein the user identifies letters corresponding to a long vowel phoneme. When presented with a phoneme sound, the student will select the corresponding letter from a set of response choices displayed on the screen. An associated word will or will not be displayed. Auditory cues will or will not be available. In this task, phoneme sounds will be limited to the most common long vowel sound-symbol associations for the 5 vowels of the English alphabet.

In step 702, the system may present the user with a long vowel phoneme. The system may then prompt the user to respond to the above stimuli by identifying the letters corresponding to the phonemes in step 704 and the user may input a response in step 706 using an input device of the computer, such as the keyboard, the mouse, the speech recognition tool or the like. Once the computer system receives the response from the user, the system may analyze the user's response (e.g., correct or incorrect) in step 708 and the user's performance of the task (e.g., did the user respond within the allotted time?). In step 710, the system may provide feedback to the user about the user's performance in the task wherein the feedback may be visual or auditory. In step 712, the system determines if the criteria has been met to increase the level of difficulty of the task. The level of difficulty may be increased by changing one or more difficulty variables. In this task, the difficulty variables may include the availability of auditory cues, the availability of associated keywords, upper vs. lower case display of a letter or visual cueing. If the advancement criteria has been met, then the level of difficulty is increased in step 714 and the method returns to step 702 to present the next task to the user at the higher difficulty level. If the advancement criteria is not met, then the system determines if the decrease level criteria has been met in step 716. The level of difficulty may be decreased by changing one or more difficulty variables. If the decrease criteria has been met, then the level of difficulty is decreased in step 718 and the method returns to step 702 to present the next task to the user at the lower level of difficulty. If the decrease level criteria has also not been met, then the task continues at the same level and loops back to step .702. In this manner, the above task may be used to train a user's skills.

Figure 26:
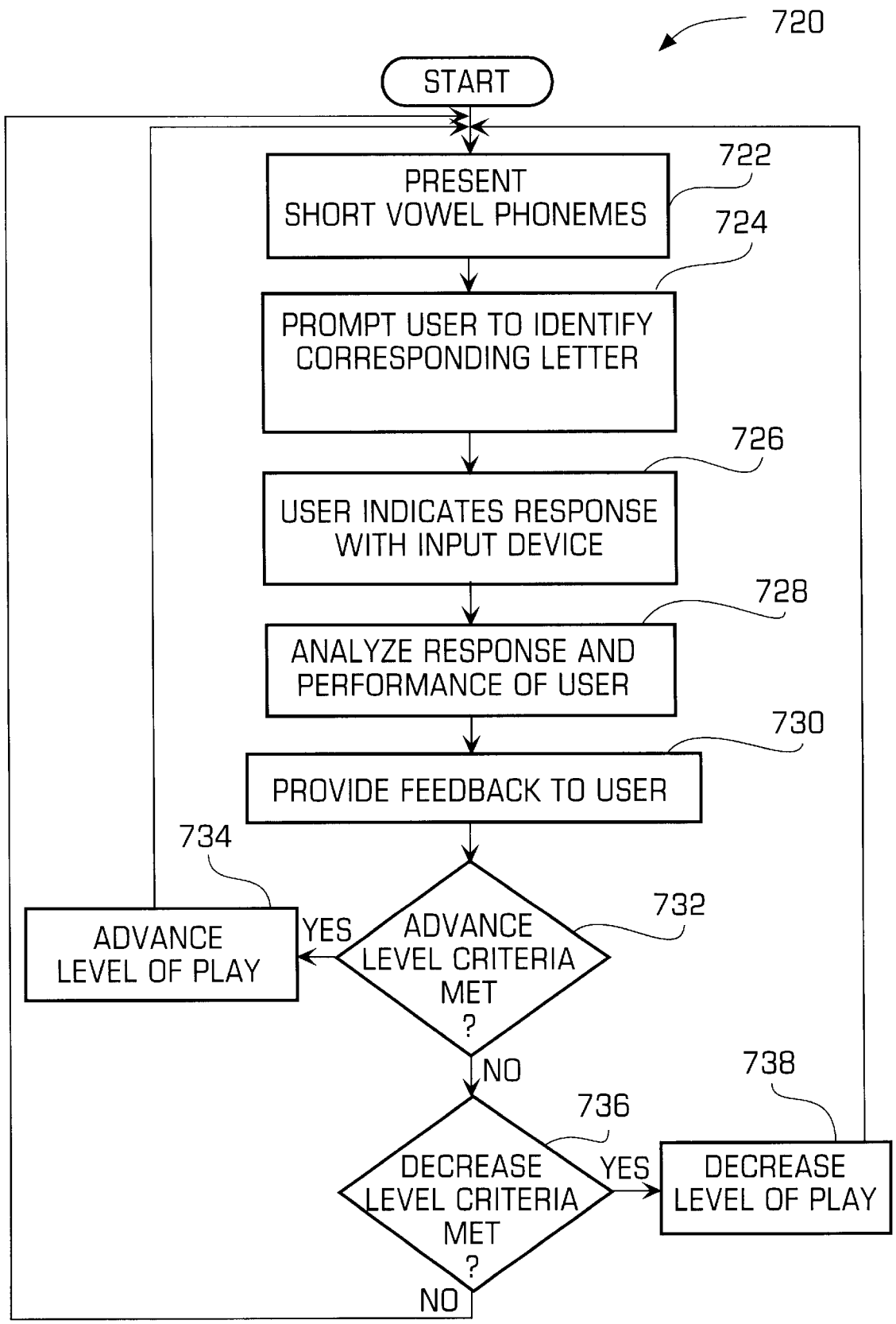

FIG. 26 illustrates a third task 720 of the sound/symbol training module ("Letter Express") in accordance with the invention wherein the user must identify the letters correspond to a short vowel phoneme. When presented with a phoneme sound, the student will select the corresponding letter from a set of response choices displayed on the screen. An associated word will or will not be displayed. Auditory cues will or will not be available. In this task, phoneme sounds will be limited to the most common short vowel sound-symbol associations for the 5 vowels of the English alphabet.

In step 722, the system may present the user with a short vowel phoneme. The system may then prompt the-user to respond to the above stimuli by identifying the corresponding letters in step 724 and the user may input a response in step 726 using an input device of the computer, such as the keyboard, the mouse, the speech recognition tool or the like. Once the computer system receives the response from the user, the system may analyze the user's response (e.g., correct or incorrect) in step 728 and the user's performance of the task (e.g., did the user respond within the allotted time?). In step 730, the system may provide feedback to the user about the user's performance in the task wherein the feedback may be visual or auditory. In step 732, the system determines if the criteria has been met to increase the level of difficulty of the task. The level of difficulty may be increased by changing one or more difficulty variables. In this task, the difficulty variables are the same as for the second task above. If the advancement criteria has been met, then the level of difficulty is increased in step 734 and the method returns to step 722 to present the next task to the user at the higher difficulty level. If the advancement criteria is not met, then the system determines if the decrease level criteria has been met in step 736. The level of difficulty may be decreased by changing one or more difficulty variables. If the decrease criteria has been met, then the level of difficulty is decreased in step 738 and the method returns to step 722 to present the next task to the user at the lower level of difficulty. If the decrease level criteria has also not been met, then the task continues at the same level and loops back to step 722. In this manner, the above task may be used to train a user's skills.

Figure 27:
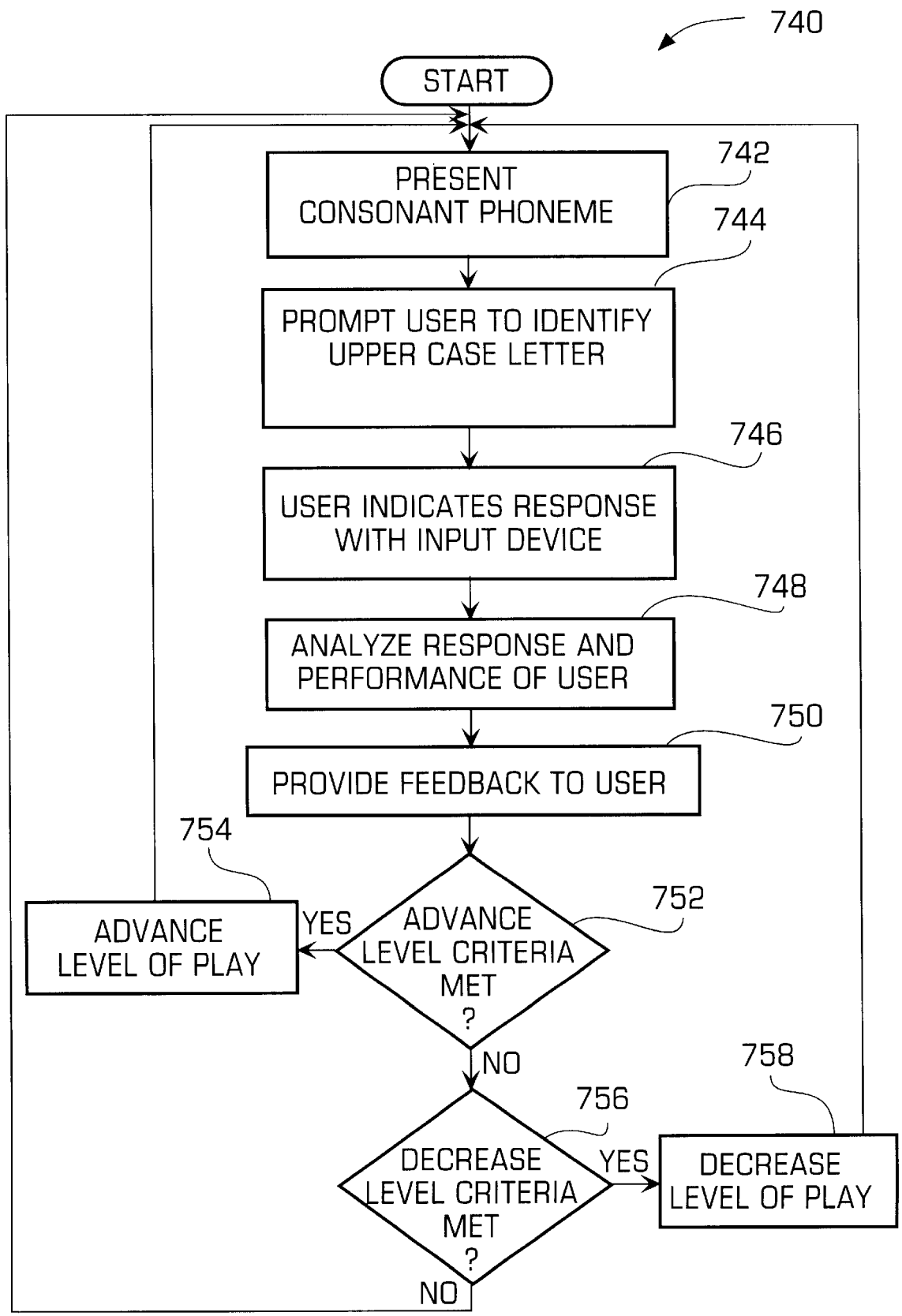

FIG. 27 illustrates a fourth task 740 of the sound/symbol training module ("Letter Express") in accordance with the invention wherein the user the letters corresponding to a consonant phoneme. When presented with a phoneme sound, the student will select the corresponding upper case letter from a set of response choices displayed on the screen. An associated word will or will not be displayed. Auditory cues will or will not be available. Response choices will be phonetically similar or phonetically dissimilar. In this task, phoneme sounds will be limited to the most common sound-symbol associations for the 21 consonant letters of the English alphabet and three common digraphs: sh, ch, th.

In step 742, the system may present the user with a consonant phoneme. The system may then prompt the user to respond to the above stimuli by identifying the corresponding upper case letters corresponding to the phoneme in step 744 and the user may input a response in step 746 using an input device of the computer, such as the keyboard, the mouse, the speech recognition tool or the like. Once the computer system receives the response from the user, the system may analyze the user's response (e.g., correct or incorrect) in step 748 and the user's performance of the task (e.g., did the user respond within the allotted time?). In step 750, the system may provide feedback to the user about the user's performance in the task wherein the feedback may be visual or auditory. In step 752, the system determines if the criteria has been met to increase the level of difficulty of the task. The level of difficulty may be increased by changing one or more difficulty variables. In this task, the difficulty variables may include the presence of visual cues, the presence of an associated keyword or the phonetic similarity of the response choices. If the advancement criteria has been met, then the level of difficulty is increased in step 754 and the method returns to step 742 to present the next task to the user at the higher difficulty level. If the advancement criteria is not met, then the system determines if the decrease level criteria has been met in step 756. The level of difficulty may be decreased by changing one or more difficulty variables. If the decrease criteria has been met, then the level of difficulty is decreased in step 758 and the method returns to step 742 to present the next task to the user at the lower level of difficulty. If the decrease level criteria has also not been met, then the task continues at the same level and loops back to step 742. In this manner, the above task may be used to train a user's skills.

Figure 28A:
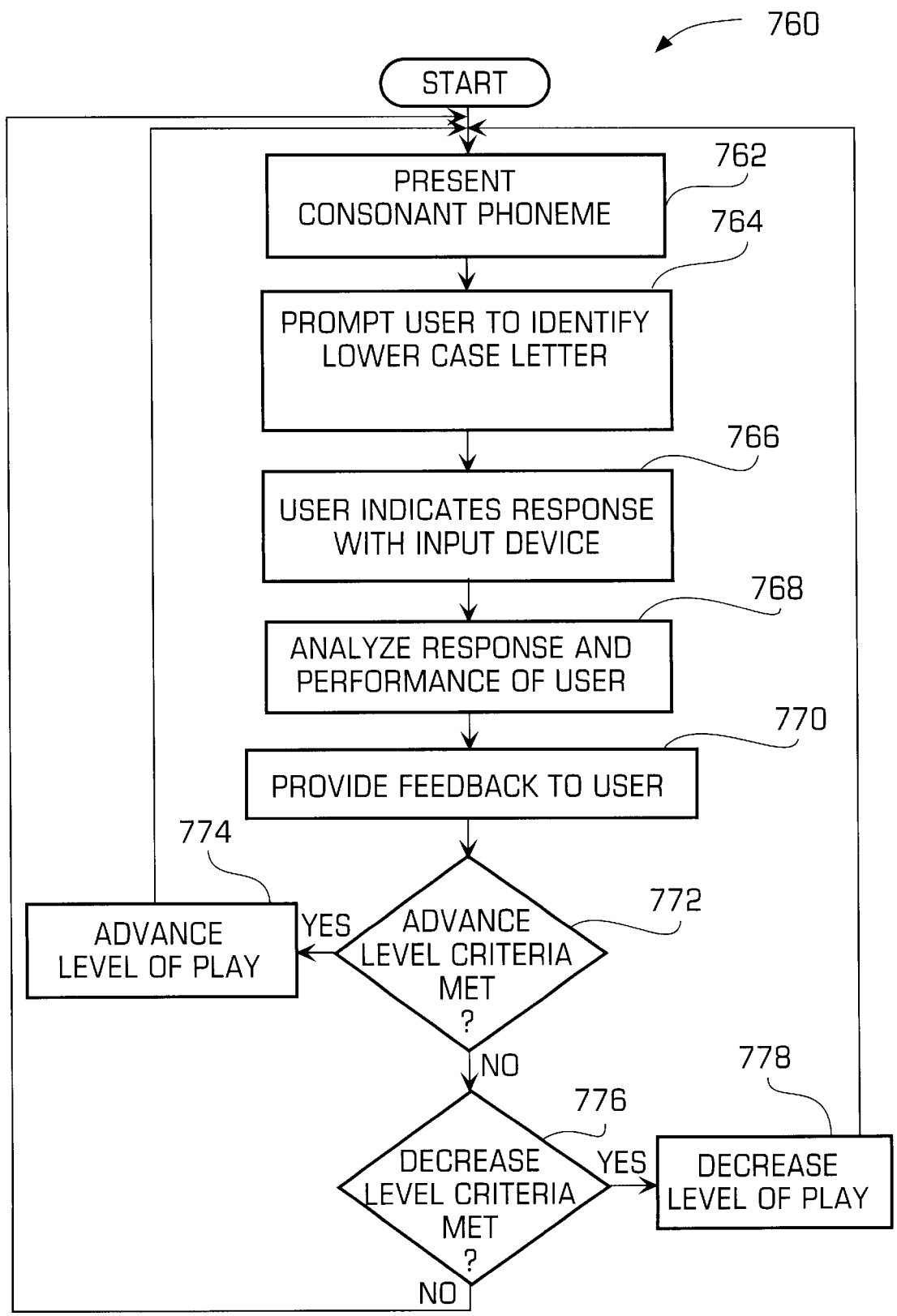
Figure 28B:
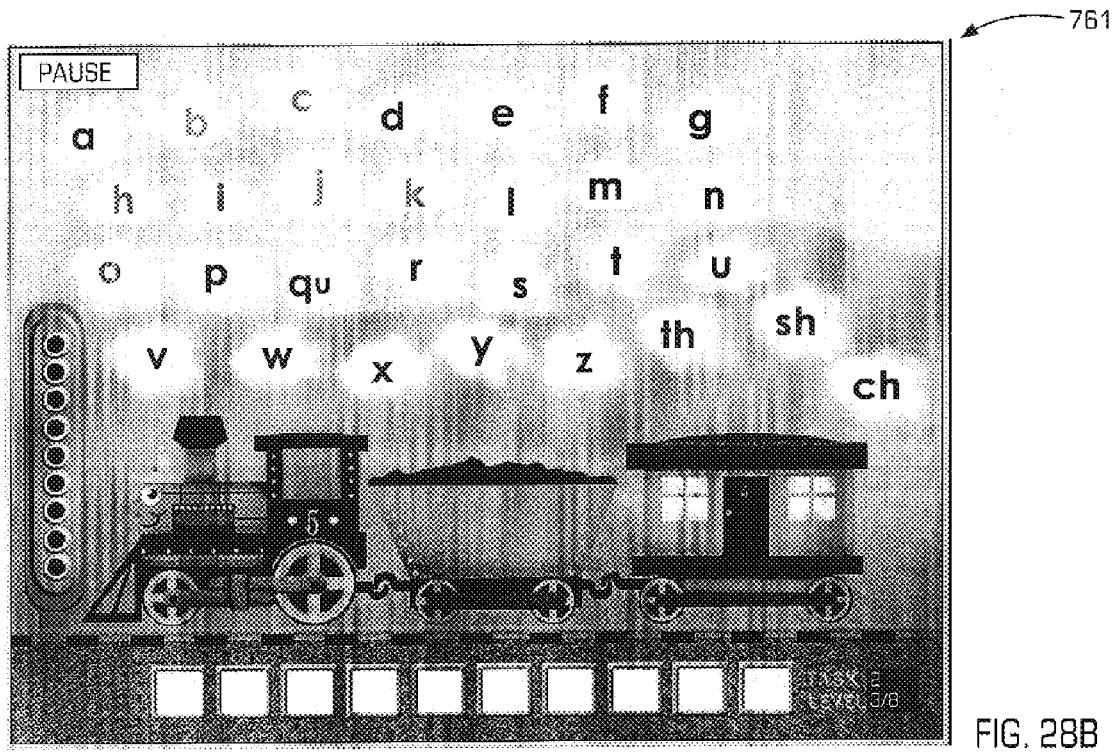

FIG. 28A illustrates a fifth task 760 of the sound/symbol training module ("Letter Express") in accordance with the invention wherein the user is orally presented with a consonant phoneme and asked to identify the lowercase letter corresponding to the phoneme. FIG. 28B illustrates an example of a user interface 761 of the fifth task. When presented with a phoneme sound, the student will select the corresponding lower case letter from a set of response choices displayed on the screen. An associated word will or will not be displayed. Auditory cues will or will not be available. Response choices will be phonetically-similar or dissimilar. In this task, phoneme sounds will be limited to the most common sound-symbol associations for the 21 consonant letters of the English alphabet and three common digraphs: sh, ch, th In step 762, the system may present the user with a consonant phoneme. The system may then prompt the user to respond to the above stimuli by identifying the corresponding lower case letter (see FIG. 28B) in step 764 and the user may input a response in step 766 using an input device of the computer, such as the keyboard, the mouse, the speech recognition tool or the like. Once the computer system receives the response from the user, the system may analyze the user's response (e.g., correct or incorrect) in step 768 and the user's performance of the task (e.g., did the user respond within the allotted time?). In step 770, the system may provide feedback to the user about the user's performance in the task wherein the feedback may be visual or auditory. In step 772, the system determines if the criteria has been met to increase the level of difficulty of the task. The level of difficulty may be increased by changing one or more difficulty variables. In this task, the difficulty variables may be the same as the previous task. If the advancement criteria has been met, then the level of difficulty is increased in step 774 and the method returns to step 762 to present the next task to the user at the higher difficulty level. If the advancement criteria is not met, then the system determines if the decrease level criteria has been met in step 776. The level of difficulty may be decreased by changing one or more difficulty variables. If the decrease criteria has been met, then the level of difficulty is decreased in step 778 and the method returns to step 762 to present the next task to the user at the lower level of difficulty. If the decrease level criteria has also not been met, then the task continues at the same level and loops back to step 762. In this manner, the above task may be used to train a user's skills.

Figure 29A:
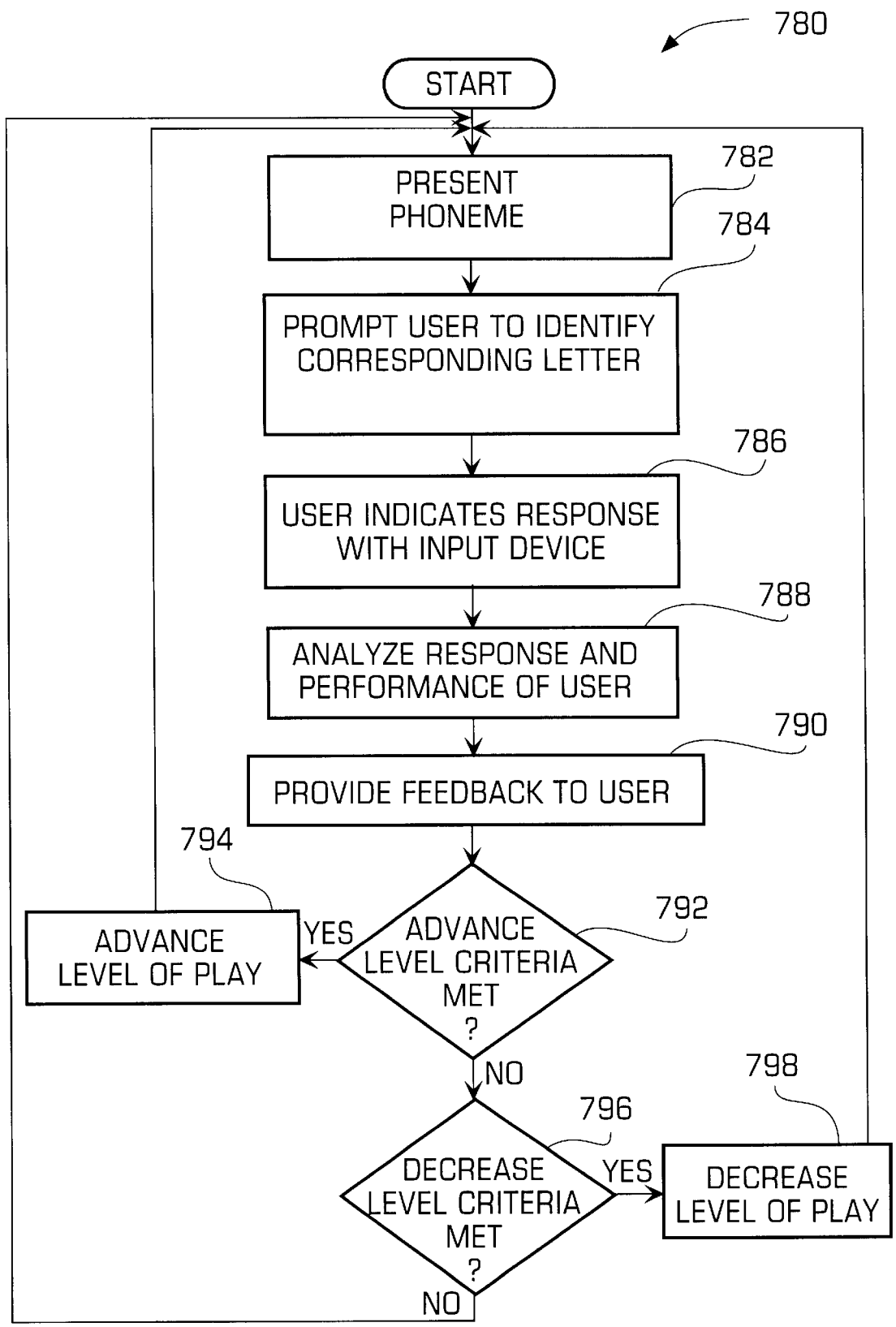
Figure 29B:
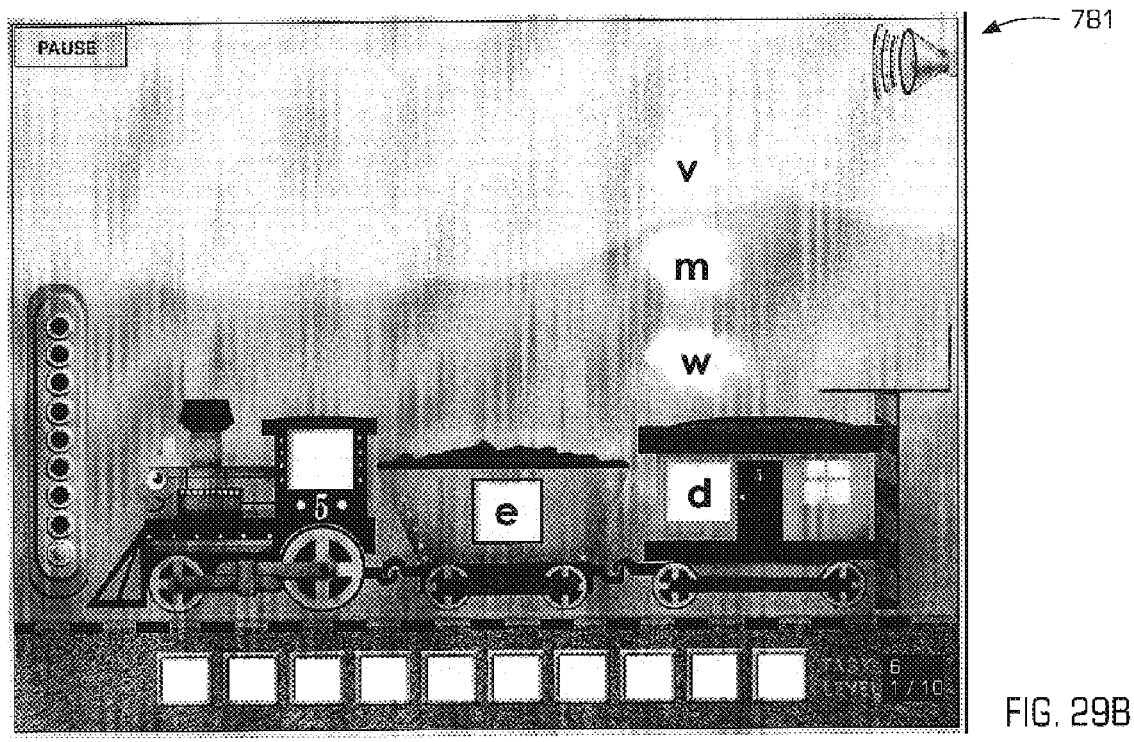

FIG. 29A illustrates a sixth task 780 of the sound/symbol training module ("Letter Express") in accordance with the invention wherein the user identifies the corresponding letter to a phoneme. FIG. 29B illustrates an example of a user interface 781 for this task. In step 782, the system may present the user with a phoneme. The system may then prompt the user to respond to the above stimuli by identifying the corresponding letter in step 784 and the user may input a response in step 786 using an input device of the computer, such as the keyboard, the mouse, the speech recognition tool or the like. Once the computer system receives the response from the user, the system may analyze the user's response (e.g., correct or incorrect) in step 788 and the user's performance of the task (e.g., did the user respond within the allotted time?). In step 790, the system may provide feedback to the user about the user's performance in the task wherein the feedback may be visual or auditory. In step 792, the system determines if the criteria has been met to increase the level of difficulty of the task. The level of difficulty may be increased by changing one or more difficulty variables. In this task, the difficulty variables may include the perceptual saliency of the phoneme, the display of the printed letter and the upper vs. lower case display of the letter. If the advancement criteria has been met, then the level of difficulty is increased in step 794 and the method returns to step 782 to present the next task to the user at the higher difficulty level. If the advancement criteria is not met, then the system determines if the decrease level criteria has been met in step 796. The level of difficulty may be decreased by changing one or more difficulty variables. If the decrease criteria has been met, then the level of difficulty is decreased in step 798 and the method returns to step 782 to present the next task to the user at the lower level of difficulty. If the decrease level criteria has also not been met, then the task continues at the same level and loops back to step 782. In this manner, the above task may be used to train a user's skills.

Figure 30:
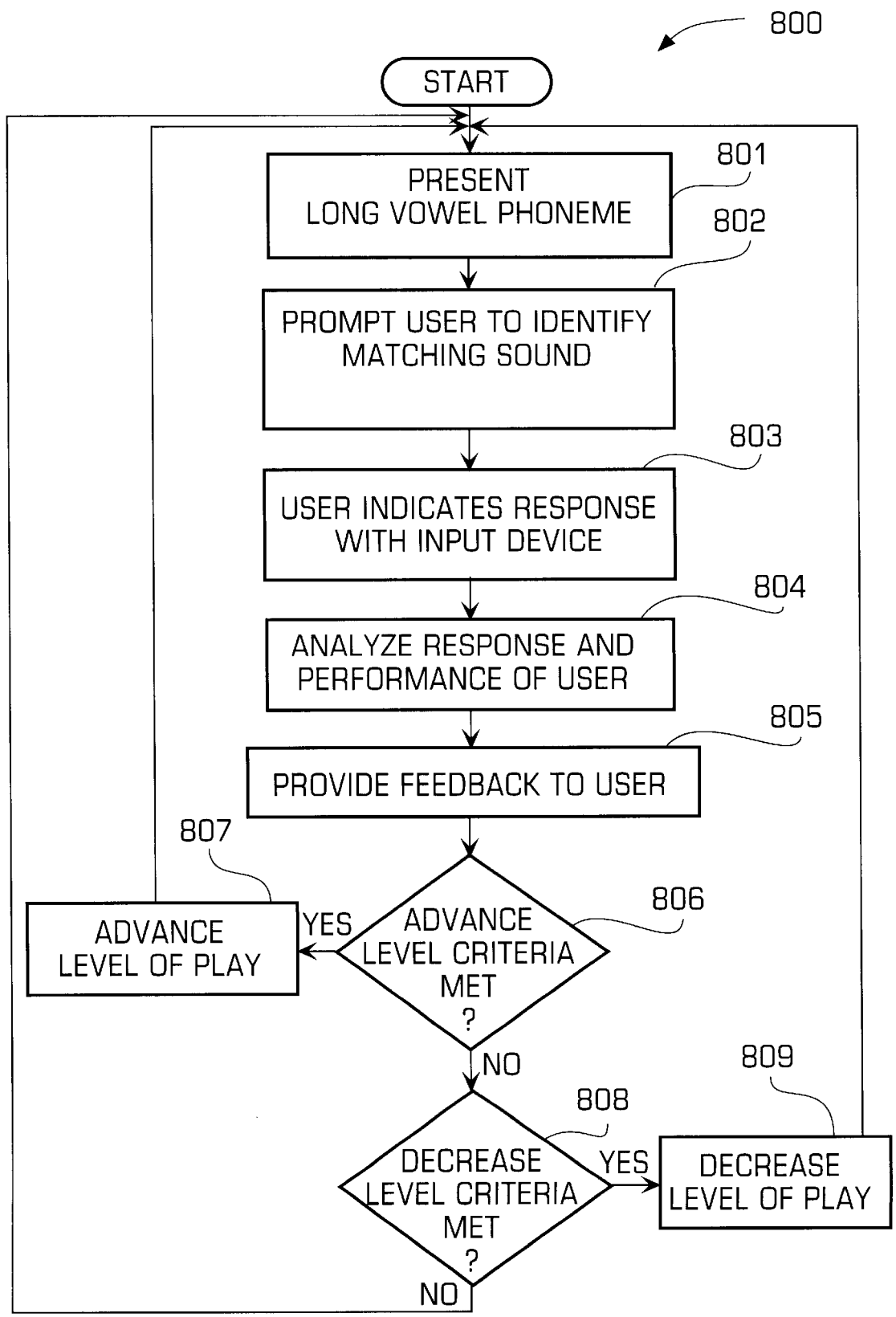

FIG. 30 illustrates a seventh task 800 of the sound/symbol training module ("Letter Express") in accordance with the invention wherein the user is asked to match the sound of a long vowel phoneme. In this task, the student will identify the vowel phoneme of a real or nonsense. CVC word. The student will select a response from a set of three response choices or by typing a letter on the keyboard. The student will manipulate vowel phonemes and letters to spell new CVC words.

In step 801, the system may present the user with a long vowel phoneme. The system may then prompt the user to respond to the above stimuli by identifying the corresponding sound in step 802 and the user may input a response in step 803 using an input device of the computer, such as the keyboard, the mouse, the speech recognition tool or the like. Once the computer system receives the response from the user, the system may analyze the user's response (e.g., correct or incorrect) in step 804 and the user's performance of the task (e.g., did the user respond within the allotted time?). In step 805, the system may provide feedback to the user about the user's performance in the task wherein the feedback may be visual or auditory. In step 806, the system determines if the criteria has been met to increase the level of difficulty of the task. The level of difficulty may be increased by changing one or more difficulty variables. In this task, the difficulty variables may include the number of response choices, the display of the printed letter or the upper vs. lower case letters. If the advancement criteria has been met, then the level of difficulty is increased in step 807 and the method returns to step 801 to present the next task to the user at the higher difficulty level. If the advancement criteria is not met, then the system determines if the decrease level criteria has been met in step 808. The level of difficulty may be decreased by changing one or more difficulty variables. If the decrease criteria has been met, then the level of difficulty is decreased in step 809 and the method returns to step 801 to present the next task to the user at the lower level of difficulty. If the decrease level criteria has also not been met, then the task continues at the same level and loops back to step 801. In this manner, the above task may be used to train a user's skills.

Figure 31:
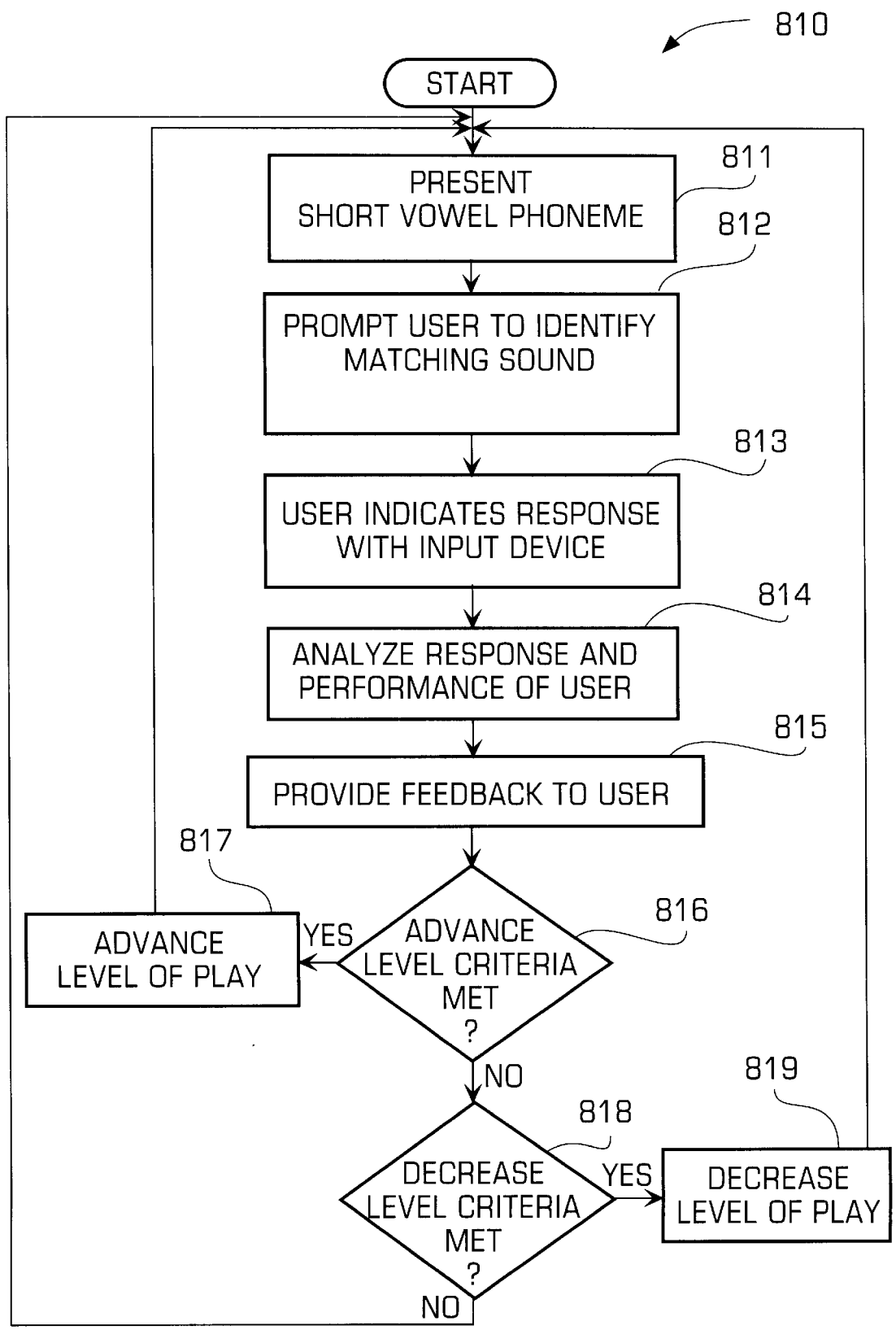

FIG. 31 illustrates an eighth task 810 of the sound/symbol, training module ("Letter Express") in accordance with the invention wherein the user identifies the sound associated with a presented short vowel phoneme. When presented with a 2×4 or 3×4 matrix of phonetically-similar phonemes, the student will recall and match pairs of long vowel phonemes and will recall and match short vowel phonemes with upper case and lower case graphemes in a timed 1 minute per round task.

In step 811, the system may present the user with a short vowel phoneme. The system may then prompt the user to respond to the above stimuli by identifying the letter corresponding to the phoneme in step 812 and the user may input a response in step 813 using an input device of the computer, such as the keyboard, the mouse, the speech recognition tool or the like. Once the computer system receives the response from the user, the system may analyze the user's response (e.g., correct or incorrect) in step 814 and the user's performance of the task (e.g., did the user respond within the allotted time?). In step 815, the system may provide feedback to the user about the user's performance in the task wherein the feedback may be visual or auditory. In step 816, the system determines if the criteria has been met to increase the level of difficulty of the task. The level of difficulty may be increased by changing one or more difficulty variables.

In this task, the difficulty variables are the same as the previous task. If the advancement criteria has been met, then the level of difficulty is increased in step 817 and the method returns to step 811 to present the next task to the user at the higher difficulty level. If the advancement criteria is not met, then the system determines if the decrease level criteria has been met in step 818. The level of difficulty may be decreased by changing one or more difficulty variables. If the decrease criteria has been met, then the level of difficulty is decreased in step 819 and the method returns to step 811 to present the next task to the user at the lower level of difficulty. If the decrease level criteria has also not been met, then the task continues at the same level and loops back to step 811. In this manner, the above task may be used to train a user's skills.

Figure 32:
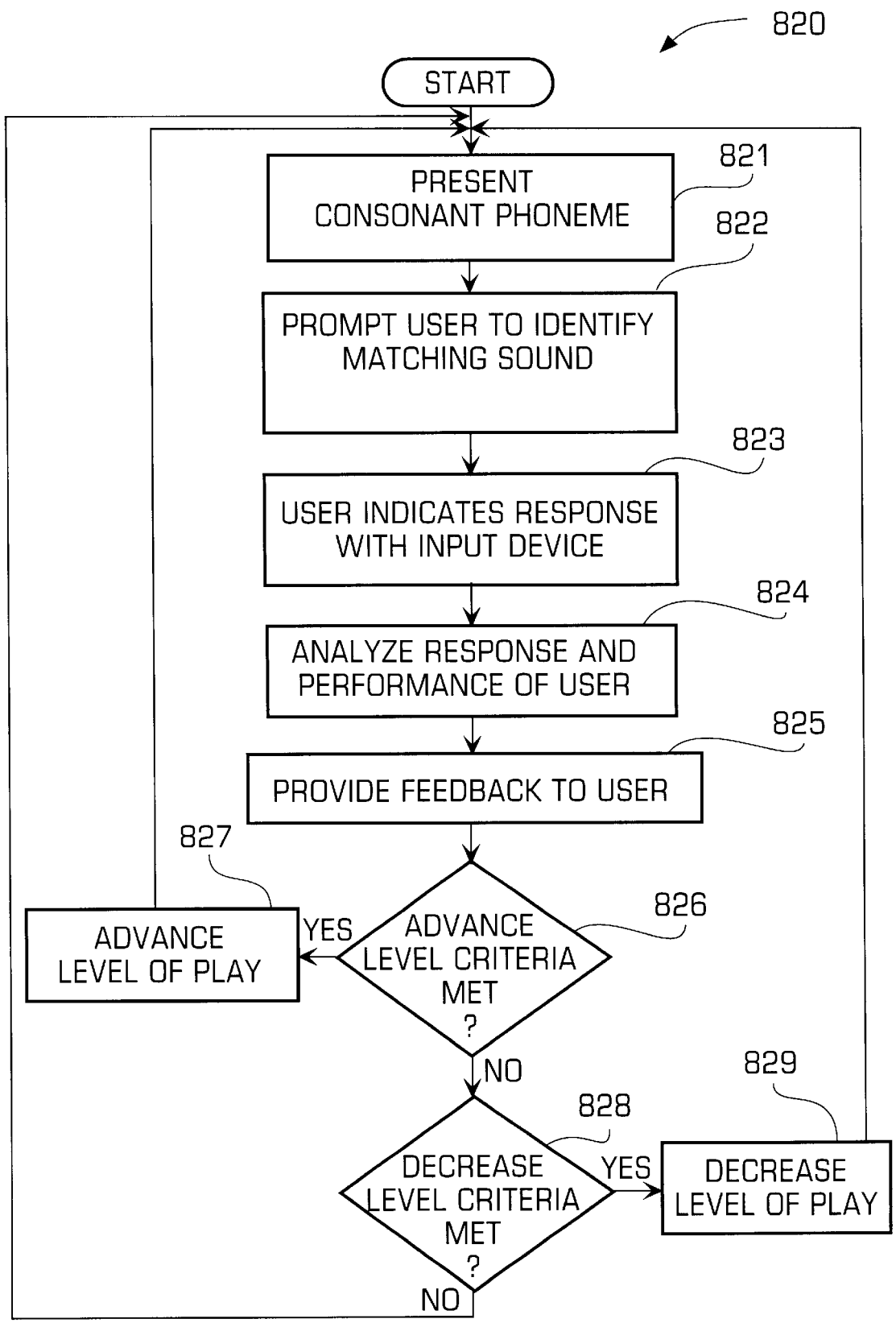

FIG. 32 illustrates a ninth task 820 of the sound/symbol training module ("Letter Express") in accordance with the invention wherein the user identifies a letter corresponding to a consonant phoneme. When presented with a 2×4 or 3×4 matrix of phonetically-similar phonemes, the student will recall and match pairs of consonant phonemes and will recall and match consonant phonemes with upper case and lower case graphemes in a timed 60 second task.

In step 821, the system may present the user with a consonant phoneme. The system may then prompt the user to respond to the above stimuli by identifying the letter corresponding to the phoneme in step 822 and the user may input a response in step 823 using an input device of the computer, such as the keyboard, the mouse, the speech recognition tool or the like. Once the computer system receives the response from the user, the system may analyze the user's response (e.g., correct or incorrect) in step 824 and the user's performance of the task (e.g., did the user respond within the allotted time?). In step 825, the system may provide feedback to the user about the user's performance in the task wherein the feedback may be visual or auditory. In step 826, the system determines if the criteria has been met to increase the level of difficulty of the task. The level of difficulty may be increased by changing one or more difficulty variables. In this task, the difficulty variables are the same as the previous task. If the advancement criteria has been met, then the level of difficulty is increased in step 827 and the method returns to step 821 to present the next task to the user at the higher difficulty level. If the advancement criteria is not met, then the system determines if the decrease level criteria has been met in step 828. The level of difficulty may be decreased by changing one or more difficulty variables. If the decrease criteria has been met, then the level of difficulty is decreased in step 829 and the method returns to step 821 to present the next task to the user at the lower level of difficulty. If the decrease level criteria has also not been met, then the task continues at the same level and loops back to step 821. In this manner, the above task may be used to train a user's skills.

Figure 33:
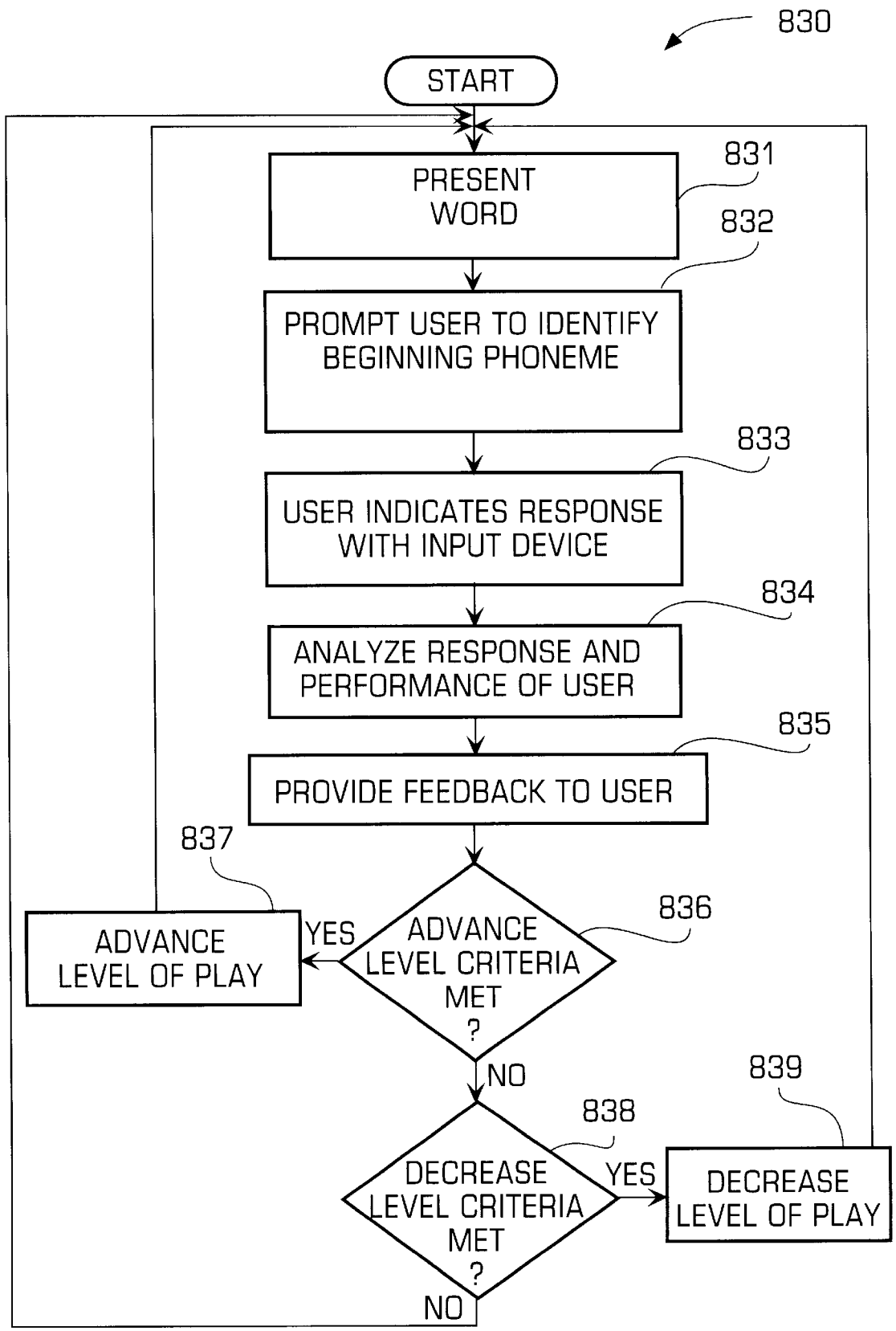

FIG. 33 illustrates a tenth task 830 of the sound/symbol training module ("Letter Express") in accordance with the invention wherein the user identifies the beginning phoneme of a word. In this task, the student will identify the beginning consonant phoneme of a real or nonsense CVC word. The student will select a response from a set of three phonetically similar or phonetically dissimilar response choices or by typing a letter on the keyboard. The student will manipulate phonemes and letters to spell new CVC and CVCe words.

In step 831, the system may present the user with a word. The system may then prompt the user to respond to the above stimuli by identifying the beginning phoneme of the word in step 832 and the user may input a response in step 833 using an input device of the computer, such as the keyboard, the mouse, the speech recognition tool or the like. Once the computer system receives the response from the user, the system may analyze the user's response (e.g., correct or incorrect) in step 834 and the user's performance of the task (e.g., did the user respond within the allotted time?). In step 835, the system may provide feedback to the user about the user's performance in the task wherein the feedback may be visual or auditory. In step 836, the system determines if the criteria has been met to increase the level of difficulty of the task. The level of difficulty may be increased by changing one or more difficulty variables. In this task, the difficulty variables may include the type of the word (e.g., real vs. nonsense), format of the response choices (e.g., auditory only, visual only, auditory and visual or none) or the phonetic similarity of the response choices. If the advancement criteria has been met, then the level of difficulty is increased in step 837 and the method returns to step 831 to present the next task to the user at the higher difficulty level. If the advancement criteria is not met, then the system determines if the decrease level criteria has been met in step 838. The level of difficulty may be decreased by changing one or more difficulty variables. If the decrease criteria has been met, then the level of difficulty is decreased in step 839 and the method returns to step 831 to present the next task to the user at the lower level of difficulty. If the decrease level criteria has also not been met, then the task continues at the same level and loops back to step 831. In this manner, the above task may be used to train a user's skills.

Figure 34A:
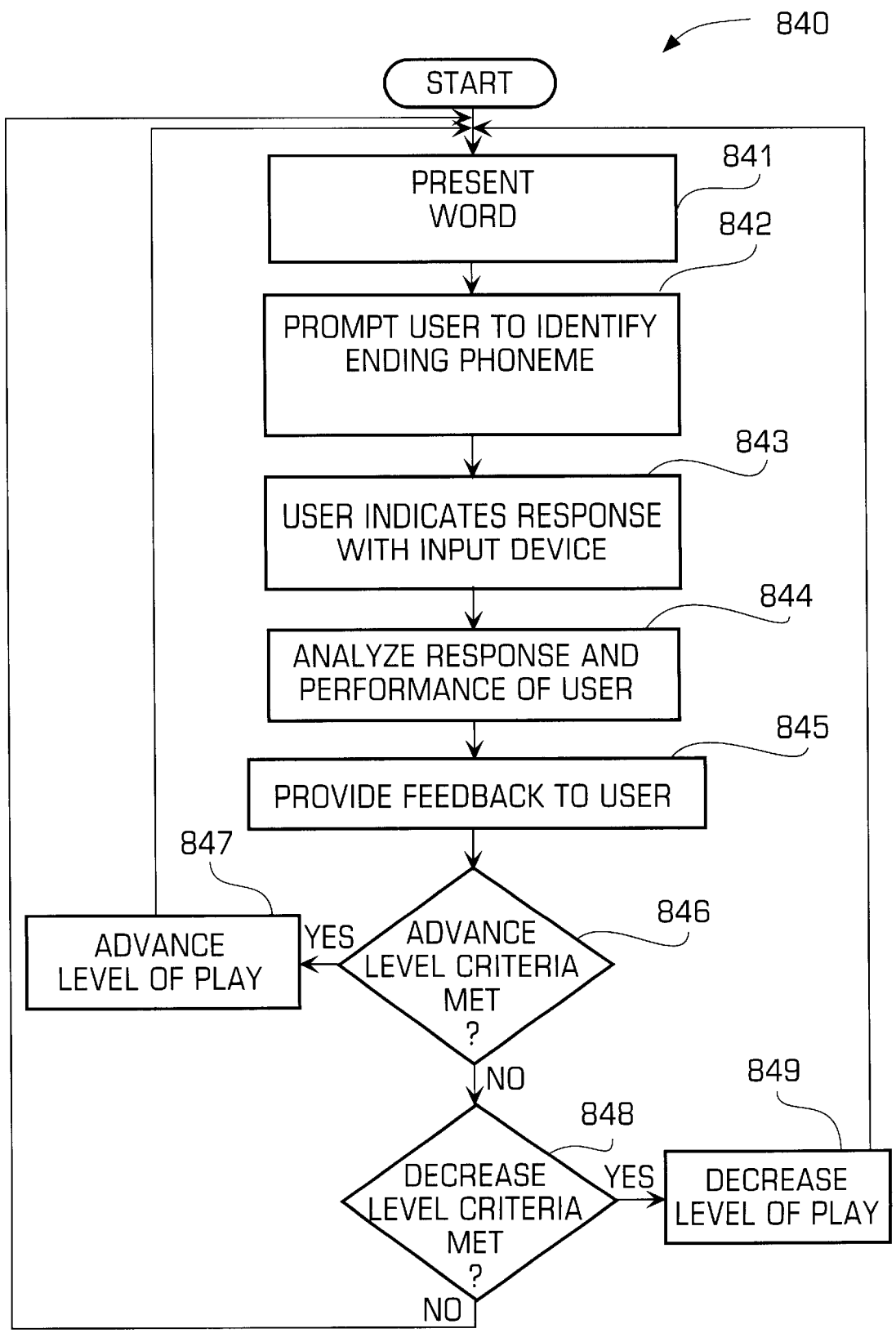

FIG. 34A illustrates an eleventh task 840 of the sound/symbol training module ("Letter Express") in accordance with the invention wherein the user identifies the ending phoneme of a word. In this task, the student will identify the final consonant phoneme of a real or nonsense frequency CVC word. The student will select a response from a set of three phonetically similar or phonetically dissimilar response choices or by typing a letter on the keyboard. The student will manipulate phonemes and letters to spell new CVC words.

In step 841, the system may present the user with a word. The system may then prompt the user to respond to the above stimuli by identifying the ending phoneme in the word in step 842 and the user may input a response in step 843 using an input device of the computer, such as the keyboard, the mouse, the speech recognition tool or the like. Once the computer system receives the response from the user, the system may analyze the user's response (e.g., correct or incorrect) in step 844 and the user's performance of the task (e.g., did the user respond within the allotted time?). In step 845, the system may provide feedback to the user about the user's performance in the task wherein the feedback may be visual or auditory. In step 846, the system determines if the criteria has been met to increase the level of difficulty of the task. The level of difficulty may be increased by changing one or more difficulty variables. In this task, the difficulty variables may be the same as the prior task. If the advancement criteria has been met, then the level of difficulty is increased in step 847 and the method returns to step 841 to present the next task to the user at the higher difficulty level. If the advancement criteria is not met, then the system determines if the decrease level criteria has been met in step 848. The level of difficulty may be decreased by changing one or more difficulty variables. If the decrease criteria has been met, then the level of difficulty is decreased in step 849 and the method returns to step 841 to present the next task to the user at the lower level of difficulty. If the decrease level criteria has also not been met, then the task continues at the same level and loops back to step 841. In this manner, the above task may be used to train a user s skills.

Figure 34B:
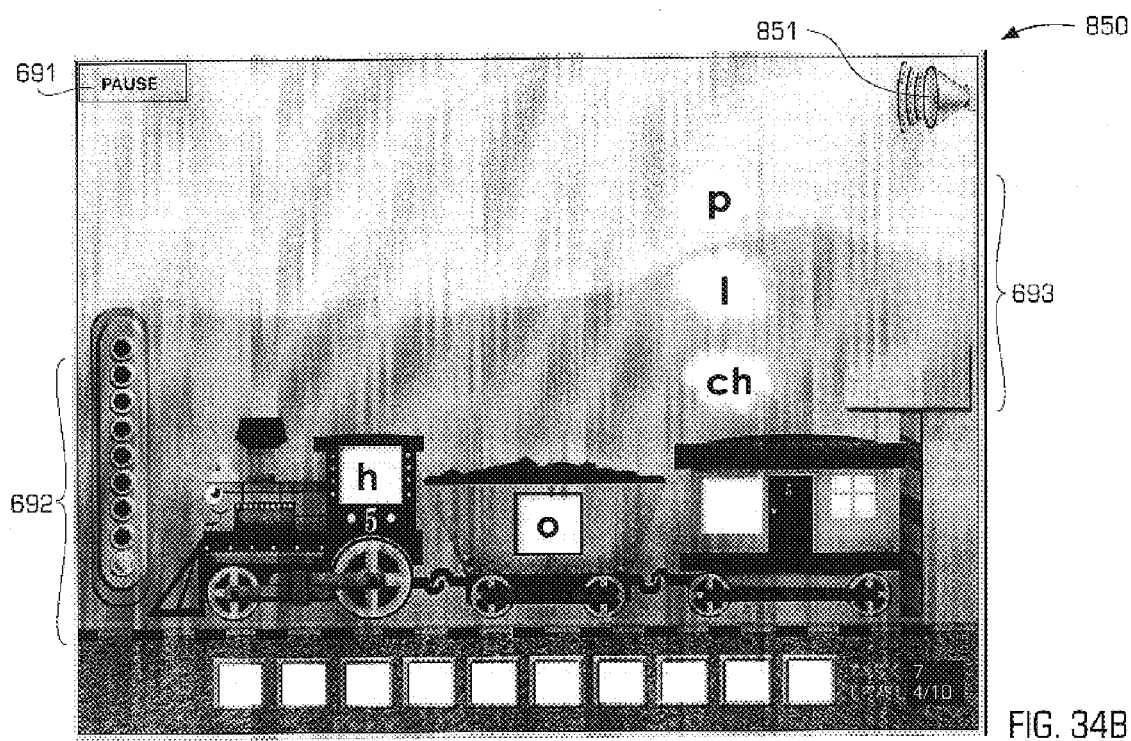
Figure 35:
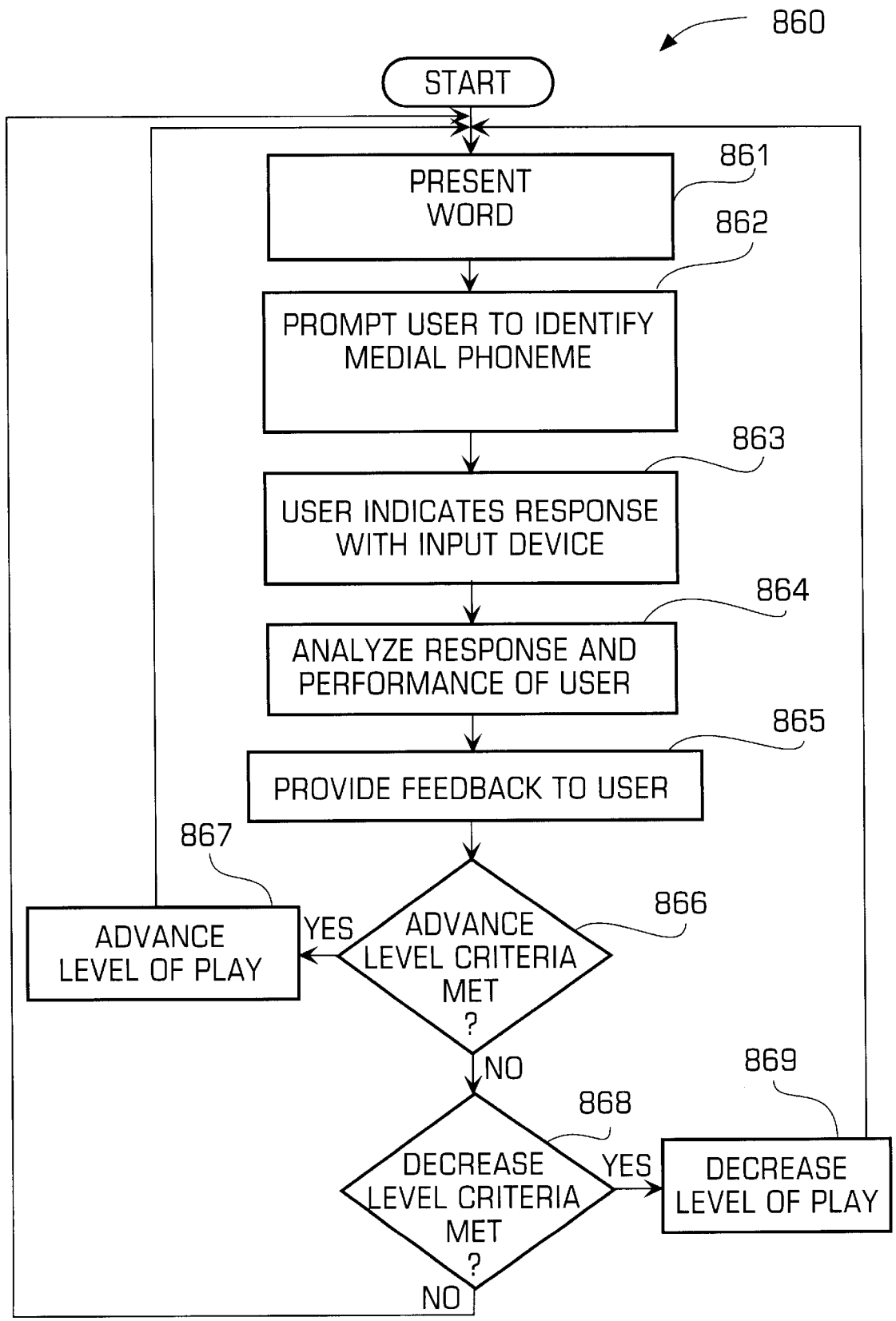

FIG. 34B illustrates an example of a user interface 850 for this task. The user interface has the same elements as the other user interfaces for this module including the pause button 691, the animated character 692 and the puffs of smoke 693 that contain letters. In addition, this user interface may include a sound control icon 851 that permits the user to control the loudness of the auditory cues provided to the user. As shown, the puffs of smoke may contain one or more different ending phonemes for a word spoken to the user and the user must select the correct ending phoneme FIG. 35 illustrates a last task 860 of the sound/symbol training module ("Letter Express") in accordance with the invention wherein the user identifies the medial phoneme of a word. In step 861, the system may present the user with a word. The system may then prompt the user to respond to the above stimuli by identifying the medial phoneme in step 862 and the user may input a response in step 863 using an input device of the computer, such as the keyboard, the mouse, the speech recognition tool or the like. Once the computer system receives the response from the user, the system may analyze the user's response (e.g., correct or incorrect) in step 864 and the user's performance of the task (e.g., did the user respond within the allotted time?). In step 865, the system may provide feedback to the user about the user's performance in the task wherein the feedback may be visual or auditory. In step 866, the system determines if the criteria has been met to increase the level of difficulty of the task. The level of difficulty may be increased by changing one or more difficulty variables. In this task, the difficulty variables are the same as for the previous task. If the advancement criteria has been met, then the level of difficulty is increased in step 867 and the method returns to step 861 to present the next task to the user at the higher difficulty level. If the advancement criteria is not met, then the system determines if the decrease level criteria has been met in step 868. The level of difficulty may be decreased by changing one or more difficulty variables. If the decrease criteria has been met, then the level of difficulty is decreased in step 869 and the method returns to step 831 to present the next task to the user at the lower level of difficulty. If the decrease level criteria has also not been met, then the task continues at the same level and loops back to step 831. In this manner, the above task may be used to train a user's skills. The above tasks constitute the training provided to the user by the sound/symbol training module that trains various primary and secondary skills as set forth above. Now, the tasks of the sound and word recognition training module will be described in more detail.

Figure 36:
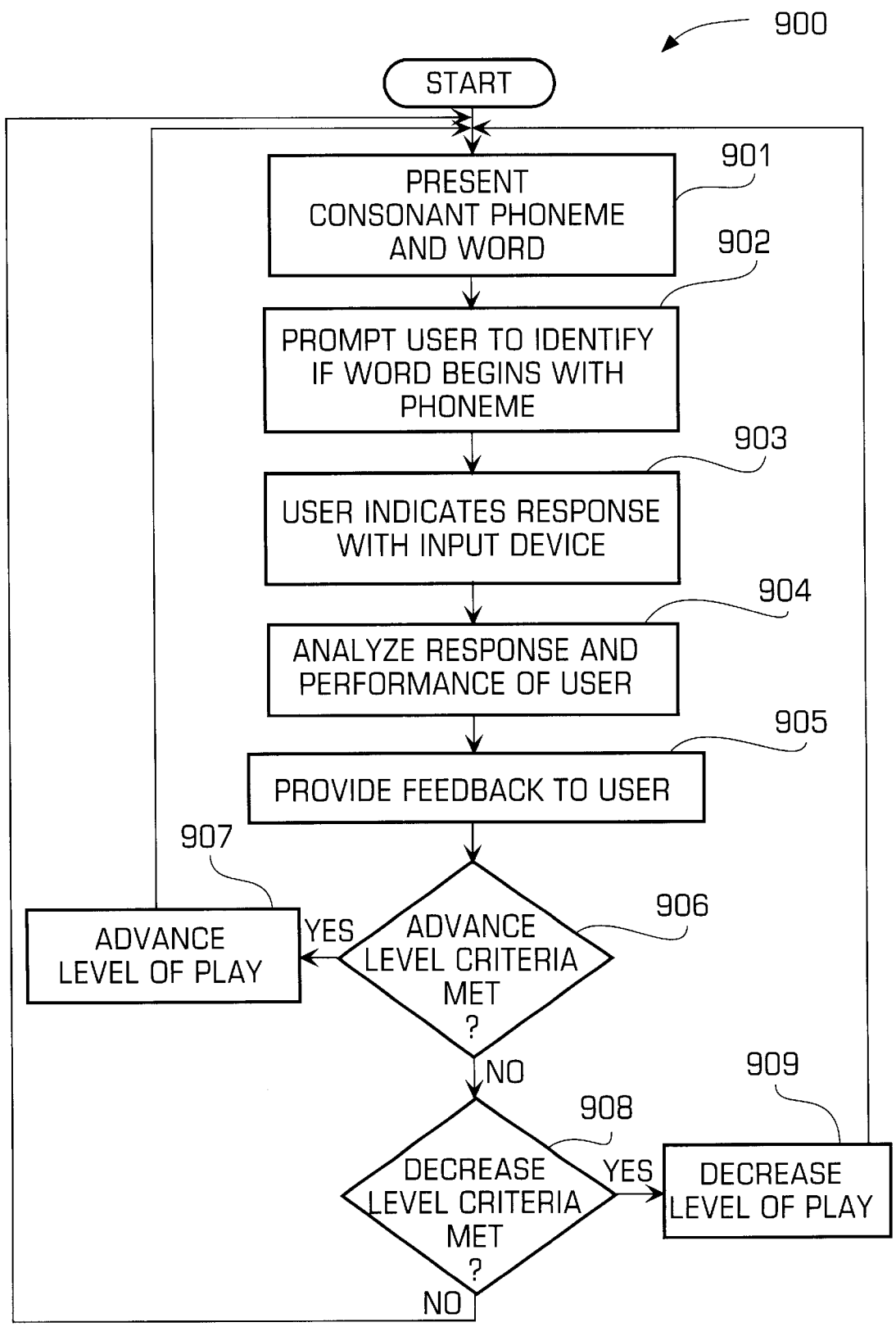
FIGS. 36–48 are diagrams illustrating more details of each task in the sound and word recognition training module ("Circus Fun") in accordance with the invention.

FIGS. 36A–48 are diagrams illustrating more details of each task in the sound and word recognition training module ("Circus Fun") in accordance with the invention. In a preferred implementation of this module, the user may click on an element to have some Circus Fun with Karloon (an animated clown character as shown in FIG. 36B). Karloon does many tricks while students learn to sort words into categories by sound, spelling and meaning, recognize sight words and identify word-final morphemes. The activities may include sorting words by category, recognizing non-decodable high frequency sight words and matching letters, sounds and morphemes.

In the first activity, the user helps Karloon sort words into categories by clicking on his ID right or left shoe. Once Karloon tells students the target feature they need to sort words, he will present a printed word. Students need to click on his right shoe if the word belongs in the group on the right of the screen and on his left shoe if the word belongs in the group on the left side of the screen. Students will look and listen to the word then decide whether to put it on the target category group or on the non-target category group. As students gain proficiency in sorting by answering 80% or more items correctly in a round of ten, they must sort words more quickly. Karloon begins by showing and saying each word, but when students show proficiency in sorting words presented at 4-, 2- and 1-second intervals, his narration is eliminated and students must sort based only on what they see. At the end of a sort, Karloon reads all of the words in the target category out loud. When students are able to sort words by initial consonant presented at 4-, 2- and 1-second intervals with 80% accuracy or better, Circus Fun automatically advances to sorting words by initial consonant digraph, then closed syllable VC rimes, short vowels, final consonants and finally by final consonant digraphs. Circus Fun continues to increase difficulty by varying the intervals between words as well as by eliminating narration to help students develop automatic word recognition. The last three tasks in this activity require students to sort words into semantic categories. Color, Number, Shape, Animal, Object and People words are provided to students as they are asked to sort by their respective categories. As in the previous tasks, difficulty will increase by reducing response intervals and eliminating auditory presentation of each word. If students do not sort a word correctly, the word is automatically placed in the correct category and the student receives an auditory prompt reinforcing the correct answer. A score of less than 50% results in a decrease of level of play. When students successfully complete a round of 10 with 80% accuracy or better, Karloon gives them a fun show of his unicycle-riding skills.

In the second activity, Karloon will present a target word to students. Nine balloons will appear on a dart board in the middle of the screen. Words will appear at a rate of 15- 30- or 60 words per minute. Students will be asked to click on a dart when they see and hear or see a target word on the dart board. If correct, the dart will hit the target and the balloon will burst. If incorrect, the target word that Karloon is holding will flash and the word will be pronounced again. After getting 80% correct in a round of ten, Circus Fun automatically advances by increasing the rate at which words are presented. Once students have become proficient at recognizing words presented with auditory and visual support, the target word will be taken off of the screen before the words are presented, encouraging students to hold the target word in memory while they wait for the match to appear on the dart board. Circus Fun continues to increase in difficulty by varying whether words are presented visually or auditorily or both. At the highest level of these tasks, students will be asked to match a auditorily presented target word to a word presented visually. After missing 50% or more of the items in a round of 10, the level of difficulty will decrease.

In the third activity, the user may click on the top left box of the maze to begin. After a brief tutorial, Karloon will present a word. Students must roll-over two adjacent highlighted boxes, listen to or look at the words in the boxes and decide which one has a matching sound and/or spelling. Click on the correct box after rolling over both boxes and listening to their pronunciations or looking at their spellings. If correct, students will use the correct answer as the target for the next set of boxes in the maze and will roll-over two different boxes to find the match. Karloon has a pile of ten balls next to him at the beginning of every round. For every correct answer, students get a hat with a flower in each box and Karloon picks up a ball from the pile. For incorrect answers or if the maze is not completed in the time allowed, the maze will end, a new maze will begin, and a ball from the top of the pile will roll off the screen. When the maze is complete, the words will be read aloud as their respective boxes are highlighted.

Circus Fun automatically increases difficulty after students get three trials correct. Students begin with auditory and visual presentation of words containing the same short vowel sounds and letters. Initially, short vowel targets are highlighted within the words presented. Students will begin the tasks with unlimited time to respond, however, as they master matching short vowels in words, the amount of time allowed to complete a maze will be reduced to 20 seconds then to 10 seconds. Circus Fun continues to increase difficulty by eliminating highlighted vowels and providing visual-only presentation without narration. Once students master matching short vowels, Circus Fun automatically advances by introducing word final morphemes. For the last levels of this game, students are asked to match plural nouns and verbs ending in "ed", "ing" "es" and "s". Karloon provides a brief tutorial to reinforce the concept of plurality as well as present and past tense. This tutorial can be by-passed by clicking once on the square in the upper left hand corner of the maze. Students are asked to match words with final morphemes when provided with auditory-only, auditory-visual and visual-only targets. Circus Fun continues to increase difficulty by varying availability of a visual cue and decreasing the time allowed to complete a maze. Now, the individual tasks in the module will be described in more detail.

FIG. 36 illustrates more details of the first task 900 of the sound and word recognition training module wherein the user determines if a word begins with a particular phoneme. This task may be broken down into two sub-tasks wherein single consonants are used and consonant digraphs are used. In the first sub-task, the student will sort words based on initial consonant sound and single consonant letter when a series of words is presented at a rate of 30 words per minute (wpm), 45 wpm and 60 wpm. Words will be presented in auditory only, auditory+visual, or visual only format. A visual cue will or will not be provided to facilitate performance with visual presentations. In the second sub-task, the student will sort words based on initial consonant sound and consonant digraphs when a series of words is presented at a rate of 30 wpm, 45 wpm and 60 wpm. Words will be presented in auditory only, auditory+visual, or visual only format. A visual cue will or will not be provided to facilitate performance with visual presentations. Now, the first sub-task will be described in more detail.

In step 901, the system may present the user with a consonant phoneme and a word. The system may then prompt the user to respond to the above stimuli by identifying if the word begins with the phoneme in step 902 and the user may input a response in step 903 using an input device of the computer, such as the keyboard, the mouse, the speech recognition tool or the like. Once the computer system receives the response from the user, the system may analyze the user's response (e.g., correct or incorrect) in step 904 and the user's performance of the task (e.g., did the user respond within the allotted time?). In step 905, the system may provide feedback to the user about the user's performance in the task wherein the feedback may be visual or auditory. In step 906, the system determines if the criteria has been met to increase the level of difficulty of the task. The level of difficulty may be increased by changing one or more difficulty variables. In this task, the difficulty variables may include the presentation format (e.g., auditory only, visual only or auditory and visual), the availability of a visual cue or the time allowed for a response. If the advancement criteria has been met, then the level of difficulty is increased in step 907 and the method returns to step 901 to present the next task to the user at the higher difficulty level. If the advancement criteria is not met, then the system determines if the decrease level criteria has been met in step 908. The level of difficulty may be decreased by changing one or more difficulty variables. If the decrease criteria has been met, then the level of difficulty is decreased in step 909 and the method returns to step 901 to present the next task to the user at the lower level of difficulty. If the decrease level criteria has also not been met, then the task continues at the same level and loops back to step 901. In this manner, the above task may be used to train a user's skills.

Figure 37:
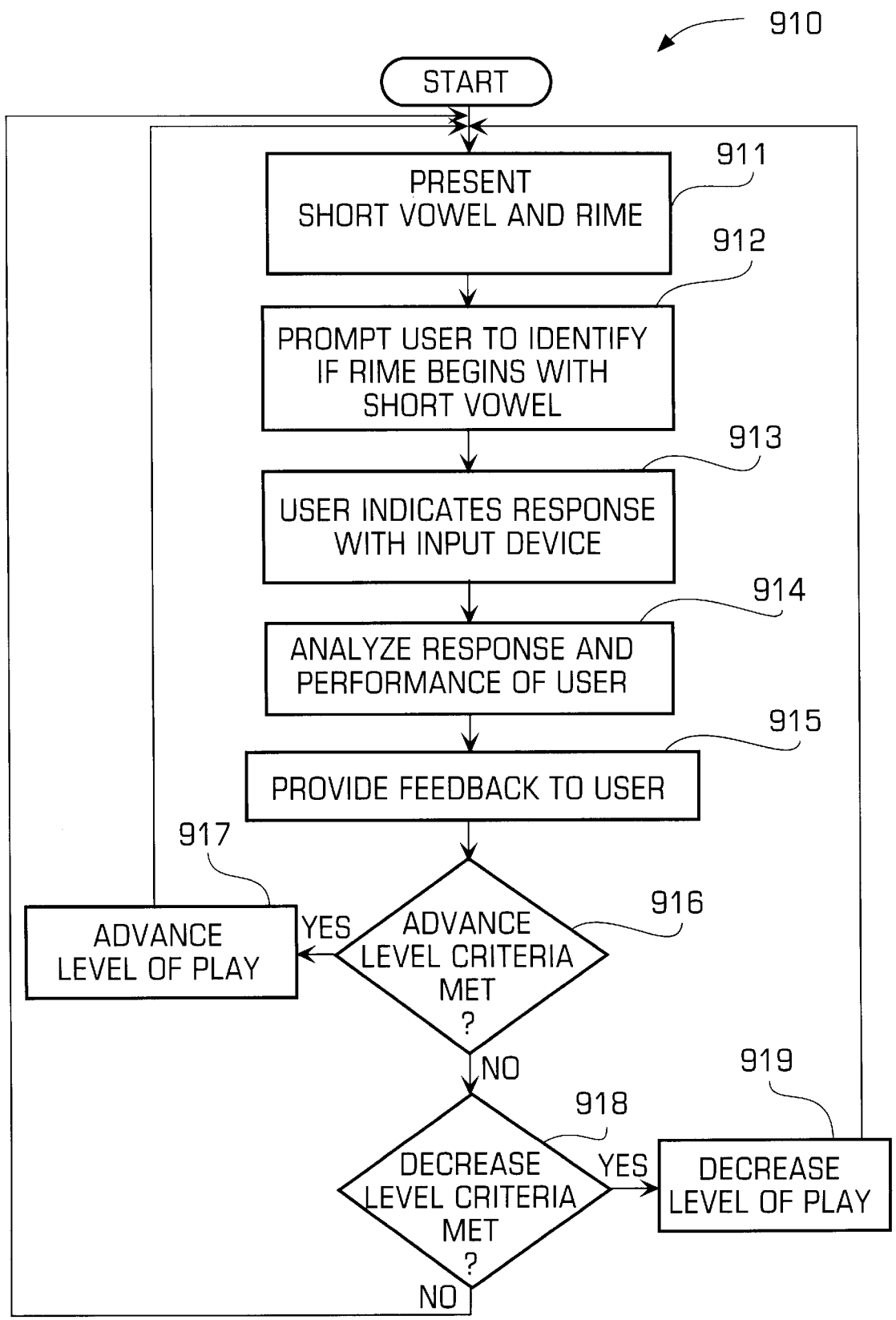

FIG. 37 illustrates more details of a second task 910 of the sound and word recognition training module wherein the user if a rime begins with a short vowel. This task may be broken down into two sub-tasks wherein single consonants and consonant digraphs are used. In the first sub-task, the student will sort words based on word rime when a series of words is presented at a rate of 30 wpm, 45 wpm and 60 wpm. Words will be presented in auditory only, auditory+visual, or visual only format. A visual cue will or will not be provided to facilitate performance with visual presentations. In the second sub-task, the student will sort words based on word rime when a series of words is presented at a rate of 30 wpm, 45 wpm and 60 wpm. Words will be presented in auditory only, auditory+visual, or visual only format. A visual cue will or will not be provided to facilitate performance with visual presentations. The first sub-task is now described in more detail.

In step 911, the system may present the user with a short vowel and its rime unit. The system may then prompt the user to respond to the above stimuli by identifying if the rime begins with the short vowel in step 912 and the user may input a response in step 913 using an input device of the computer, such as the keyboard, the mouse, the speech recognition tool or the like. Once the computer system receives the response from the user, the system may analyze the user's response (e.g., correct or incorrect) in step 914 and the user's performance of the task (e.g., did the user respond within the allotted time?). In step .915 the system may provide feedback to the user about the user's performance in the task wherein the feedback may be visual or auditory. In step 916, the system determines if the criteria has been met to increase the level of difficulty of the task. The level of difficulty may be increased by changing one or more difficulty variables. In this task, the difficulty variables may be the same as the previous task. If the advancement criteria has been met, then the level of difficulty is increased in step 917 and the method returns to step 911 to present the next task to the user at the higher difficulty level. If the advancement criteria is not met, then the system determines if the decrease level criteria has been met in step 918. The level of difficulty may be decreased by changing one or more difficulty variables. If the decrease criteria has been met, then the level of difficulty is decreased in step 919 and the method returns to step 911 to present the next task to the user at the lower level of difficulty. If the decrease level criteria has also not been met, then the task continues at the same level and loops back to step 911. In this manner, the above task may be used to train a user's skills.

Figure 38:
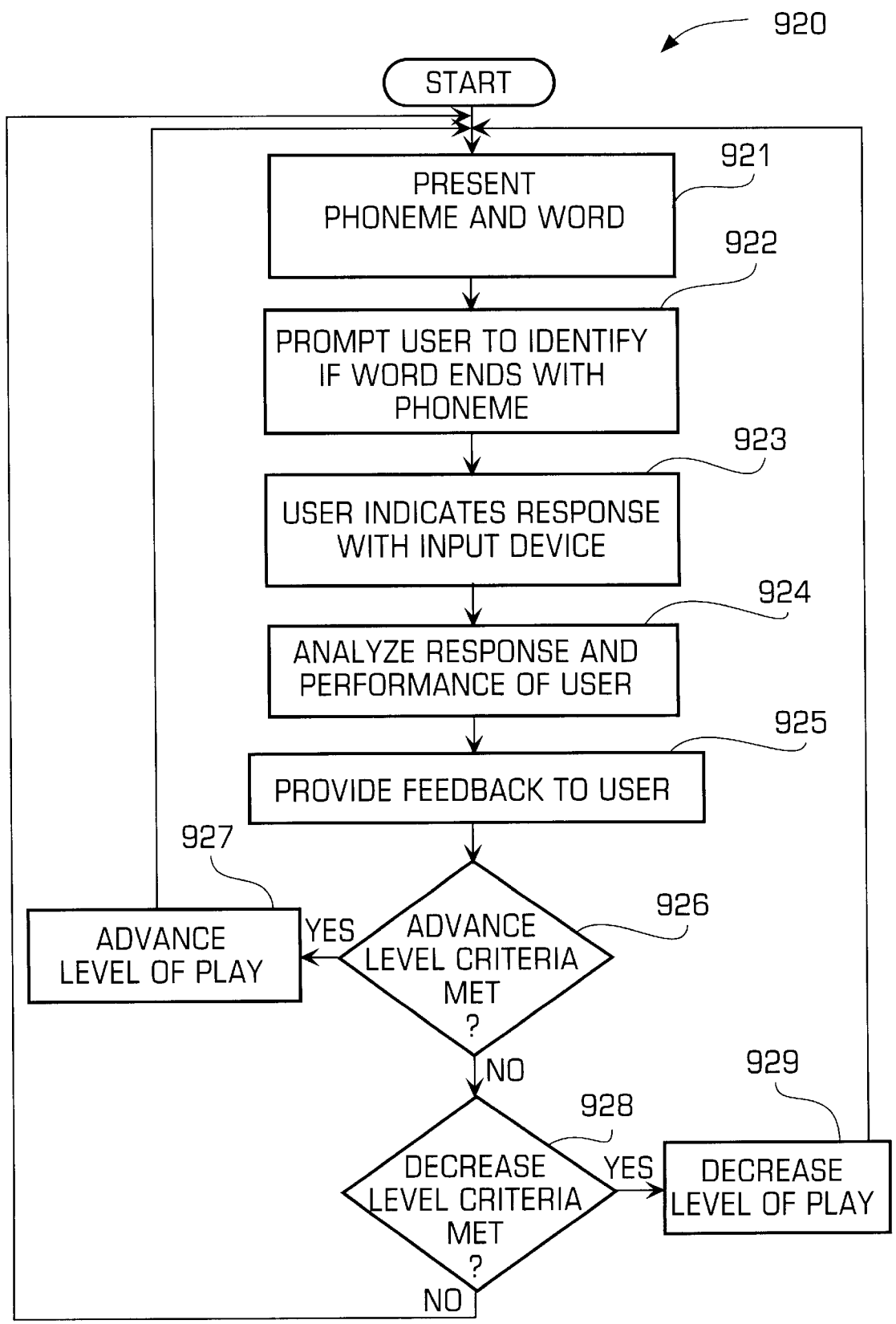

FIG. 38 illustrates more details of a third task 920 of the sound and word recognition training module wherein the user identifies if a presented word ends with a particular phoneme. This task may be broken down into two sub-tasks wherein single consonants and consonant digraphs are used. In the first sub-task, the student will sort words based on final consonant sound and single consonant letter when a series of words is presented at a rate of 30 wpm, 45 wpm and 60 wpm. Words will be presented in auditory only, auditory+visual, or visual only format. A visual cue will or will not be provided to facilitate performance with visual presentations. In the second sub-task, the student will sort words based on final consonant sound and consonant digraphs when a series of words is presented at a rate of 30 wpm, 45 wpm and 60 wpm. Words will be presented in auditory only, auditory+visual, or visual only format. A visual cue will or will not be provided to facilitate performance with visual presentations. Now, the first sub-task will be described in more detail.

In step 921, the system may present the user with a phoneme and a word. The system may then prompt the user to respond to the above stimuli by identifying if the word ends with the phoneme in step 922 and the user may input a response in step 923 using an input device of the computer, such as the keyboard, the mouse, the speech recognition tool or the like. Once the computer system receives the response from the user, the system may analyze the user's response (e.g., correct or incorrect) in step 924 and the user's performance of the task (e.g., did the user respond within the allotted time?). In step 925, the system may provide feedback to the user about the user's performance in the task wherein the feedback may be visual or auditory. In step 926, the system determines if the criteria has been met to increase the level of difficulty of the task. The level of difficulty may be increased by changing one or more difficulty variables. In this task, the difficulty variables are the same as the previous task. If the advancement criteria has been met, then the level of difficulty is increased in step 927 and the method returns to step 921 to present the next task to the user at the higher difficulty level. If the advancement criteria is not met, then the system determines if the decrease level criteria has been met in step 928. The level of difficulty may be decreased by changing one or more difficulty variables. If the decrease criteria has been met, then the level of difficulty is decreased in step 929 and the method returns to step 921 to present the next task to the user at the lower level of difficulty. If the decrease level criteria has also not been met, then the task continues at the same level and loops back to step 921. In this manner, the above task may be used to train a user's skills.

Figure 39A:
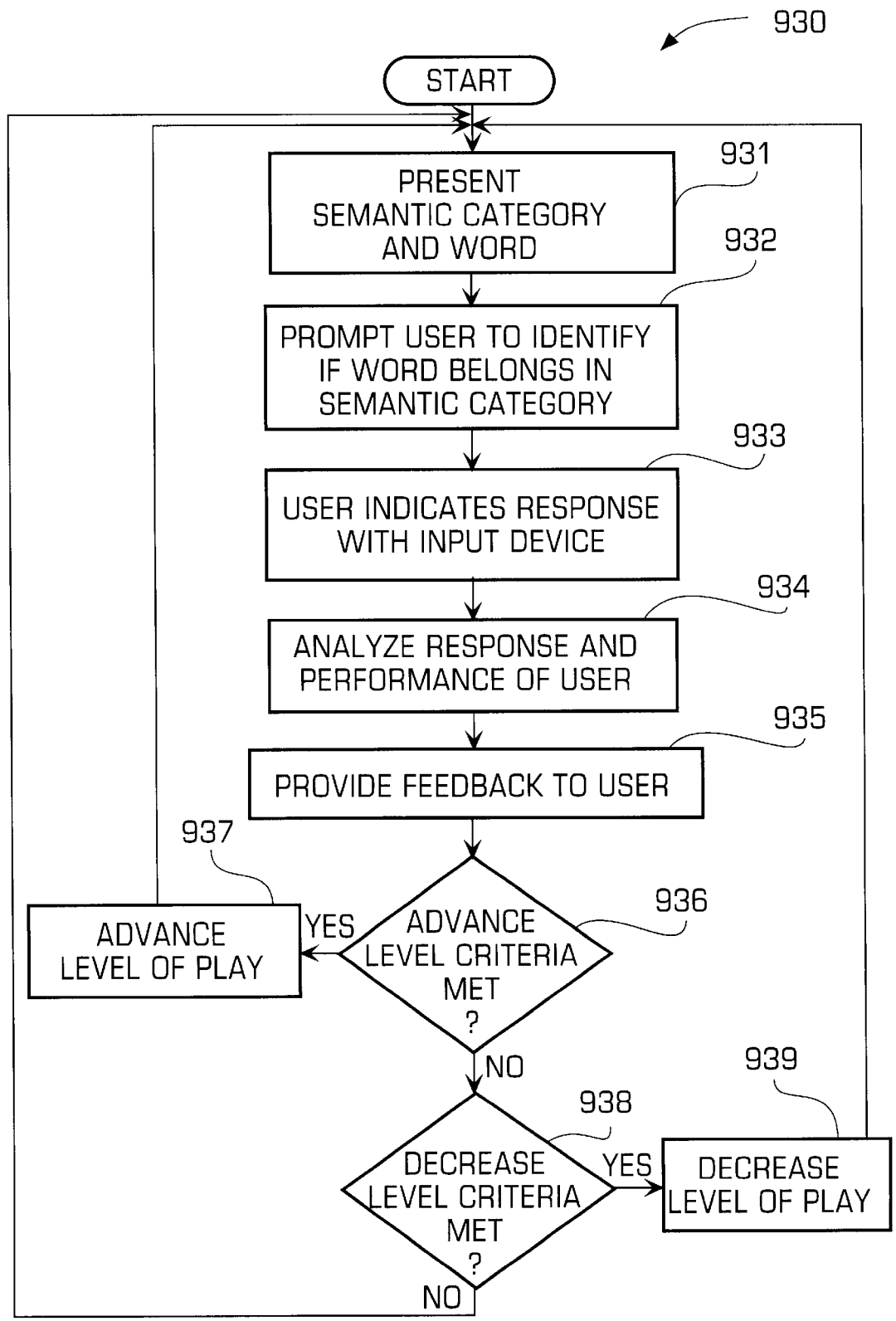

FIG. 39A illustrates more details of a fourth task 930 of the sound and word recognition training module wherein the user sorts words into one or more semantic categories. In this task, the student will sort words into categories of colors, numbers, shapes when a series of words is presented at a rate of 30 wpm, 45 wpm and 60 wpm. Words will be presented in auditory only, auditory+visual, or visual only format.

In step 93 1, the system may present the user with a word and one or more categories. The system may then prompt the user to respond to the above stimuli by placing the word into a category in step 932 and the user may input a response in step 933 using an input device of the computer, such as the keyboard, the mouse, the speech recognition tool or the like. Once the computer system receives the response from the user, the system may analyze the user's response (e.g., correct or incorrect) in step 934 and the user's performance of the task (e.g., did the user respond within the allotted time?). In step 935, the system may provide feedback to the user about the user's performance in the task wherein the feedback may be visual or auditory. In step 936, the system determines if the criteria has been met to increase the level of difficulty of the task. The level of difficulty may be increased by changing one or more difficulty variables. In this task, the difficulty variables may include the presentation format as described above, the availability of a visual cue or the time allowed for a response. If the advancement criteria has been met, then the level of difficulty is increased in step 937 and the method returns to step 931 to present the next task to the user at the higher difficulty level. If the advancement criteria is not met, then the system determines if the decrease level criteria has been met in step 938. The level of difficulty may be decreased by changing one or more difficulty variables. If the decrease criteria has been met, then the level of difficulty is decreased in step 939 and the method returns to step 931 to present the next task to the user at the lower level of difficulty. If the decrease level criteria has also not been met, then the task continues at the same level and loops back to step 931. In this manner, the above task may be used to train a user's skills.

Figure 39B:
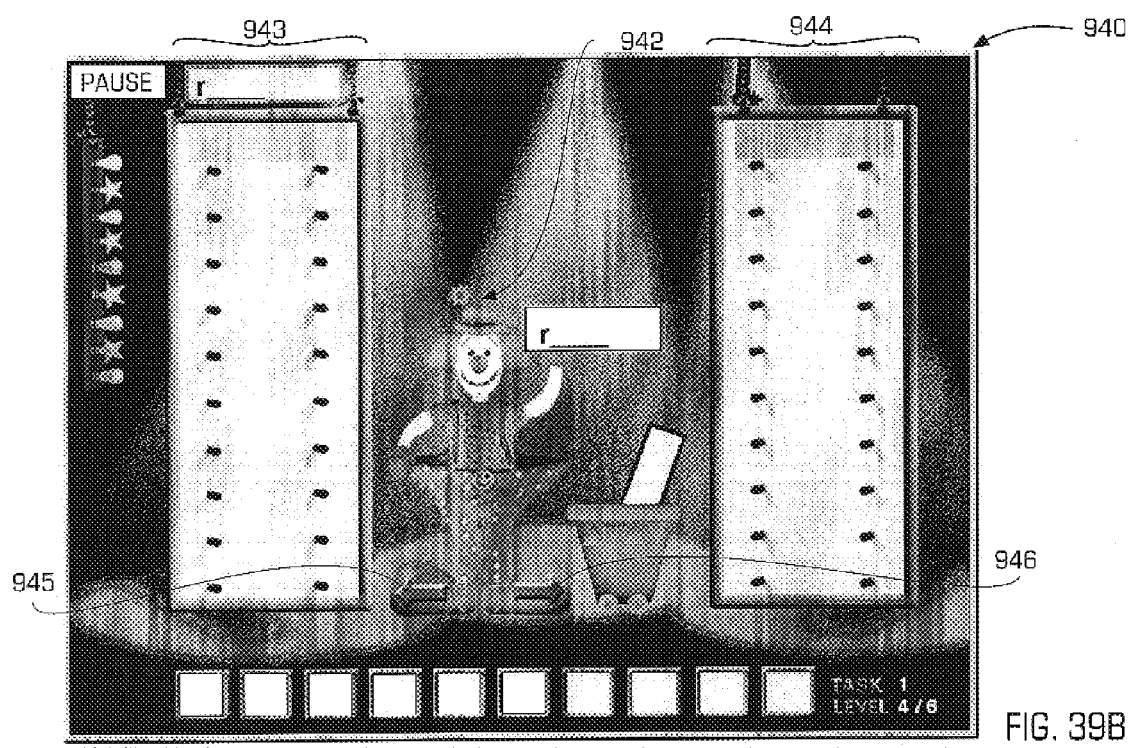

FIG. 39B illustrates an example of a user interface 940 for the above task. In this user interface, there may be a pause button 941 that permits the user to pause the training, an animated character 942, such as Karloon the clown, a first category area 943 and a second category area 944. Above each category area, there may be an indication of the types of words that should be put into that category. Then, as each word is presented to the user, the user may click on a left shoe 945 of the clown to place the word in the first category or the user may click on a right shoe 946 of the clown to place the word in the second category. In this manner, the user's skills at recognizing a word and then placing that word in the proper category is trained.

Figure 40A:
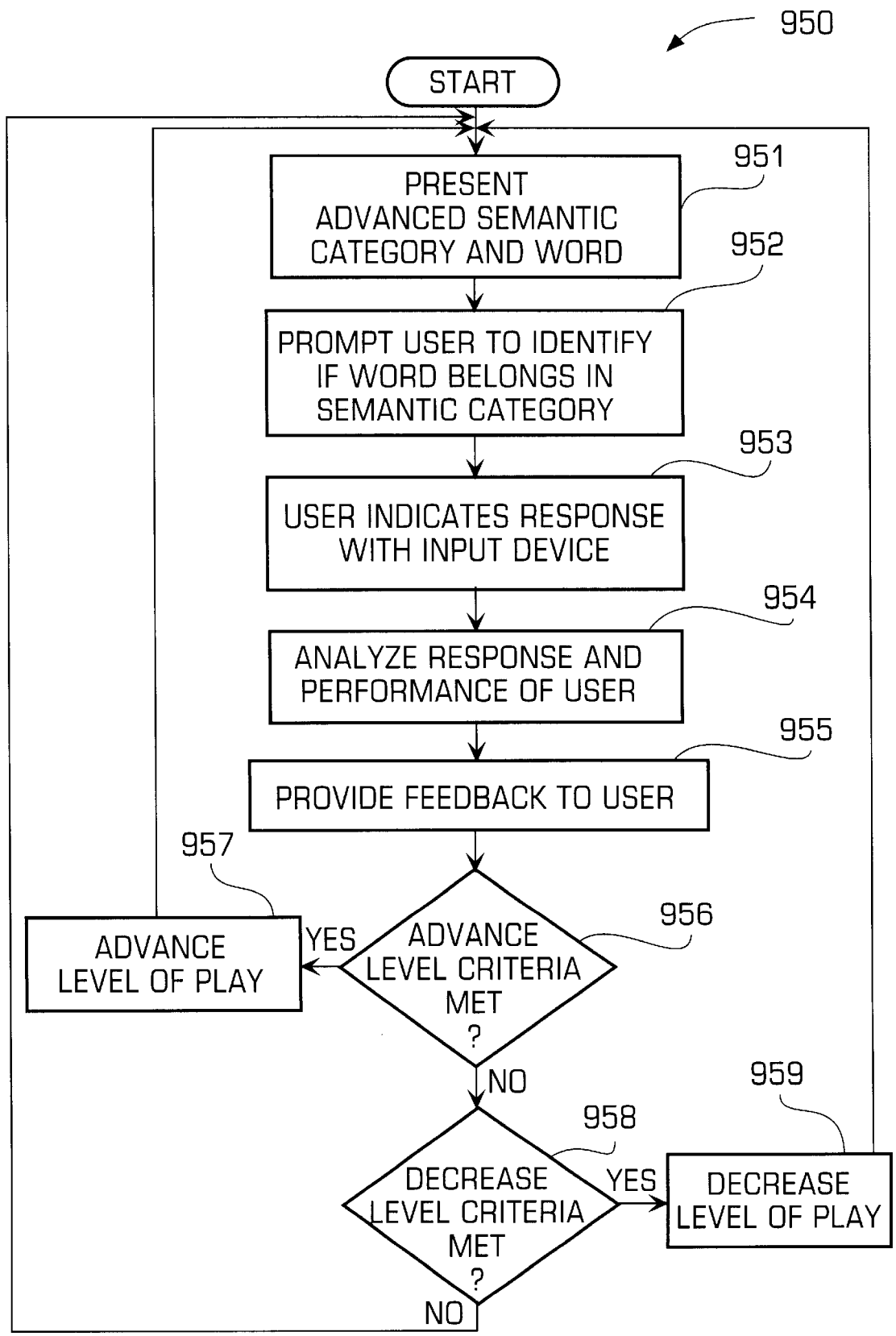
Figure 40B:
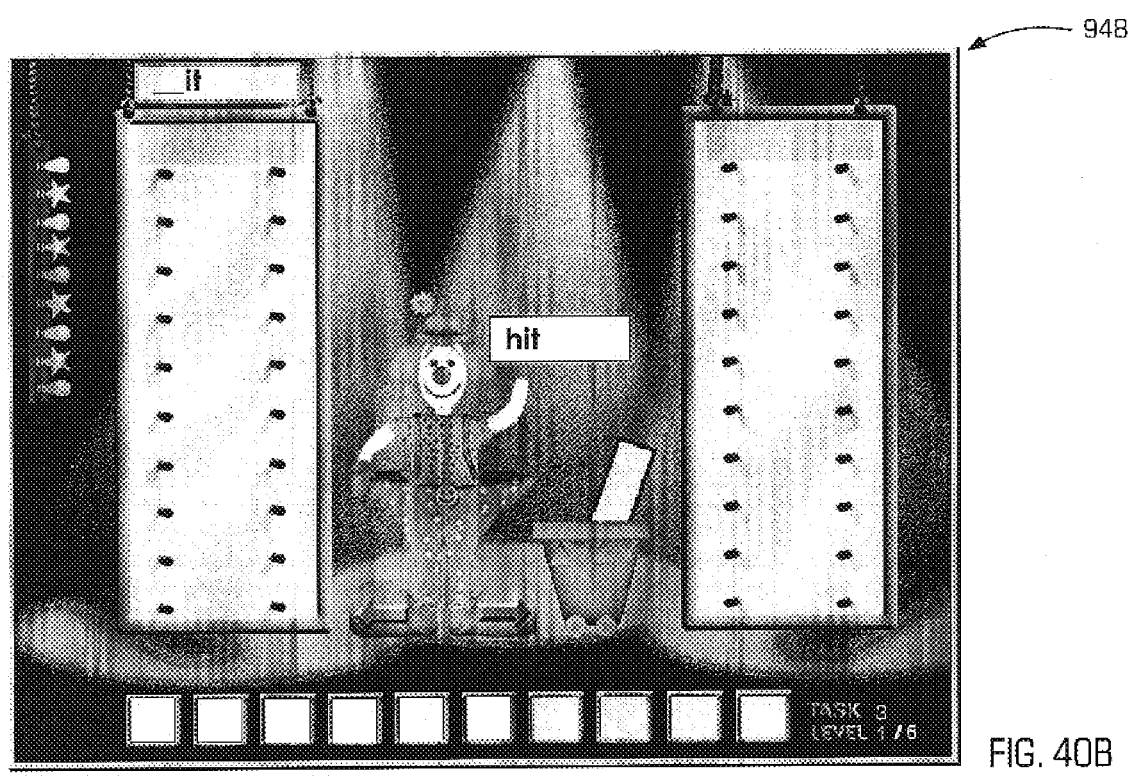

FIG. 40A illustrates more details of a fifth task 950 of the sound and word recognition training module wherein the user places words into more complex categories. FIG. 40B illustrates an example of a user interface 948 for this task which is very similar to the user interface shown in FIG. 39B so this user interface will not be described here. In this task, the student will sort words into categories of animals, objects and people when a series of words is presented at a rate of 30 wpm, 45 wpm and 60 wpm. Words will be presented in auditory only, auditory+visual, or visual only format.

In step 951, the system may present the user with a one or more categories and a series of one or more words. The system may then prompt the user to respond to the above stimuli by sorting the words into the proper categories in step 952 and the user may input a response in step 953 using an input device of the computer, such as the keyboard, the mouse, the speech recognition tool or the like. Once the computer system receives the response from the user, the system may analyze the user's response (e.g., correct or incorrect) in step 954 and the user's performance of the task (e.g., did the user respond within the allotted time?). In step 955, the system may provide feedback to the user about the user's performance in the task wherein the feedback may be visual or auditory. In step 956, the system determines if the criteria has been met to increase the level of difficulty of the task. The level of difficulty may be increased by changing one or more difficulty variables. In this task, the difficulty variables are the same as for the previous task. If the advancement criteria has been met, then the level of difficulty is increased in step 957 and the method returns to step 951 to present the next task to the user at the higher difficulty level. If the advancement criteria is not met, then the system determines if the decrease level criteria has been met in step 958. The level of difficulty may be decreased by changing one or more difficulty variables. If the decrease criteria has been met, then the level of difficulty is decreased in step 959 and the method returns to step 951 to present the next task to the user at the lower level of difficulty. If the decrease level criteria has also not been met, then the task continues at the same level and loops back to step 951. In this manner, the above task may be used to train a user's skills.

Figure 41:
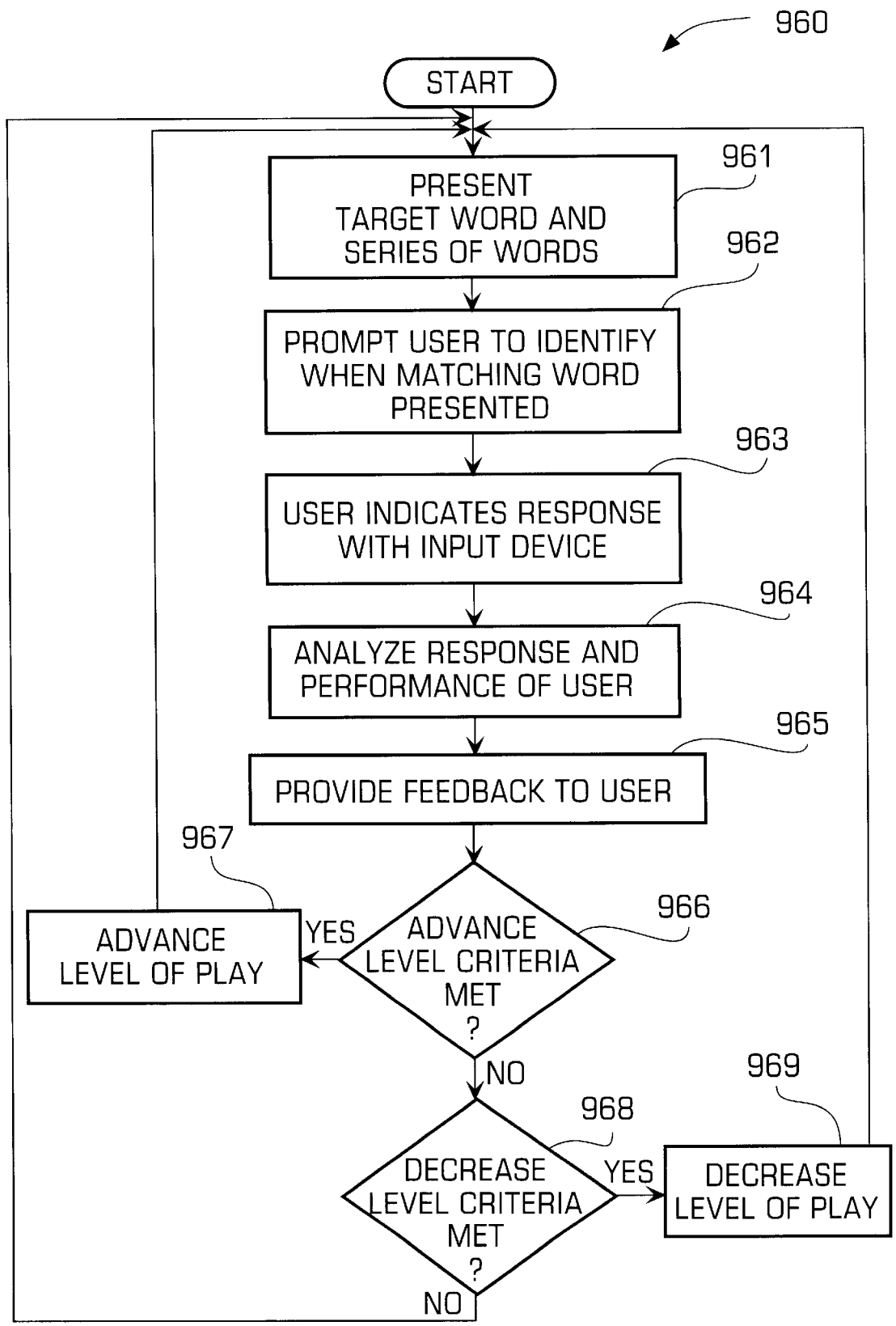

FIG. 41 illustrates more details of a sixth task 960 of the sound and word recognition training module wherein the user matches words to each other. This task may be broken down into three sub-tasks wherein different high frequency sight words are trained. In the first sub-task, following visual+auditory, visual-only or auditory-only visual-only presentation of a target word, the student will identify the same word in a series of words auditorily or visually presented at a rate of 30 wpm, 45 wpm and 60 wpm. The visual display of the target word will or will not remain on screen to facilitate performance. The target word list is: a, are, have, I, me, one, said, the, they, We. For the second sub-task, following visual+auditory, visual-only or auditory-only visual-only presentation of a target word, the student will identify the same word in a series of words auditorily or visually presented at a rate of 30 wpm, 45 wpm and 60 wpm. The visual display of the target word will or will not remain on screen to facilitate performance. The target word list is:

all, for, he, is, my, out, that, to, was, you. In the third sub-task, following visual+auditory, visual-only or auditory-only visual-only presentation of a target word, the student will identify the same word in a series of words auditorily or visually presented at a rate of 30 wpm, 45 wpm and 60 wpm. The visual display of the target word will or will not remain on screen to facilitate performance. The target word list is: by, has, her, his, of, put, some, them, then, when. Now, the first sub-task is described in more detail.

In step 961, the system may present the user with a target word and a series of words. The system may then prompt the user to respond to the above stimuli by identifying when the word that matches the target word is presented to the user in step 962 and the user may input a response in step 963 using an input device of the computer, such as the keyboard, the mouse, the speech recognition tool or the like. Once the computer system receives the response from the user, the system may analyze the user's response (e.g., correct or incorrect) in step 964 and the user's performance of the task (e.g., did the user respond within the allotted time?). In step 965, the system may provide feedback to the user about the user's performance in the task wherein the feedback may be visual or auditory. In step 966, the system determines if the criteria has been met to increase the level of difficulty of the task. The level of difficulty may be increased by changing one or more difficulty variables. In this task, the difficulty variables may include the presentation format of the target word. (auditory, visual or auditory and visual), the availability of a visual cue or the time allowed for a response. If the advancement criteria has been met, then the level of difficulty is increased in step 967 and the method returns to step 961 to present the next task to the user at the higher difficulty level. If the advancement criteria is not met, then the system determines if the decrease level criteria has been met in step 968. The level of difficulty may be decreased by changing one or more difficulty variables. If the decrease criteria has been met, then the level of difficulty is decreased in step 969 and the method returns to step 961 to present the next task to the user at the lower level of difficulty. If the decrease level criteria has also not been met, then the task continues at the same level and loops back to step 961. In this manner, the above task may be used to train a user's skills.

Figure 42A:
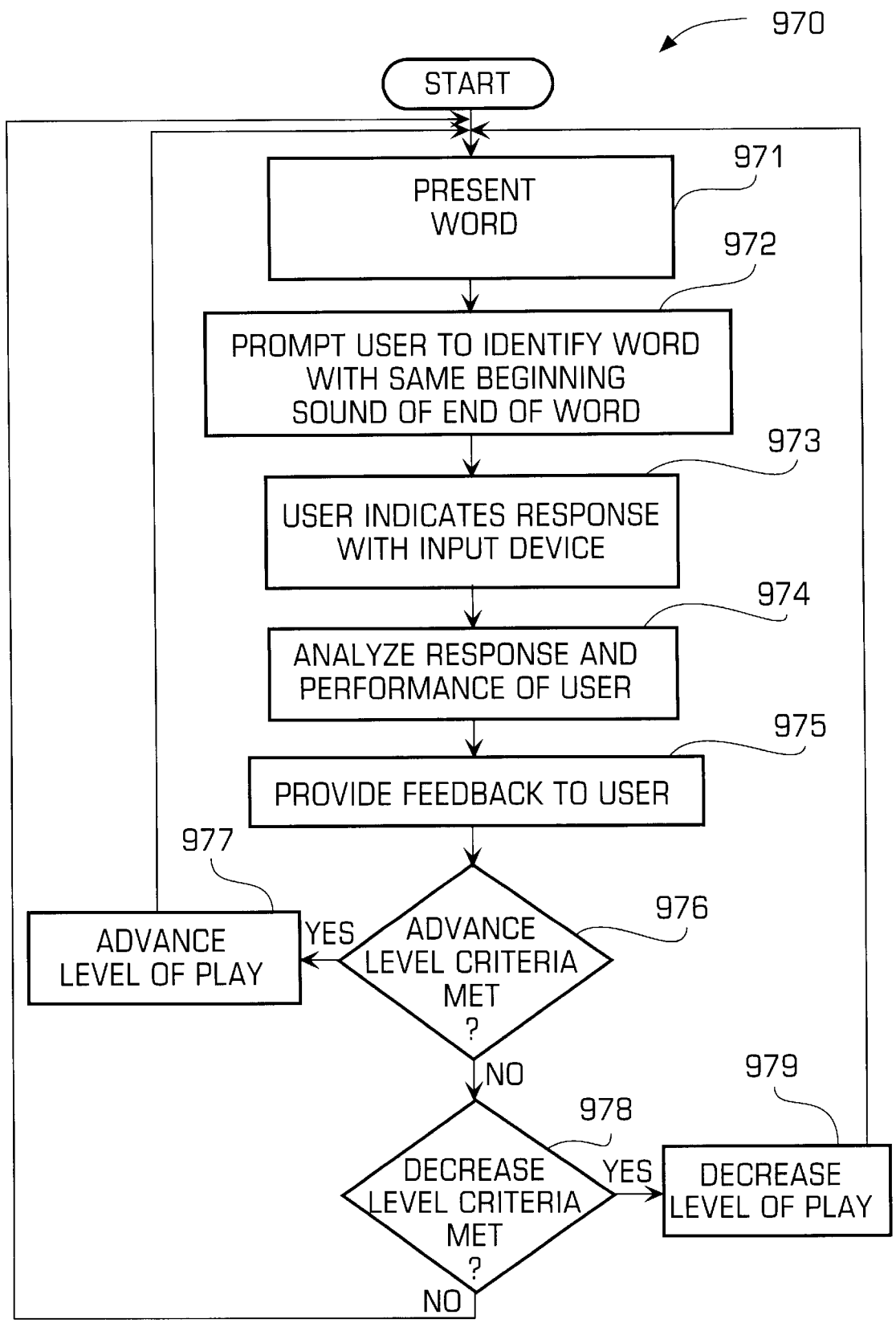
Figure 42B:
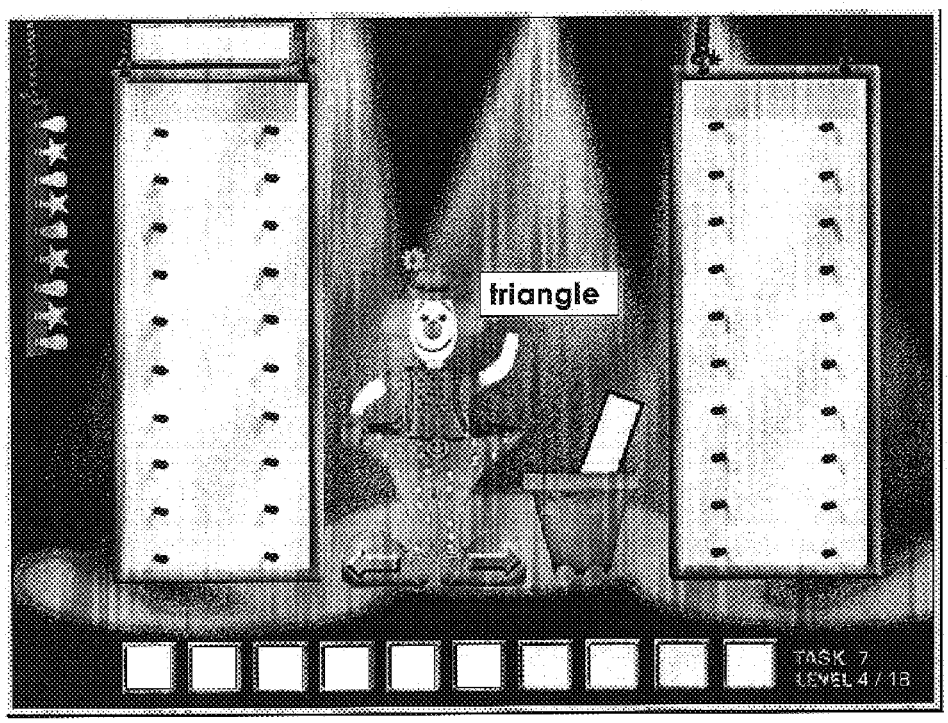

FIG. 42A illustrates more details of a seventh task 970 of the sound and word recognition training module wherein the user identifies a word that begins with the same sound heard at the end of the first words presented to the user. FIG. 42B illustrates a user interface of this task. In step 971, the system may present the user with a word. The system may then prompt the user to respond to the above stimuli by identifying the word that begins with the same sound as the end of the first word presented to the user in step 972 and the user may input a response in step 973 using an input device of the computer, such as the keyboard, the mouse, the speech recognition tool or the like. Once the computer system receives the response from the user, the system may analyze the user's response (e.g., correct or incorrect) in step 974 and the user's performance of the task (e.g., did the user respond within the allotted time?). In step 975, the system may provide feedback to the user about the user's performance in the task wherein the feedback may be visual or auditory. In step 976, the system determines if the criteria has been met to increase the level of difficulty of the task. The level of difficulty may be increased by changing one or more difficulty variables. In this task, the difficulty variables may include the availability of visual cues or visual displays or the time allowed for response. If the advancement criteria has been met, then the level of difficulty is increased in step 977 and the method returns to step 971 to present the next task to the user at the higher difficulty level. If the advancement criteria is not met, then the system determines if the decrease level criteria has been met in step 978. The level of difficulty may be decreased by changing one or more difficulty variables. If the decrease criteria has been met, then the level of difficulty is decreased in step 979 and the method returns to step 971 to present the next task to the user at the lower level of difficulty. If the decrease level criteria has also not been met, then the task continues at the same level and loops back to step 971. In this manner, the above task may be used to train a user's skills.

Figure 43A:
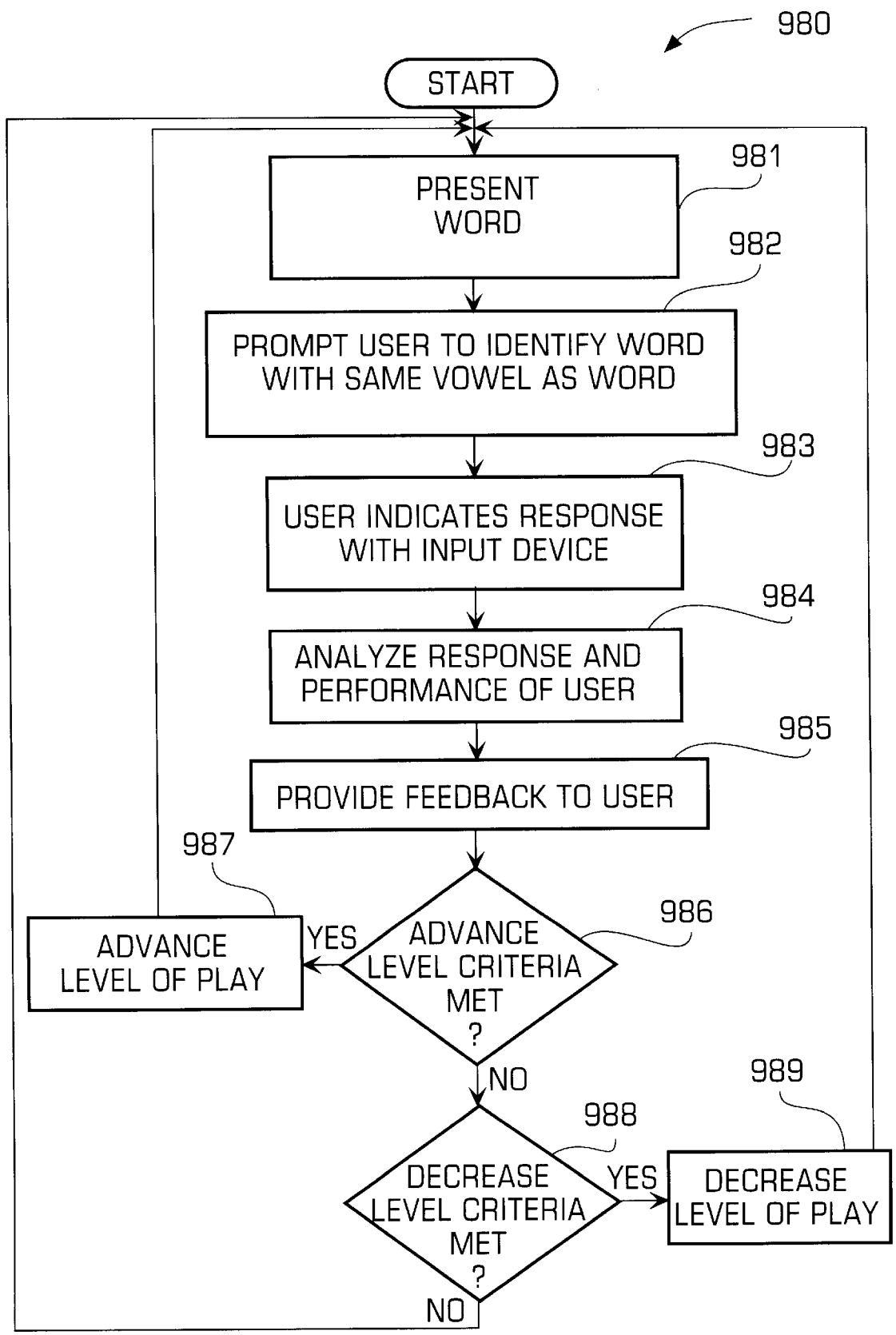
Figure 43B:
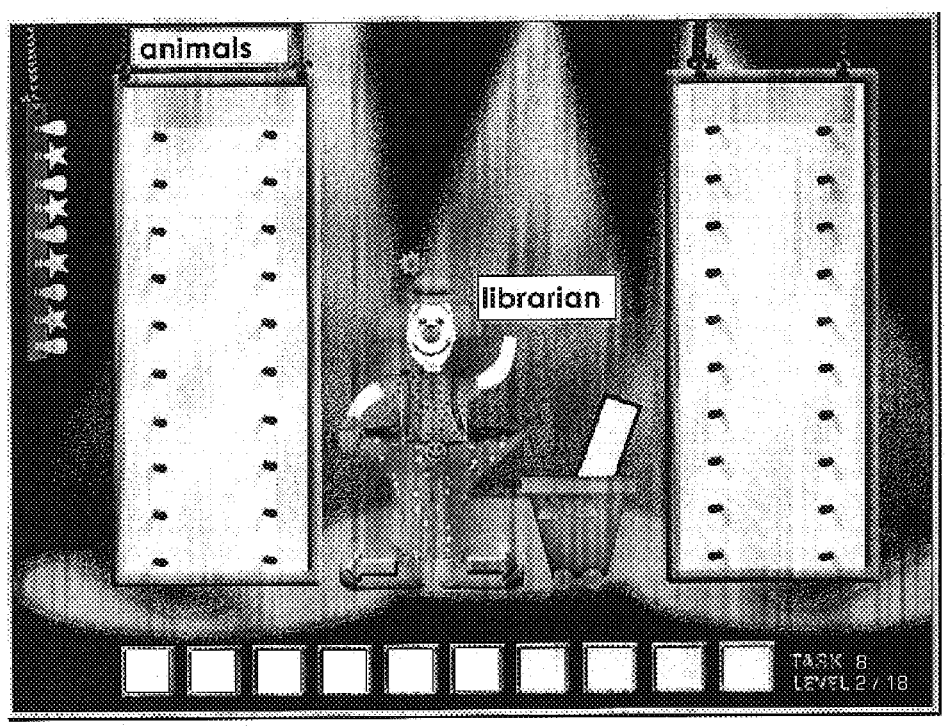

FIG. 43A illustrates more details of an eighth task 980 of the sound and word recognition training module wherein the user identifies a word with the same vowel as the first word. FIG. 43B illustrates a user interface for this task. In this task, following presentation of a target word, the student will select a word containing the same short vowel sound from two auditory-only, auditory+visual or visual-only response choices. When visual response choices are available, visual cues will or will not be provided to facilitate response. The task will be un-timed or timed with 20 seconds or 10 seconds allowed for response in the timed task.

In step 981, the system may present the user with a target word. The system may then prompt the user to respond to the above stimuli by identifying a presented word with the same vowel as the target word in step 982 and the user may input a response in step 983 using an input device of the computer, such as the keyboard, the mouse, the speech recognition tool or the like. Once the computer system receives the response from the user, the system may analyze the user's response (e.g., correct or incorrect) in step 984 and the user's performance of the task (e.g., did the user respond within the allotted time?). In step 985, the system may provide feedback to the user about the user's performance in the task wherein the feedback may be visual or auditory. In step 986, the system determines if the criteria has been met to increase the level of difficulty of the task. The level of difficulty may be increased by changing one or more difficulty variables. In this task, the difficulty variables may be the same as the previous task. If the advancement criteria has been met, then the level of difficulty is increased in step 987 and the method returns to step 981 to present the next task to the user at the higher difficulty level. If the advancement criteria is not met, then the system determines if the decrease level criteria has been met in step 988. The level of difficulty may be decreased by changing one or more difficulty variables. If the decrease criteria has been met, then the level of difficulty is decreased in step 989 and the method returns to step 981 to present the next task to the user at the lower level of difficulty. If the decrease level criteria has also not been met, then the task continues at the same level and loops back to step 981. In this manner, the above task may be used to train a user's skills.

Figure 44A:
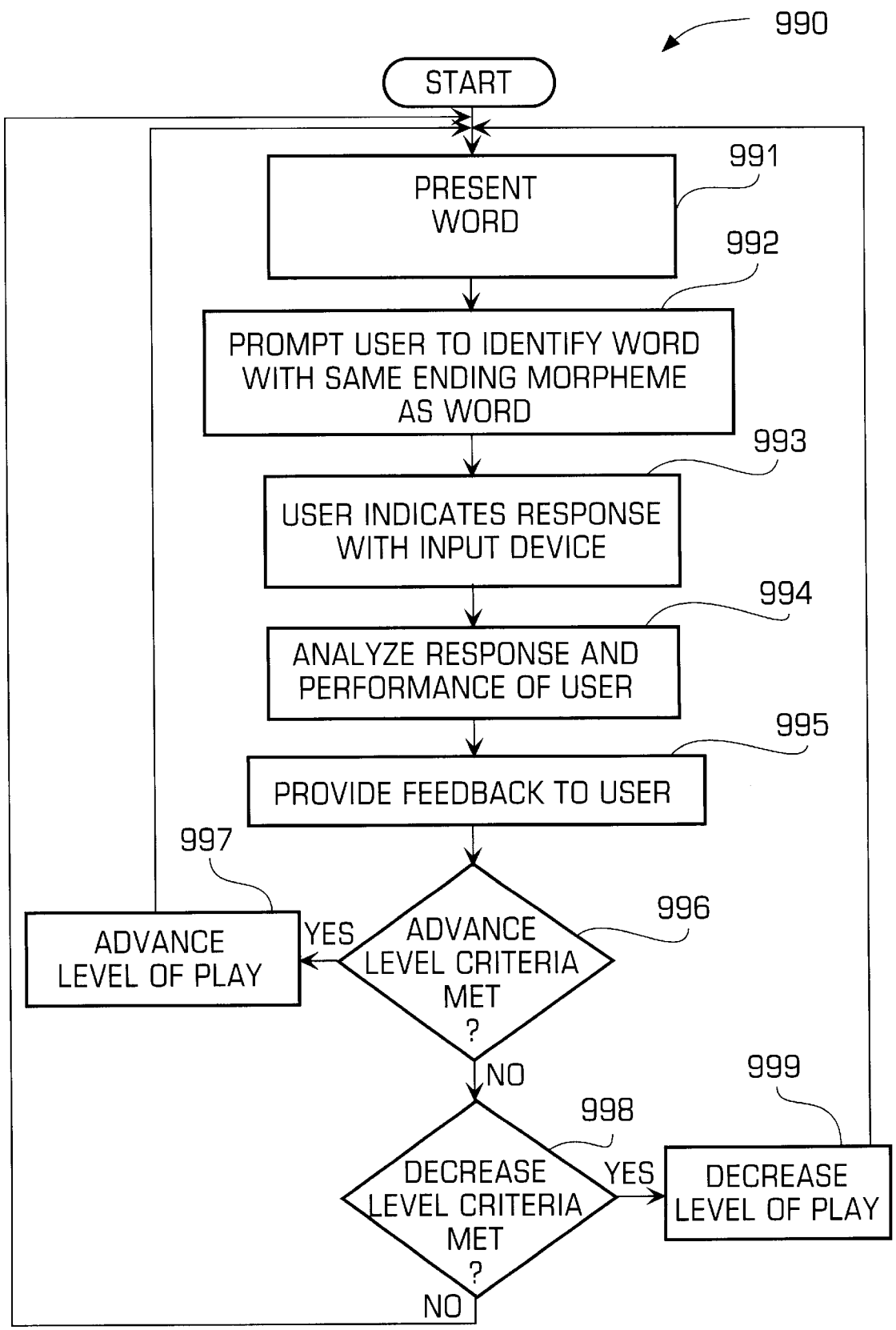
Figure 44B:
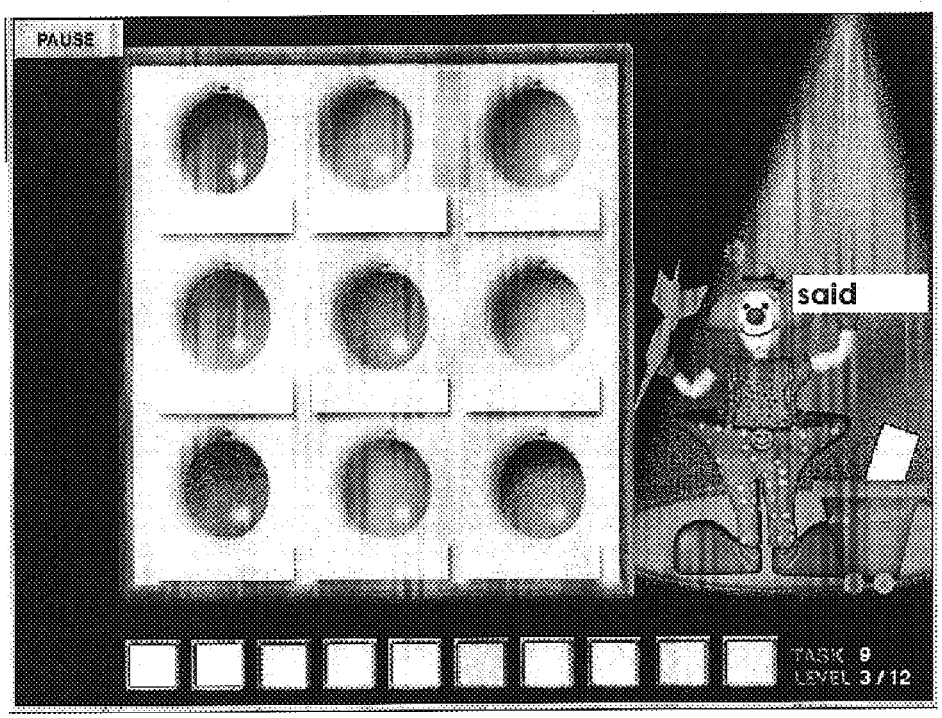

FIG. 44A illustrates more details of a ninth task 990 of the sound and word recognition training module wherein the user identifies a word with the same ending morpheme as a target word. FIG. 44B illustrates an example of a user interface for this task. This task may be broken down into four sub-tasks wherein the morphemes are verbs ending in "ing", plural nouns ending in "s", verbs ending in "ed" and verbs ending in "s" or "es". In the first sub-task, following presentation of a target word ending in "ing", the student will select a word containing the same word-final morpheme from two auditory-only, auditory+visual or visual-only response choices. Visual cues will or will not be provided to facilitate response. The task will be untimed or timed with 20 or 15 seconds allowed for response in the timed task. In the second sub-task, following presentation of a target word ending in "s" or "es", the student will select a word containing the same word-final morpheme from two auditory-only, auditory+visual or visual-only response choices. Visual cues will or will not be provided to facilitate response. The task will be untimed or timed with 20 or 15 seconds allowed for response in the timed task.

In the third sub-task, following presentation of a target word ending in "ed", the student will select a word containing the same word-final morpheme from two auditory-only, auditory+visual or visual-only response choices. Visual cues will or will not be provided to facilitate response. The task will be untimed or timed with 20 or 15 seconds allowed for response in the timed task. In the fourth sub-task, following presentation of a target word ending in "ing", the student will select a word containing the same word-final morpheme from two auditory-only, auditory+visual or visual-only response choices. Visual cues will or will not be provided to facilitate response. The task will be untimed or timed with 20 or 15 seconds allowed for response in the timed task. Now, the first sub-task will be described in more detail.

In step 991, the system may present the user with a word. The system may then prompt the user to respond to the above stimuli by identifying a presented word with the same ending morpheme as the first word in step 992 and the user may input a response in step 993 using an input device of the computer, such as the keyboard, the mouse, the speech recognition tool or the like. Once the computer system receives the response from the user, the system may analyze the user's response (e.g., correct or incorrect) in step 994 and the user's performance of the task (e.g., did the user respond within the allotted time?). In step 995, the system may provide feedback to the user about the user's performance in the task wherein the feedback may be visual or auditory. In step 996, the system determines if the criteria has been met to increase the level of difficulty of the task. The level of difficulty may be increased by changing one or more difficulty variables. In this task, the difficulty variables are the same as the previous task. If the advancement criteria has been met, then the level of difficulty is increased in step 997 and the method returns to step 991 to present the next task to the user at the higher difficulty level. If the advancement criteria is not met, then the system determines if the decrease level criteria has been met in step 998. The level of difficulty may be decreased by changing one or more difficulty variables. If the decrease criteria has been met, then the level of difficulty is decreased in step 999 and the method returns to step 991 to present the next task to the user at the lower level of difficulty. If the decrease level criteria has also not been met, then the task continues at the same level and loops back to step 991. In this manner, the above task may be used to train a user's skills.

Figure 45:
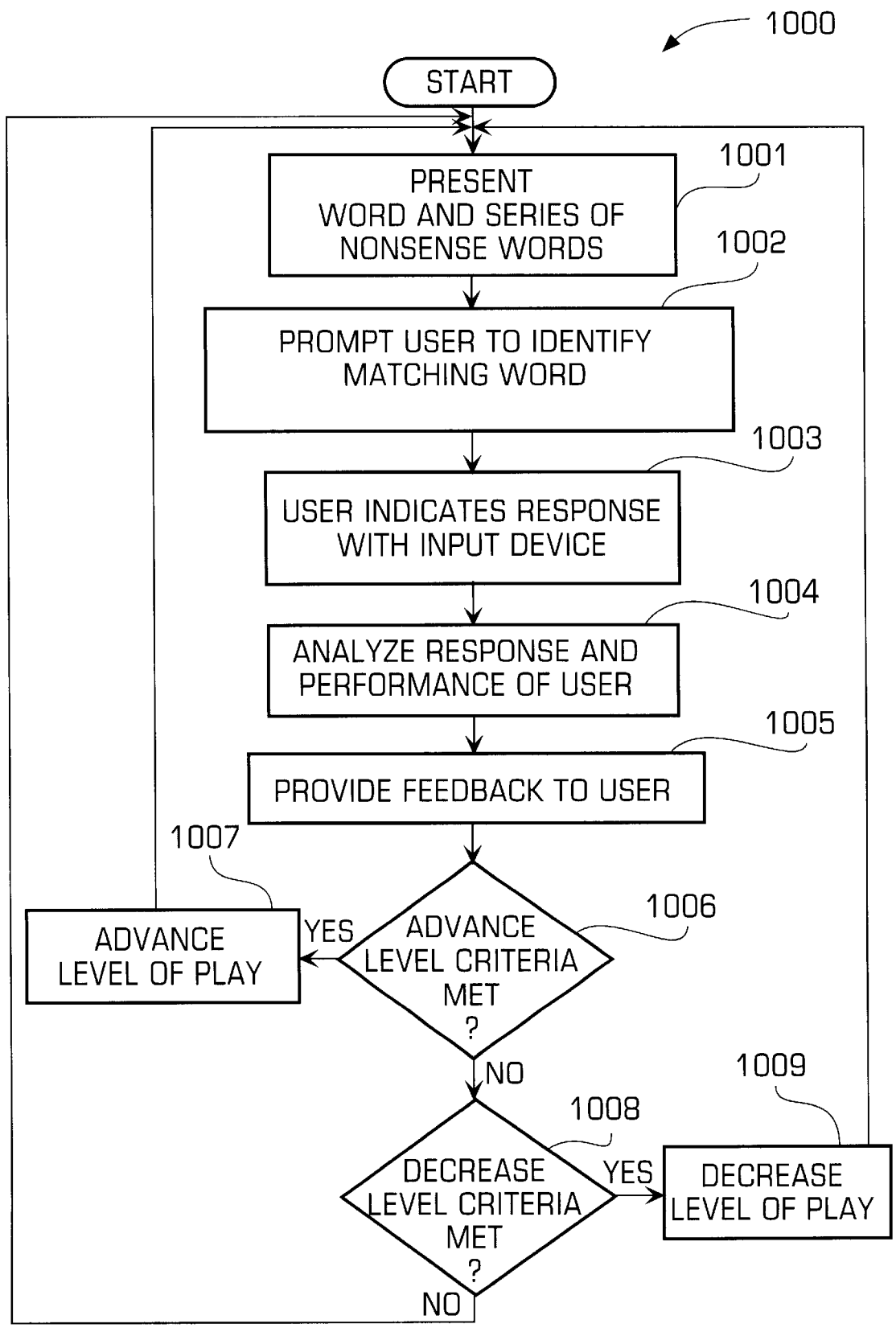

FIG. 45 illustrates more details of a tenth task 1000 of the sound and word recognition training module wherein the user identifies matching words. In step 1001, the system may present the user with a target nonsense word and a series of words. The system may then prompt the user to respond to the above stimuli by identifying the matching words in step 1002 and the user may input a response in step 1003 using an input device of the computer, such as the keyboard, the mouse the speech recognition tool or the like. Once the computer system receives the response from the user, the system may analyze the user's response (e.g., correct or incorrect) in step 1004 and the user's performance of the task (e.g., did the user respond within the allotted time?). In step 1005, the system may provide feedback to the user about the user's performance in the task wherein the feedback may be visual or auditory. In step 1006, the system determines if the criteria has been met to increase the level of difficulty of the task. The level of difficulty may be increased by changing one or more difficulty variables. In this task, the difficulty variables may include the presentation format (e.g., auditory, visual or auditory and visual), the availability of visual cues or the time allowed for a response. If the advancement criteria has been met, then the level of difficulty is increased in step 1007 and the method returns to step 1001 to present the next task to the user at the higher difficulty level. If the advancement criteria is not met, then the system determines if the decrease level criteria has been met in step 1008. The level of difficulty may be decreased by changing one or more difficulty variables. If the decrease criteria has been met, then the level of difficulty is decreased in step 1009 and the method returns to step 1001 to present the next task to the user at the lower level of difficulty. If the decrease level criteria has also not been met, then the task continues at the same level and loops back to step 1001. In this manner, the above task may be used to train a user's skills.

Figure 46A:
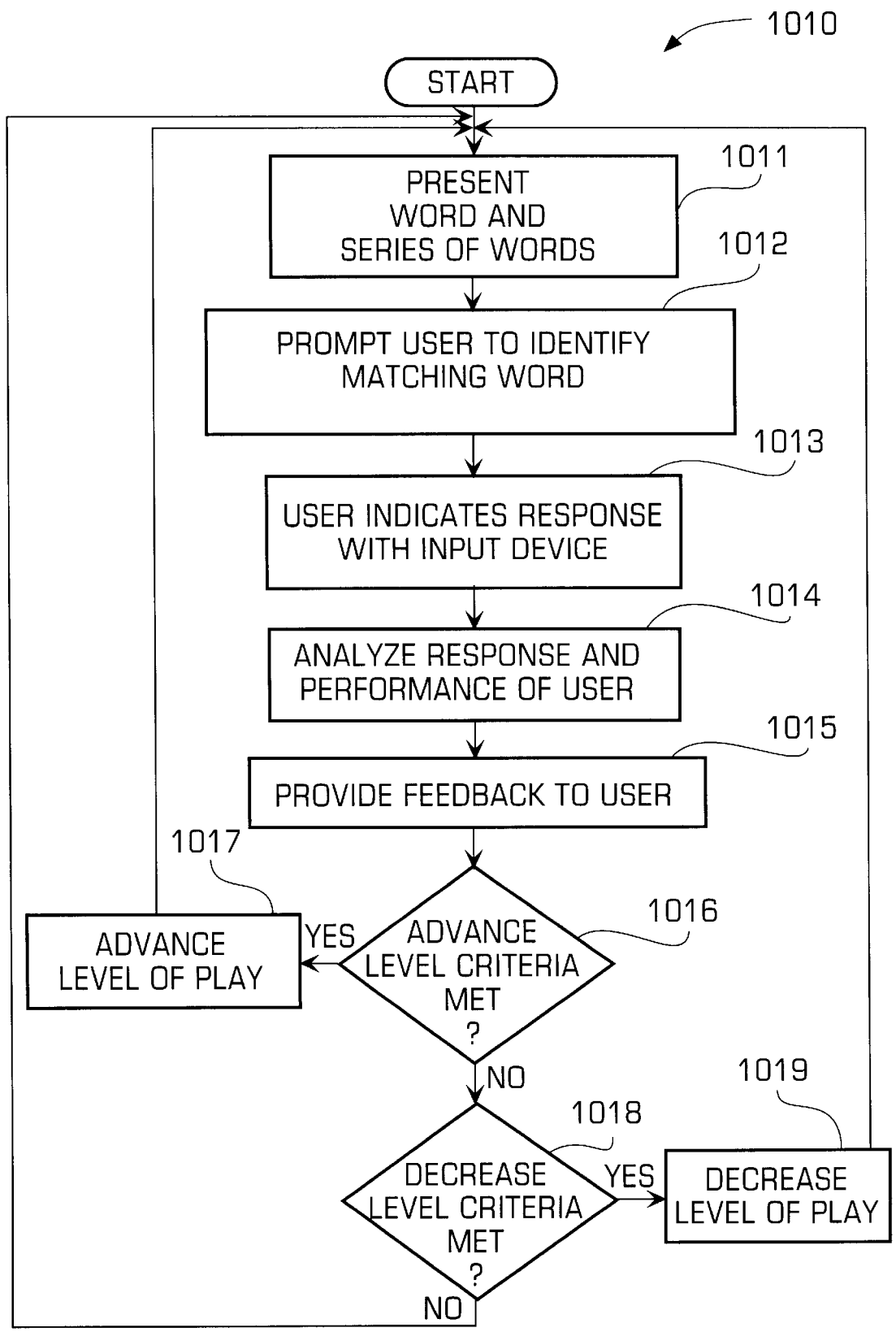
Figure 46B:
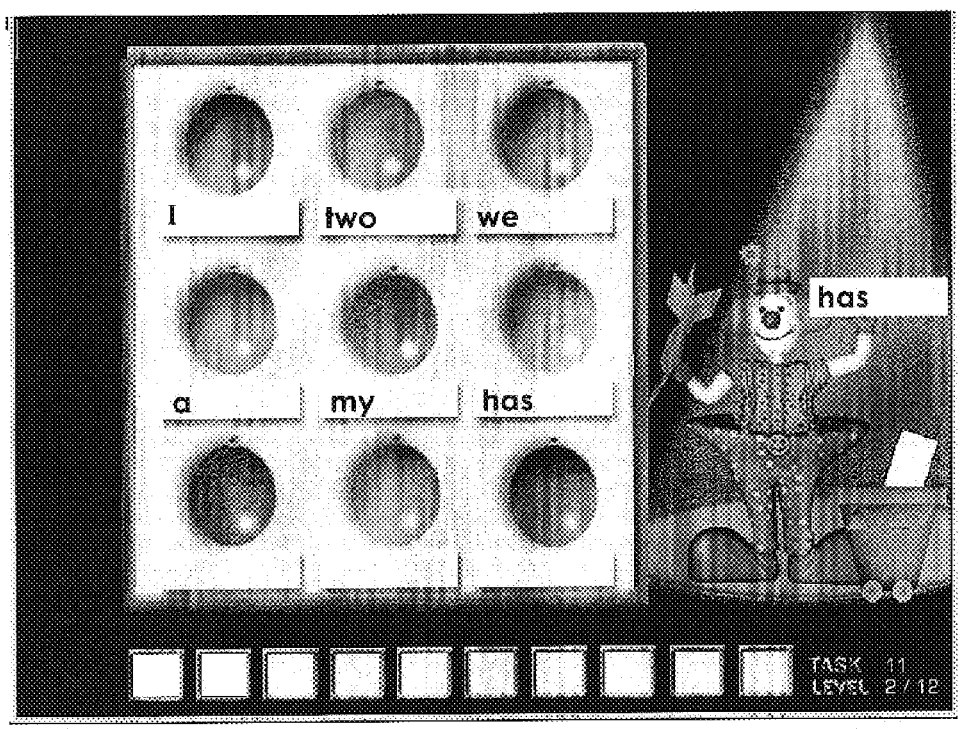

FIG. 46A illustrates more details of an eleventh task 1010 of the sound and word recognition training module wherein the user matches words. FIG. 46B illustrates an example of the user interface for the task. In step 1011, the system may present the user with a target word containing a group of target plurality morphemes and then a series of words. The system may then prompt the user to respond to the above stimuli by identifying the matching words in step 1012 and the user may input a response in step 1013 using an input device of the computer, such as the keyboard, the mouse, the speech recognition tool or the like. Once the computer system receives the response from the user, the system may analyze the user's response (e.g., correct or incorrect) in step 1014 and the user's performance of the task (e.g., did the user respond within the allotted time?). In step 1015, the system may provide feedback to the user about the user's performance in the task wherein the feedback may be visual or auditory. In step 1016, the system determines if the criteria has been met to increase the level of difficulty of the task. The level of difficulty may be increased by changing one or more difficulty variables. In this task, the difficulty variables may include presentation format of the target word (e.g., auditory, visual or auditory and visual), the availability of a visual cue or the time allowed for response. If the advancement criteria has been met, then the level of difficulty is increased in step 1017 and the method returns to step 1011 to present the next task to the user at the higher difficulty level. If the advancement criteria is not met, then the system determines if the decrease level criteria has been met in step 1018. The level of difficulty may be decreased by changing one or more difficulty variables. If the decrease criteria has been met, then the level of difficulty is decreased in step 1019 and the method returns to step 1011 to present the next task to the user at the lower level of difficulty. If the decrease level criteria has also not been met, then the task continues at the same level and loops back to step 1011. In this manner, the above task may be used to train a user's skills.

Figure 47A:
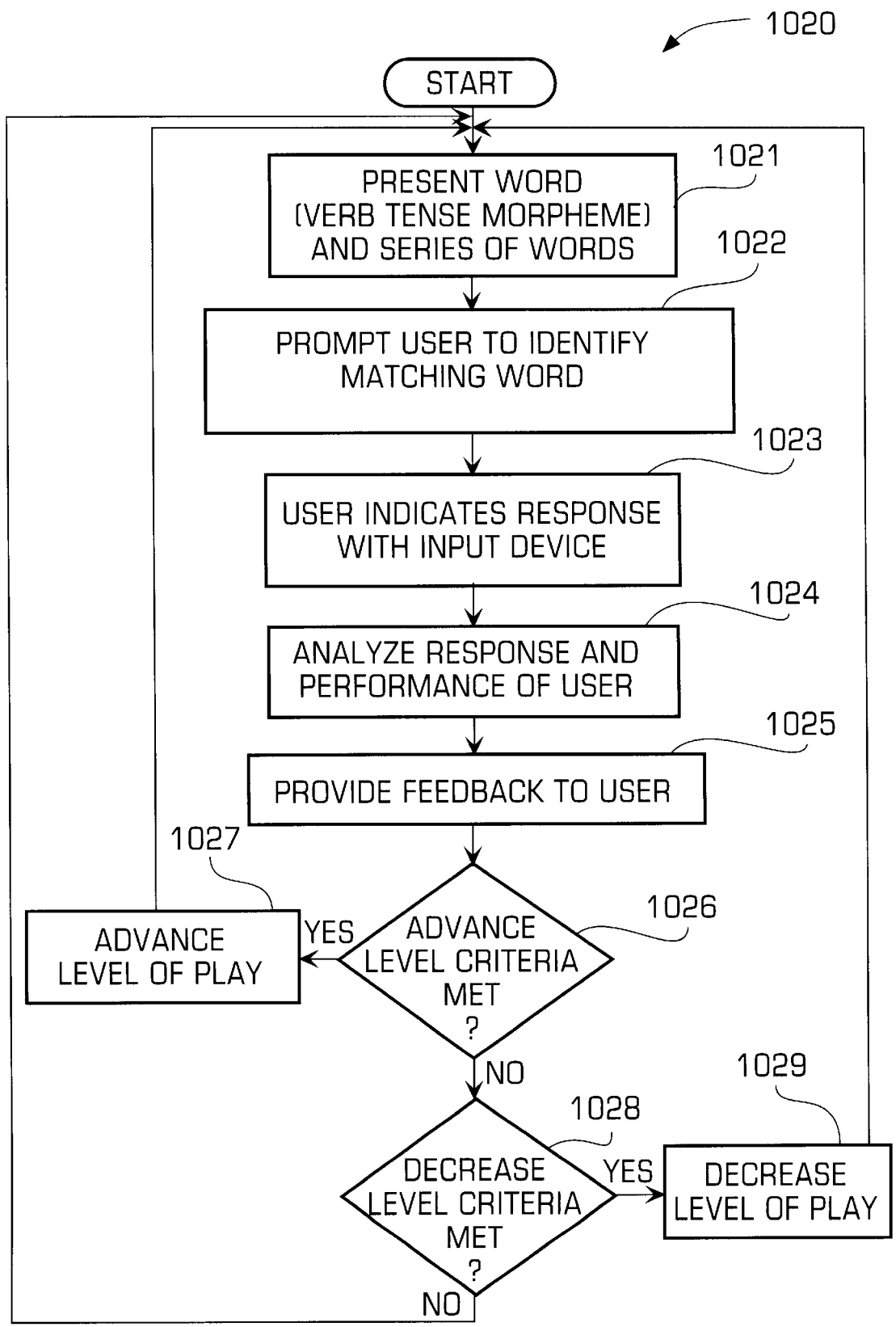

FIG. 47A illustrates more details of a twelfth task 1020 of the sound and word recognition training module wherein the user matches words that contain verb tense morphemes.

Figure 47B:
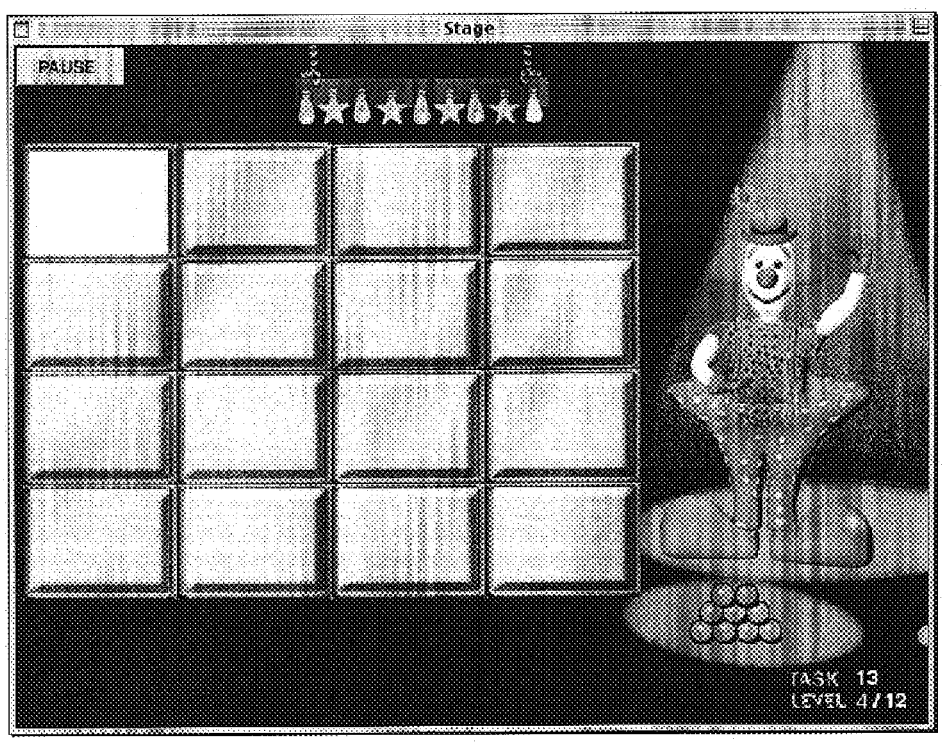
Figure 47C:
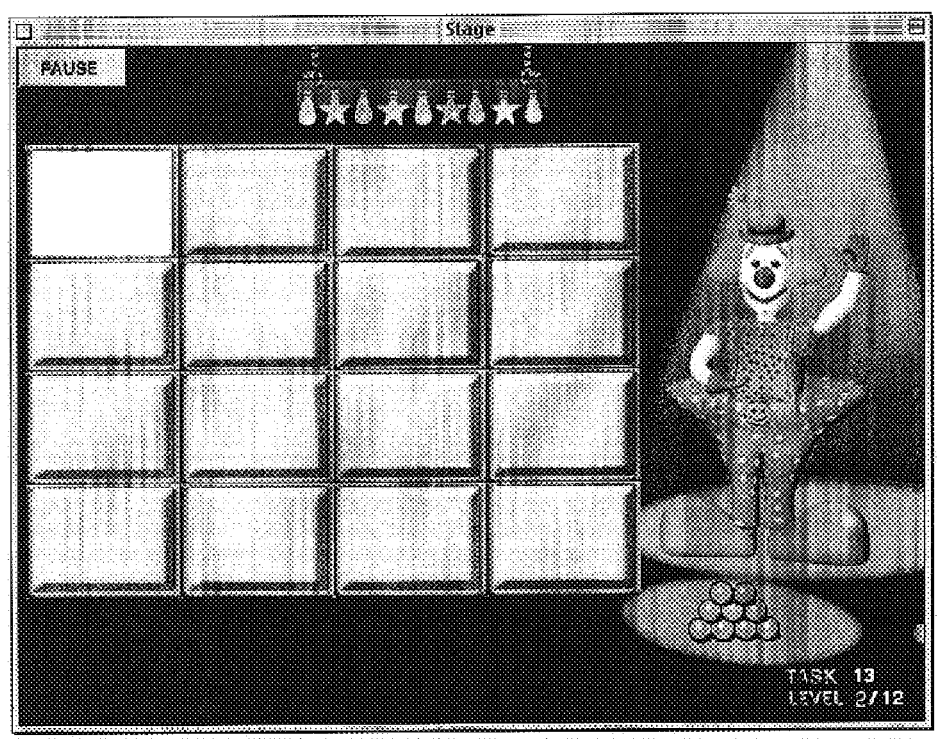

FIGS. 47B and 47C illustrates examples of the user interface for this task. In step 1021, the system may present the user with a target word having verb tense morphemes and then a series of words. The system may then prompt the user to respond to the above stimuli by matching the target word with a word in the series of words in step 1022 and the user may input a response in step 1023 using an input device of the computer, such as the keyboard, the mouse, the speech recognition tool or the like. Once the computer system receives the response from the user, the system may analyze the user's response (e.g., correct or incorrect) in step 1024 and the user's performance of the task (e.g., did the user respond within the allotted time?). In step 1025, the system may provide feedback to the user about the user's performance in the task wherein the feedback may be visual or auditory. In step 1026, the system determines if the criteria has been met to increase the level of difficulty of the task. The level of difficulty may be increased by changing one or more difficulty variables. In this task, the difficulty variables may include the presentation format of the target word (e.g., visual, auditory or visual and auditory), the availability of a visual cue and the time allowed for a response. If the advancement criteria has been met, then the level of difficulty is increased in step 1027 and the method returns to step 1021 to present the next task to the user at the higher difficulty level. If the advancement criteria is not met, then the system determines if the decrease level criteria has been met in step 1028. The level of difficulty may be decreased by changing one or more difficulty variables. If the decrease criteria has been met, then the level of difficulty is decreased in step 1029 and the method returns to step 1021 to present the next task to the user at the lower level of difficulty. If the decrease level criteria has also not been met, then the task continues at the same level and loops back to step 1021. In this manner, the above task may be used to train a user's skills.

Figure 48:
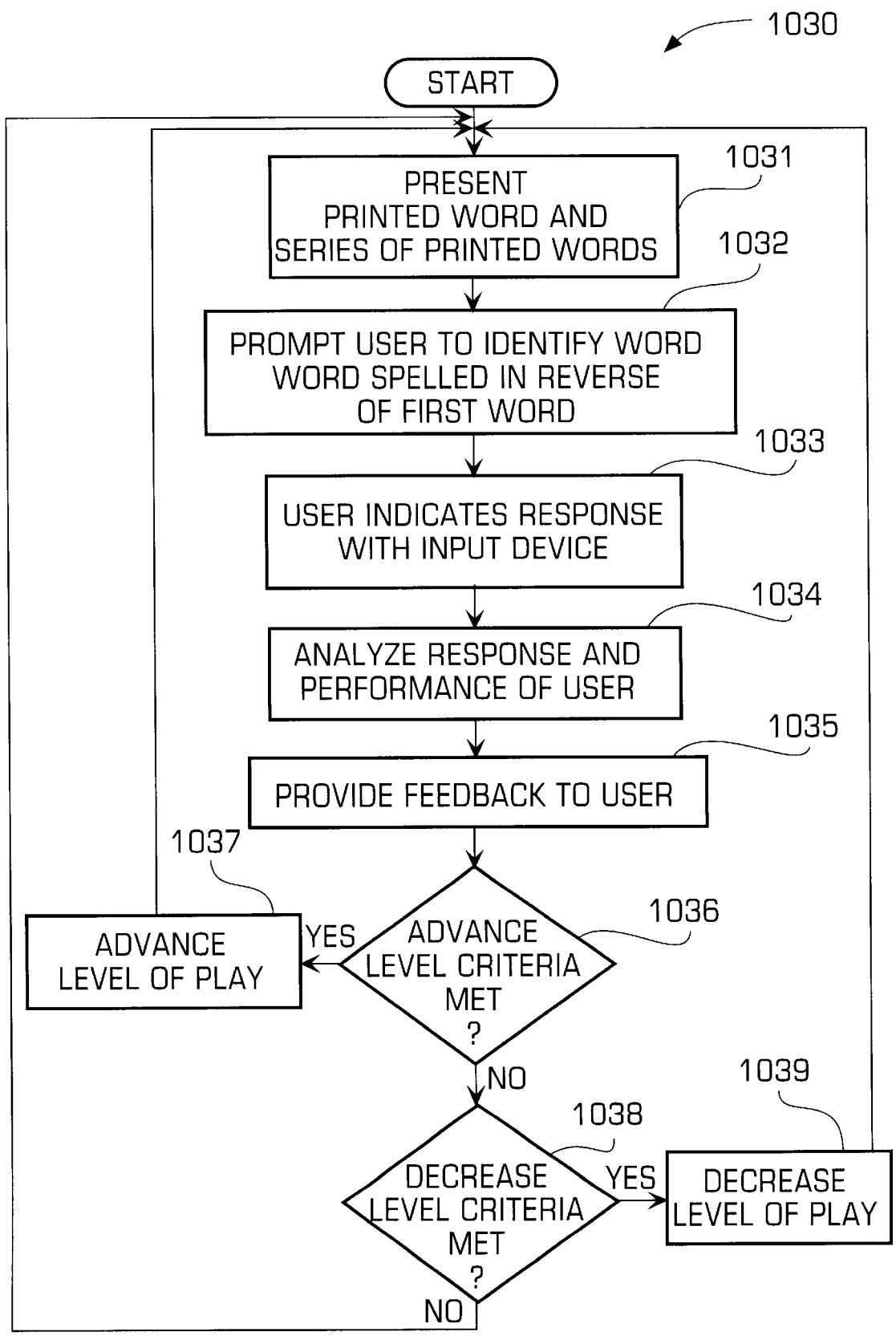

FIG. 48 illustrates more details of a thirteenth task 1030 of the sound and word recognition training module wherein the user identifies a words spelled in reverse to the target word. In step 1031, the system may present the user with a printed target word and then a series of printed words. The system may then prompt the user to respond to the above stimuli by identifying the word in the series of presented words that is spelled in reverse to the target word in step 1032 and the user may input a response in step 1033 using an input device of the computer, such as the keyboard, the mouse, the speech recognition tool or the like. Once the computer system receives the response from the user, the system may analyze the user's response (e.g., correct or incorrect) in step 1034 and the user's performance of the task (e.g., did the user respond within the allotted time?). In step 1035, the system may provide feedback to the user about the user's performance in the task wherein the feedback may be visual or auditory. In step 1036, the system determines if the criteria has been met to increase the level of difficulty of the task. The level of difficulty may be increased by changing one or more difficulty variables. In this task, the difficulty variables may include the number of letters in the words, the availability of visual cues or the time allowed for a response. If the advancement criteria has been met, then the level of difficulty is increased in step 1037 and the method returns to step 1031 to present the next task to the user at the higher difficulty level. If the advancement criteria is not met, then the system determines if the decrease level criteria has been met in step 1038. The level of difficulty may be decreased by changing one or more difficulty variables. If the decrease criteria has been met, then the level of difficulty id decreased in step 1039 and the method returns to step 1031 to present the next task to the user at the lower level of difficulty. If the decrease level criteria has also not been met, then the task continues at the same level and loops back to step 1031. In this manner, the above task may be used to train a user's skills.

While the foregoing has been with reference to a particular embodiment of the invention, it will be appreciated by those skilled in the art that change in this embodiment may be made without departing from the principles and spirit of the invention.

What is claimed is:

1. A device for training one or more reading and spelling skills of a user including phonological and morphological skills, the device comprising:

a graphical display that displays images to a user;

a user input device that permits the user to interact with the computer; and a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills.

2. The device of claim 1, wherein the game further comprises one or more modules that train different skills of the user wherein each module trains one or more different skills of the user.

3. The device of claim 2, wherein the one or more modules further comprise a segmentation, discrimination and syllable stress training module, a segmentation, blending, decoding and spelling training module, a sound/symbol correspondence training module and a sound and word recognition training module.

4. The device of claim 3, wherein each module further comprises means for providing a cue to the user, wherein the cues are auditory cues first, then auditory and visual cues and then visual cues.

5. The device of claim 1, wherein the game is stored on a compact disk and then loaded into a computer having the graphical display and the user input device.

6. The device of claim 1, wherein the game further comprises a module for training the user's skills at identifying the correspondence between sounds and symbols.

7. The device of claim 6, wherein the module further comprises a task in which the user sorts words into one or more categories in order to identify patterns in printed words.

8. The device of claim 7, wherein the sorting task further comprises means for sorting words based on an initial portion of a word, means for sorting words based on a middle portion of the words and means for sorting a word based on a final portion of the words.

9. The device of claim 7, wherein the module further comprises a second task in which the user sorts words into one or more semantic categories.

10. The device of claim 7, wherein the module further comprises a third task in which the user identifies a word that is spelling is reverse order to a target word.

11. A device for training one or more reading and spelling skills of a user including phonological and morphological skills, the device comprising:

a graphical display that displays images to a user;

a user input device that permits the user to interact with the computer;

a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the phonological training portion further comprises a morphological skills training portion to train the user's skills at decoding a word and vocabulary.

12. The device of claim 11, wherein the sound/symbol training portion further comprises a phonics portion to train the user's skills at decoding printed words and awareness of the connections between speech and print.

13. A device for training one or more reading and spelling skills of a user including phonological and morphological skills, the device comprising:

a graphical display that displays images to a user;

a user input device that permits the user to interact with the computer;

a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the game further comprises means for adaptively increasing or decreasing the difficulty of the training of the user based on user performance.

14. The device of claim 13, wherein the difficulty changing means further comprises means for changing one or more difficulty variables to change the difficulty of the training.

15. The device of claim 14, wherein the difficulty changing means further comprises means for increasing the difficulty of the training if the user has met a predetermined increase level criteria and means for decreasing the difficulty of the training if the user has met a predetermined decrease level criteria.

16. A device for training one or more reading and spelling skills of a user including phonological and morphological skills, the device comprising:

a graphical display that displays images to a user;

a user input device that permits the user to interact with the computer;

a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the game is stored on a server computer and downloaded to a client computer and wherein the user input device and the graphical display are part of a client computer connected to the server computer by a computer network.

17. The device of claim 16, wherein the server further comprises means for downloading changes to the game from the server computer to the client computer.

18. The device of claim 16, wherein the server further comprises a diagnostic tool for testing the skills of the user in order to customize the game for a particular user and means for downloading the customized game from the server computer to the client computer of the particular user.

19. The device of claim 16, wherein the server further comprises a scoring database that stores the scores of the users of the system.

20. The device of claim 19, wherein the server further comprises means for generating statistics about the scores stored in the scoring database.

21. A method for training one or more reading and spelling skills of a user including phonological and morphological skills using a computer system having a graphical display for displaying images to the user and a user input device to permit the user to interact with the computer, the method comprising:

executing a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills.

22. The method of claim 21, wherein the game further comprises simultaneously training one or more skills of the user using one or more modules that train different skills of the user.

23. The method of claim 22, wherein the one or more modules further comprise a segmentation, discrimination and syllable stress training module, a segmentation, blending, decoding and spelling training module, a sound/symbol correspondence training module and a sound and word recognition training module.

24. The method of claim 23, wherein each module further comprises providing a cue to the user wherein the cues are auditory cues first, then auditory and visual cues and then visual cues.

25. The method of claim 21, wherein the game is stored on a compact disk and then loaded into a computer having the graphical display and the user input method.

26. The method of claim 21, wherein the game further comprises a module for training the user's skills at identifying the correspondence between sounds and symbols.

27. The method of claim 26, wherein the module further comprises a task in which the user sorts words into one or more categories in order to identify patterns in printed words.

28. The method of claim 27, wherein the sorting task further comprises sorting words based on an initial portion of a word, sorting words based on a middle portion of the words and sorting a word based on a final portion of the words.

29. The method of claim 27, wherein the module further comprises a second task in which the user sorts words into one or more semantic categories.

30. The method of claim 27, wherein the module further comprises a third task in which the user identifies a word that is spelling is reverse order to a target word.

31. A method for training one or more reading and spelling skills of a user including phonological and morphological skills using a computer system having a graphical display for displaying images to the user and a user input device to permit the user to interact with the computer, the method comprising:

executing a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the phonological training portion further comprises a morphological skills training portion to train the user's skills at decoding a word and vocabulary.

32. The method of claim 31, wherein the sound/symbol training portion further comprises a phonics portion to train the user's skills at decoding printed words.

33. A method for training one or more reading and spelling skills of a user including phonological and morphological skills using a computer system having a graphical display for displaying images to the user and a user input device to permit the user to interact with the computer, the method comprising:

executing a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the game further comprises adaptively increasing or decreasing the difficulty of the training of the user based on user performance.

34. The method of claim 33, wherein the difficulty changing further comprises changing one or more difficulty variables to change the difficulty of the training.

35. The method of claim 34, wherein the difficulty changing further comprises increasing the difficulty of the training if the user has met a predetermined increase level criteria and decreasing the difficulty of the training if the user has met a predetermined decrease level criteria.

36. A method for training one or more reading and spelling skills of a user including phonological and morphological skills using a computer system having a graphical display for displaying images to the user and a user input device to permit the user to interact with the computer, the method comprising:

executing a game that presents stimuli to the user so that the user can respond to the stimuli and improve the reading and spelling skills of the user, the game further comprising a phonological skills training portion for training the phonological skills of the user and a sound/symbol correspondence training portion for training the sound/symbol correspondence skills of the user wherein the game first trains the phonological skills of the user and then automatically transitions to training the sound/symbol correspondence skills once the phonological skills are mastered which develops and systematically bridges the phonological skills to the sound/symbol correspondence skills; and wherein the game is stored on a server computer and downloaded to a client computer and wherein the user input method and the graphical display are part of a client computer connected to the server computer by a computer network.

37. The method of claim 36, wherein the server further comprises downloading changes to the game from the server computer to the client computer.

38. The method of claim 36, wherein the server further comprises testing the skills of the user with diagnostic tool in order to customize the game for a particular user and downloading the customized game from the server computer to the client computer of the particular user.

39. The method of claim 36, wherein the server further comprises using a scoring database that stores the scores of the users of the system.

40. The method of claim 39, wherein the server further comprises generating statistics about the scores stored in the scoring database.

* * * * *